US009954427B2

(12) United States Patent
Venkataramanan et al.

(10) Patent No.: US 9,954,427 B2
(45) Date of Patent: Apr. 24, 2018

(54) CONVERTER CONTROL USING REDUCED LINK CAPACITOR

(71) Applicant: Wisconsin Alumni Research Foundation, Madison, WI (US)

(72) Inventors: Venkata Giri Venkataramanan, Madison, WI (US); Mahima Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/934,337

(22) Filed: Nov. 6, 2015

(65) Prior Publication Data

US 2017/0133922 A1 May 11, 2017

(51) Int. Cl.
*H02M 7/53862* (2007.01)
*H02M 1/14* (2006.01)
*H02M 7/797* (2006.01)
*H02M 7/5387* (2007.01)

(52) U.S. Cl.
CPC ........... *H02M 1/143* (2013.01); *H02M 7/797* (2013.01)

(58) Field of Classification Search
CPC .......... H02M 7/42; H02M 7/53; H02M 7/537; H02M 7/53846; H02M 7/53862; H02M 7/5387; H02M 7/53871; H02M 7/53873; H02M 7/53875; H02M 7/5395
See application file for complete search history.

(56) References Cited

U.S. PATENT DOCUMENTS

| 4,677,539 | A * | 6/1987 | Erickson | H02M 7/5387 363/132 |
| 6,879,062 | B2 * | 4/2005 | Oates | H02J 3/00 307/106 |
| 7,102,903 | B2 * | 9/2006 | Nakamura | H02P 27/08 318/139 |
| 7,164,254 | B2 | 1/2007 | Kerkman et al. | |
| 7,593,243 | B2 | 9/2009 | Ganev et al. | |
| 7,738,267 | B1 | 6/2010 | Tallam et al. | |
| 8,649,195 | B2 | 2/2014 | Mao et al. | |

(Continued)

OTHER PUBLICATIONS

Van Der Broeck et al., Analysis and Realization of a Pulsewidth Modulator Based on Voltage Space Vectors, IEEE Transactions on Industry Applications, vol. 24. No. 1, 1988, pp. 142-150.

(Continued)

*Primary Examiner* — Gary L Laxton
(74) *Attorney, Agent, or Firm* — Bell & Manning, LLC

(57) ABSTRACT

A controller selects a first switch vector based on a current, voltage, or power of a multi-phase load or power source. The first switch vector identifies a first state for each of a plurality of half-bridges of a converter as on or as off during a first interval. A second switch vector is selected based on the current, voltage, or power of the multi-phase load or power source. The second switch vector identifies a second state for each of the half-bridges as on or as off during a second interval. The first interval is computed based on the selected first switch vector. The second interval is computed based on the selected second switch vector. Each of the plurality of half-bridges is controlled as on or as off during the first interval based on the selected first switch vector and during the second interval based on the selected second switch vector.

20 Claims, 33 Drawing Sheets

(56) References Cited

U.S. PATENT DOCUMENTS

| | | |
|---|---|---|
| 8,842,454 B2 | 9/2014 | Johnson et al. |
| 8,898,025 B2 | 11/2014 | Yin et al. |
| 2004/0047166 A1 | 3/2004 | Lopez-Santillana et al. |
| 2010/0090533 A1* | 4/2010 | Shimada ............ B60L 11/1811 307/66 |
| 2010/0259955 A1* | 10/2010 | Shimada ............... H02M 7/219 363/49 |
| 2015/0188453 A1* | 7/2015 | Damson ............ H02M 7/53875 318/504 |
| 2017/0063248 A1 | 3/2017 | Lee et al. |

OTHER PUBLICATIONS

Gupta et al., Quantum Modulated Voltage Source Converters with Minimal DC Bus Capacitance, WEMPEC 34th Annual Review Meeting, May 20, 2015.

Gupta et al., Three Phase Voltage Source Inverters with Only Decoupling Capacitors on the DC Bus, WEMPEC 34th Annual Review Meeting, May 20, 2015.

* cited by examiner

CONVERTER CONTROL USING REDUCED LINK CAPACITOR

BACKGROUND

A power converter is an electrical device for converting electrical energy from one form to another, such as between alternating current (AC) and direct current (DC), between different voltages or frequencies, or a combination of these. Three-phase electric power requires the use of power converters to control the flow of electric energy by supplying voltages and currents in a form that is optimally suited for the load. Conventional three-phase alternating current (AC) converter topologies use an intermediate capacitive direct current (DC) link. To synthesize a sinusoidal output, sinusoidal pulse width modulation is typically used, and a stiff voltage is maintained across the capacitive DC link, which means essentially a constant voltage. The pulse width modulation approach defines a duty ratio of the interconnecting switches as a linear function of the ratio of the time varying AC output and the stiff voltage. In the case of inverters, rectifiers, and frequency converters, the DC link capacitor is sized to store enough energy to maintain several tens of cycles of the AC quantity at the rated power, which requires the use of large capacitors, commonly referred to as 'bulk' capacitors, and which tend to dominate the weight and volume of most converter technologies.

SUMMARY

In an example embodiment, a computer-readable medium is provided having stored thereon computer-readable instructions that when executed by a computing device, cause the computing device to control a converter. A first switch vector is selected based on a current, a voltage, or a power of a multi-phase load or a multi-phase power source. The first switch vector identifies a first state for each of a plurality of half-bridges of a converter as on or as off during a first interval. A second switch vector is selected based on the current, the voltage, or the power of the multi-phase load or the multi-phase power source. The second switch vector identifies a second state for each of the plurality of half-bridges as on or as off during a second interval. The first interval is computed based on the selected first switch vector. The second interval is computed based on the selected second switch vector. Each of the plurality of half-bridges is controlled as on or as off during the first interval based on the selected first switch vector. Each of the plurality of half-bridges is controlled as on or as off during the second interval based on the selected second switch vector. The first interval and the second interval are selected for each switching period of the converter. The switching period is less than one millisecond. The first interval and the second interval are computed to either charge a link capacitor connected in parallel across the plurality of half-bridges to a predefined voltage from approximately zero or to discharge the link capacitor to approximately zero from the predefined voltage.

In another example embodiment, a conversion controller is provided. The conversion controller includes, but is not limited to, a processor and the computer-readable medium having stored thereon computer-readable instructions that when executed by a computing device, cause the computing device to control a converter.

In yet another example embodiment, a converter device is provided. The converter device includes, but is not limited to, a converter, a link capacitor, and the conversion controller.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
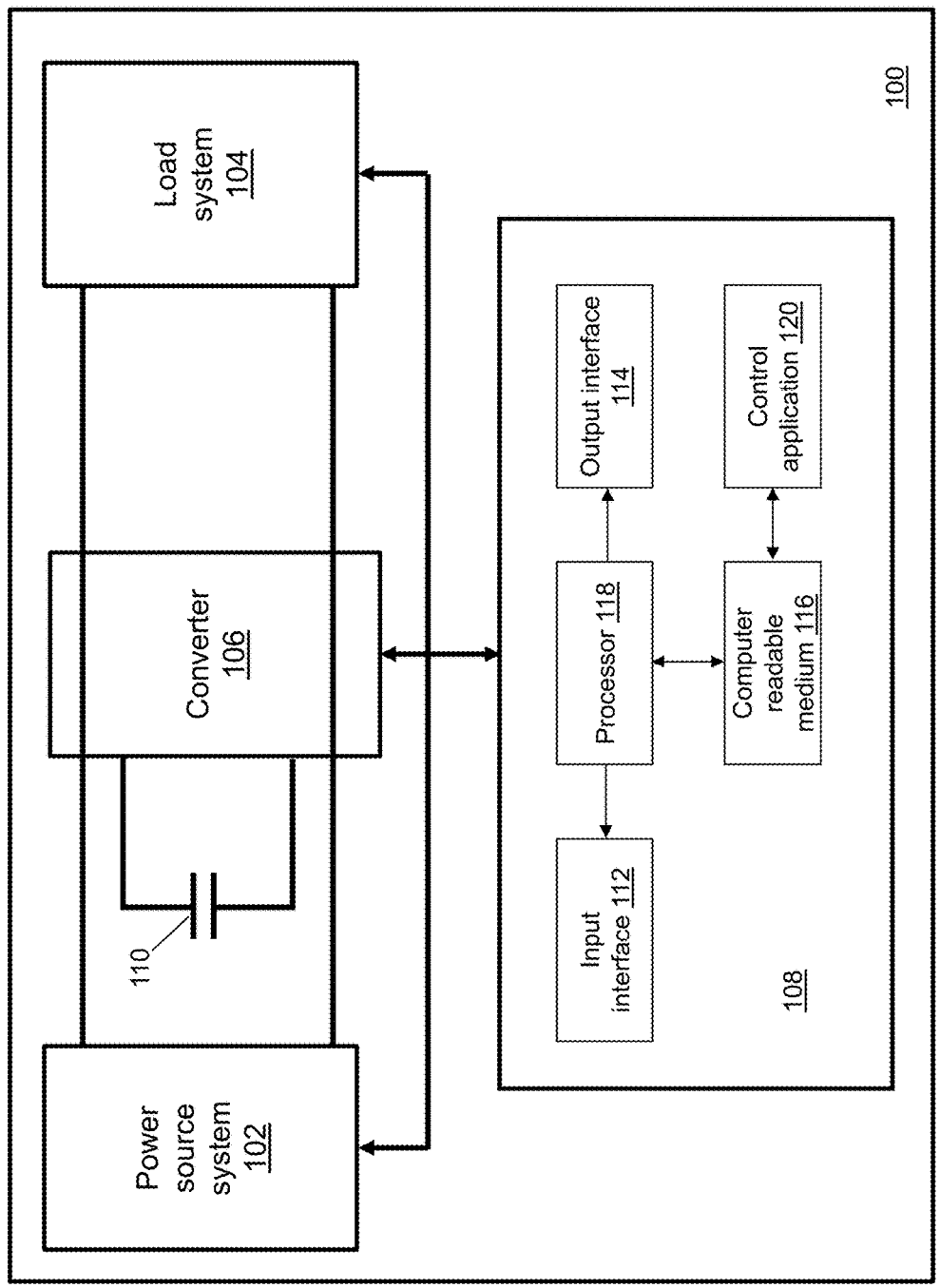
FIG. 1 is a block diagram of a power conversion system in accordance with an illustrative embodiment.

Referring to FIG. 1, a power conversion system 100 may include a power source system 102, a load system 104, a converter 106, a conversion controller 108, and a link capacitor 110. Power source system 102 and load system 104 exchange energy through link capacitor 110 under control of conversion controller 108 and converter 106. Link capacitor 110 is connected in parallel with converter 106. A capacitance of link capacitor 110 may be many orders of magnitude less than traditional designs for power conversion system 100.

Power source system 102 may include one or more alternating current (AC) and/or direct current (DC) source subsystems that provide electrical power. Load system 104 may include one or more AC and/or DC load subsystems that act as electrical loads. Some or all of power source system 102 and/or load system 104 may provide bidirectional power flow such that a power source subsystem and/or a load subsystem may act as a source during a first time period and as a load during a second time period.

During normal operating conditions, a total power supplied by all of the subsystems acting as sources balance a total power consumed by all of the subsystems acting as loads. In the event that there is a mismatch between total source and load power levels, a storage subsystem may be added to power conversion system 100 to ensure overall power balance across link capacitor 110.

Conversion controller 108 may be electrically connected to power source system 102 and load system 104 to receive voltage, current, and/or power values used to define the parameters that control the energy transfer between power source system 102 and load system 104 based on the current availability/demand across power conversion system 100. The voltage, current, and/or power values may be received for each switching frequency interval or may be received less frequently depending on the dynamic needs of power conversion system 100. As a result, conversion controller 108 may dynamically control converter 106 to act as an inverter, a rectifier, and/or a frequency converter.

Conversion controller 108 is electrically connected to converter 106. Conversion controller 108 controls the supply of power by converter 106 from power source system 102 to load system 104 through command signals input to converter 106. The command signals are generated by conversion controller 108 based on the received voltage and current values or known voltage, current, and/or power values for power source system 102 and load system 104.

Conversion controller 108 may include an input interface 112, an output interface 114, a computer-readable medium 116, a processor 118, and a control application 120. Fewer, different, and additional components may be incorporated into conversion controller 108.

Input interface 112 provides an interface for receiving information from a user or from other devices for entry into conversion controller 108 as understood by those skilled in the art. Input interface 112 may interface with various input technologies including, but not limited to, a keyboard, a mouse, a display, a track ball, a keypad, one or more buttons, etc. to allow the user to enter information into conversion controller 108 or to make selections in a user interface displayed on the display. The same interface may support both input interface 112 and output interface 114. Conversion controller 108 may have one or more input interfaces that use the same or a different input interface technology. Additional inputs to conversion controller 108 may be the voltage, current, and/or power values received from power source system 102 and/or load system 104.

Output interface 114 provides an interface for outputting information for review by a user of conversion controller 108 and for input to another device. For example, output interface 114 may interface with various output technologies including, but not limited to, the display and a printer, etc. Conversion controller 108 may have one or more output interfaces that use the same or a different interface technology. Additional outputs from conversion controller 108 may be the command signals to converter 106.

Computer-readable medium 116 is an electronic holding place or storage for information so the information can be accessed by processor 118 as understood by those skilled in the art. Computer-readable medium 116 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, cache memory, etc. Conversion controller 108 may have one or more computer-readable media that use the same or a different memory media technology. Conversion controller 108 also may have one or more drives that support the loading of a memory media such as a CD or DVD.

Processor 118 executes instructions as understood by those skilled in the art. The instructions may be carried out by a special purpose computer, logic circuits, or hardware circuits. Processor 118 may be implemented in hardware and/or firmware, or any combination of these methods. The term "execution" is the process of running an application or the carrying out of the operation called for by an instruction. The instructions may be written using one or more programming language, scripting language, assembly language, etc. Processor 118 executes an instruction, meaning it performs/controls the operations called for by that instruction. Processor 118 operably couples with input interface 112, with output interface 114, and with computer-readable medium 116 to receive, to send, and to process information. Processor 118 may retrieve a set of instructions from a permanent memory device and copy the instructions in an executable form to a temporary memory device that is generally some form of RAM. Conversion controller 108 may include a plurality of processors that use the same or a different processing technology.

Control application 120 performs operations associated with implementing some or all of the control of converter 106 as described with reference to FIGS. 33-35. The operations may be implemented using hardware, firmware, software, or any combination of these methods. Referring to the example embodiment of FIG. 1, control application 120 is implemented in software (comprised of computer-readable and/or computer-executable instructions) stored in computer-readable medium 116 and accessible by processor 118 for execution of the instructions that embody the operations of control application 120. Control application 120 may be written using one or more programming languages, assembly languages, scripting languages, etc.

Figure 2:
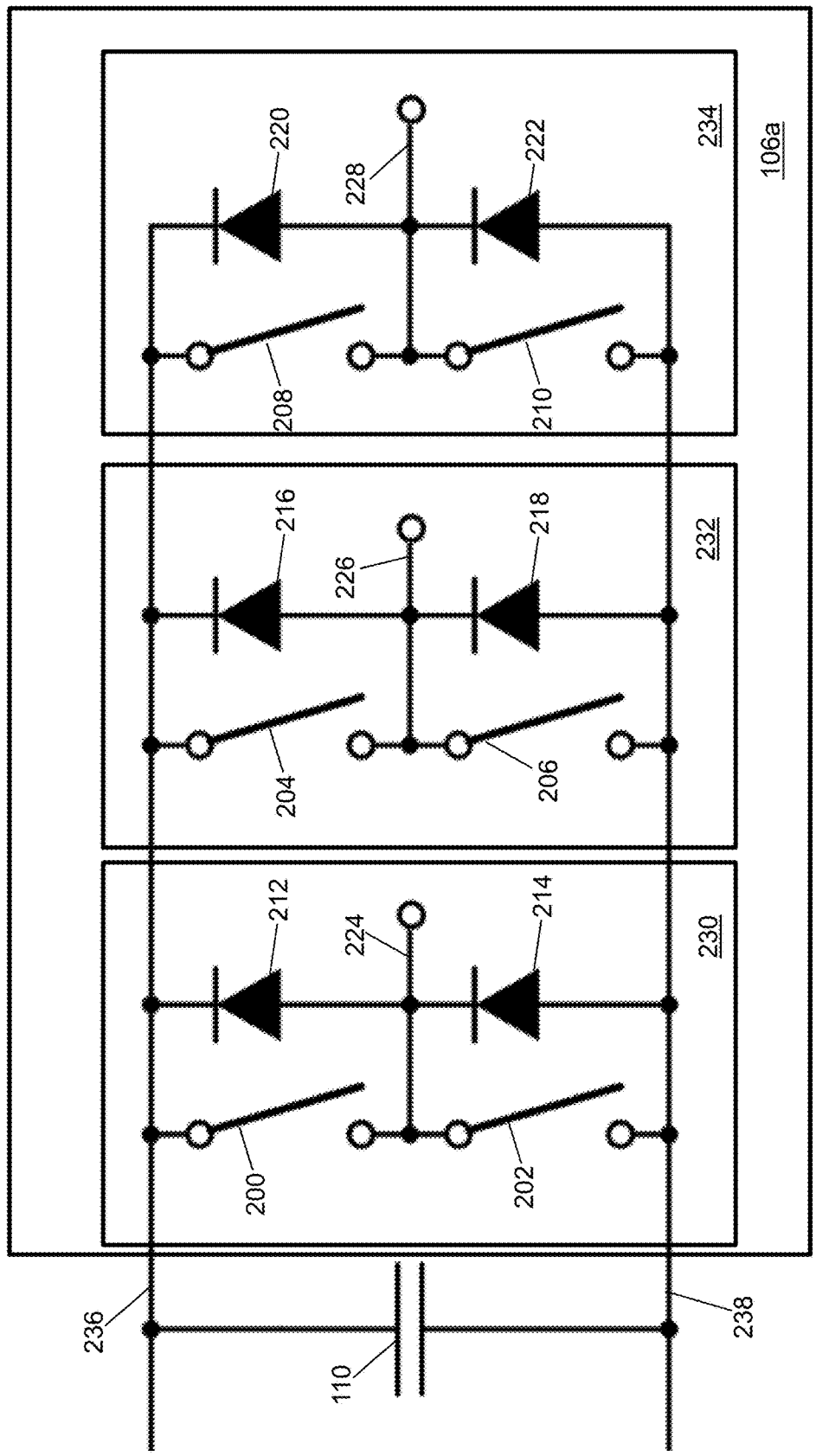
FIG. 2 is a circuit diagram of a part of a converter of the power conversion system of FIG. 1 in accordance with an illustrative embodiment.

Referring to FIG. 2, a circuit diagram of a part of converter 106 implemented as a first converter 106a is shown in accordance with an illustrative embodiment. First converter 106a is a three-phase converter. In the illustrative embodiment of FIG. 2, first converter 106a may include a first half-bridge 230, a second half-bridge 232, and a third half-bridge 234. In the illustrative embodiment, converter 106 is first converter 106a though a different number of phases may be output from converter 106 in alternative embodiments including a DC current. For example, converter 106 may output two- or four-phase or DC waveforms. Converter 106 may include a half-bridge for each phase.

Figure 3:
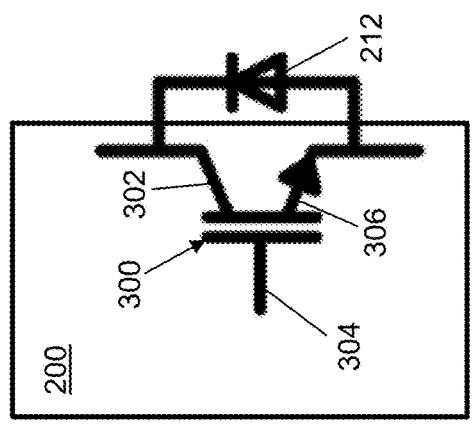
FIG. 3 is a first switch-diode circuit of the converter of FIG. 2 in accordance with an illustrative embodiment.

First half-bridge 230 includes a first switch-diode circuit and a second switch-diode circuit. The first switch-diode circuit includes a first top switch 200 and a first top diode 212 connected anti-parallel across first top switch 200. Referring to FIG. 3, the first switch-diode circuit is shown in accordance with an illustrative embodiment. First top switch 200 may be implemented as a transistor switch 300. Transistor switch 300 may include a drain 302, a gate 304, and a source 306 like a metal-oxide-semiconductor field-effect transistor (MOSFET) or include a collector 302, a gate 304, and an emitter 306 like an insulated-gate bipolar transistor (IGBT), or include a collector 302, a base 304, and an emitter 306 like a bipolar junction transistor. Depending on the switching logic and whether transistor switch 300 is an n-type or a p-type, drain 302 and source 306 may be reversed. A voltage applied to gate 304 determines a switching state of transistor switch 300. First top diode 212 is connected anti-parallel across source 306 and drain 302 of transistor switch 300. In an illustrative embodiment, transistor switch 300 is an insulated-gate field-effect transistor such as a MOSFET, IGBT, Gallium Nitride (GaN) device, Silicon Carbide (SiC) device, or other type of power semiconductor switch.

Referring again to FIG. 2, in the illustrative embodiment, the second switch-diode circuit includes a first bottom switch 202 and a first bottom diode 214 connected anti-parallel across first bottom switch 202 similar to the first switch-diode circuit. For illustration, first bottom switch 202 is also implemented as transistor switch 300. Source 306 of transistor switch 300 of the first switch-diode circuit is connected to drain 302 of transistor switch 300 of the second switch-diode circuit. Drain 302 of transistor switch 300 of the first switch-diode circuit is connected to a top line 236. Source 306 of transistor switch 300 of the second switch-diode circuit is connected to a bottom line 238. Gate 304 of transistor switch 300 of the first switch-diode circuit and gate 304 of transistor switch 300 of the second switch-diode circuit are connected to conversion controller 108 to receive gating signals to control a state of first top switch 200 and first bottom switch 202, respectively. At any point in time, only one of first top switch 200 and first bottom switch 202 is effectively closed. A first-phase line 224 is connected between source 306 of transistor switch 300 of the first switch-diode circuit and drain 302 of transistor switch 300 of the second switch-diode circuit. A direction of current flow from first-phase line 224 to top line 236 through first top switch 200 indicates first half-bridge 230 is charging link capacitor 110, and a direction of current flow from top line 236 to first-phase line 224 through first top switch 200 indicates first half-bridge 230 is discharging link capacitor 110. When first top switch 200 is effectively closed, first half-bridge 230 is 'On' or in a one '1' state. When first bottom switch 202 is effectively closed, first half-bridge 230 is 'Off' or in a zero '0' state.

Link capacitor 110 is connected in parallel with first converter 106a between top line 236 and bottom line 238. A half-bridge is included for each phase current output from converter 106. Second half-bridge 232 is identical to first half-bridge 230 and includes a third switch-diode circuit and a fourth switch-diode circuit. The third switch-diode circuit includes a second top switch 204 and a second top diode 216 connected anti-parallel across second top switch 204. The fourth switch-diode circuit includes a second bottom switch 206 and a second bottom diode 218 connected anti-parallel across second bottom switch 206. Again, second top switch 204 and second bottom switch 206 may be implemented as transistor switch 300 and connected in an identical manner to that described for first top switch 200 and first bottom switch 202.

Gate 304 of transistor switch 300 of the third switch-diode circuit and gate 304 of transistor switch 300 of the fourth switch-diode circuit are connected to conversion controller 108 to receive gating signals to control a state of second top switch 204 and second bottom switch 206, respectively. At any point in time, only one of second top switch 204 and second bottom switch 206 is effectively closed. A second-phase line 226 is connected between source 306 of transistor switch 300 of the third switch-diode circuit and drain 302 of transistor switch 300 of the fourth switch-diode circuit. A direction of current flow from second-phase line 226 to top line 236 through second top switch 204 indicates second half-bridge 232 is charging link capacitor 110, and a direction of current flow from top line 236 to second-phase line 226 through second top switch 204 indicates second half-bridge 232 is discharging link capacitor 110. When second top switch 204 is effectively closed, second half-bridge 232 is 'On' or in a one '1' state. When second bottom switch 206 is effectively closed, second half-bridge 232 is 'Off' or in a zero '0' state.

Third half-bridge 234 is identical to first half-bridge 230 and includes a fifth switch-diode circuit and a sixth switch-diode circuit. The fifth switch-diode circuit includes a third top switch 208 and a third top diode 220 connected anti-parallel across third top switch 20. The sixth switch-diode circuit includes a third bottom switch 210 and a third bottom diode 222 connected anti-parallel across third bottom switch 210. Again, third top switch 208 and third bottom switch 210 may be implemented as transistor switch 300 and connected in an identical manner to that described for first top switch 200 and first bottom switch 202.

Gate 304 of transistor switch 300 of the fifth switch-diode circuit and gate 304 of transistor switch 300 of the sixth switch-diode circuit are connected to conversion controller 108 to receive gating signals to control a state of third top switch 208 and third bottom switch 210, respectively. At any point in time, only one of third top switch 208 and third bottom switch 210 is effectively closed. A third-phase line 228 is connected between source 306 of transistor switch 300 of the fifth switch-diode circuit and drain 302 of transistor switch 300 of the sixth switch-diode circuit. A direction of current flow from third-phase line 228 to top line 236 through third top switch 208 indicates third half-bridge 234 is charging link capacitor 110, and a direction of current flow from top line 236 to third-phase line 228 through third top switch 208 indicates third half-bridge 234 is discharging link capacitor 110. When third top switch 208 is effectively closed, third half-bridge 234 is 'On' or in a one '1' state. When third bottom switch 210 is effectively closed, third half-bridge 234 is 'Off' or in a zero '0' state.

Figure 4:
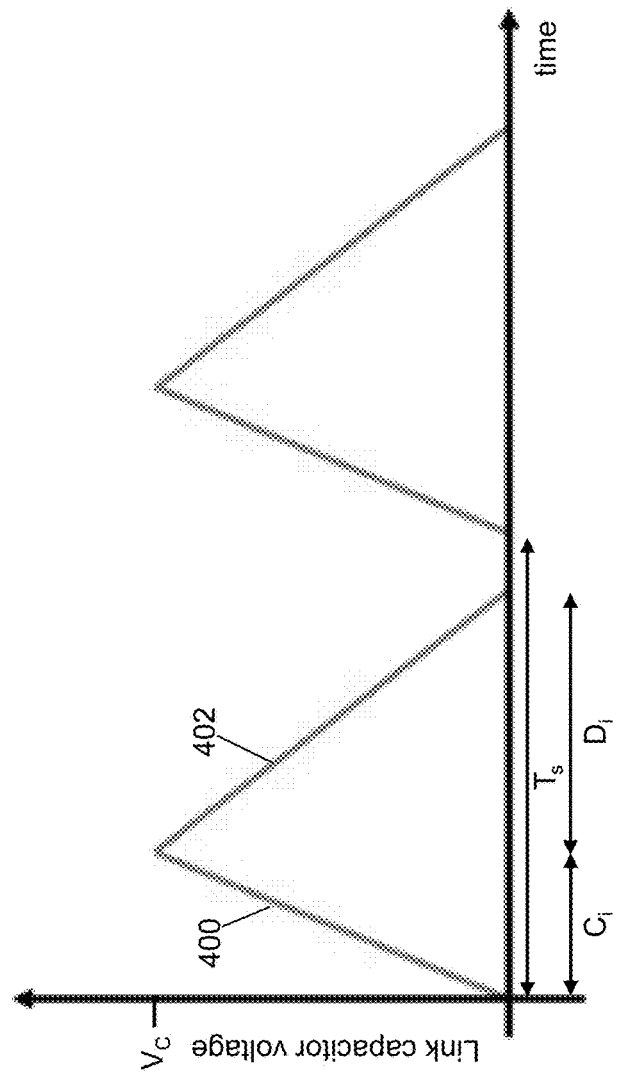
FIG. 4 shows a charging/discharging curve of a link capacitor of the power conversion system of FIG. 1 in accordance with an illustrative embodiment.

Referring to FIG. 4, in normal operation, link capacitor 110 is charged to a voltage $V_c$ as shown by charging curve 400. Voltage $V_c$ stored by link capacitor 110 is then discharged as shown by discharging curve 402. Converter 106 controls the charge and discharge cycles for each switching period $T_s$ that is the inverse of the switching frequency $$f_s = \frac{1}{T_s}.$$

In an illustrative embodiment, $f_s$ is much higher than a frequency of a power supplied $f_p$ by power conversion system 100. For illustration, $f_s$ is at least 1 kilohertz (kHz) resulting in a switching period of less than one millisecond while $f_p$ may be 60 Hz. $f_s$ can be at least 100 times $f_p$ and can be variable.

Figure 5:
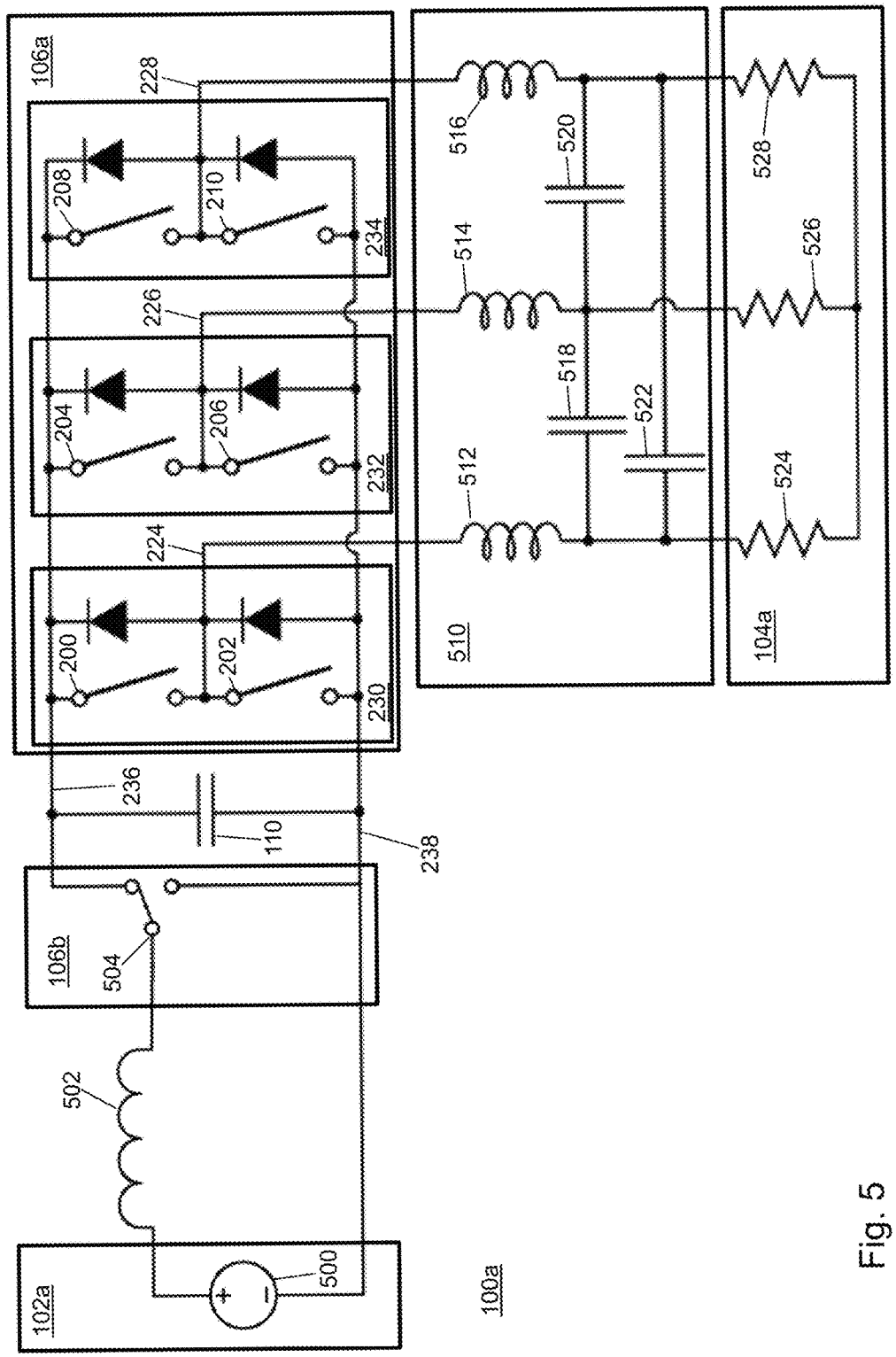
FIG. 5 is a block diagram of a first power conversion system in accordance with an illustrative embodiment.

Referring to FIG. 5, a circuit diagram of a first power conversion system 100a is shown in accordance with a first illustrative embodiment. First power conversion system 100a may include a first power source system 102a, a first load system 104a, first converter 106a, a second converter 106b, conversion controller 108 (not shown in FIG. 5), and link capacitor 110. In the illustrative embodiment of FIG. 5, first power source system 102a includes a single source subsystem that includes a DC power source 500. Converter 106 is implemented as first converter 106a and second converter 106b, where second converter 106b is a one-phase converter. Inductor 502 and source control switch 504 are connected in series with DC power source 500, which together can be visualized as a DC-DC boost chopper. Link capacitor 110 is connected in parallel with first converter 106a and second converter 106b, between top line 236 and bottom line 238. Source control switch 504 is connected to charge link capacitor 110 to voltage $V_c$ in a first position as illustrated in FIG. 5 and to disconnect first power source system 102a from link capacitor 110 when in a second position. Source control switch 504 may be implemented as a single half-bridge.

In the illustrative embodiment of FIG. 5, first load system 104a includes a resistive load resulting in a unity power factor and a current and a voltage that are in-phase with each other. First load system 104a includes a first resistor 524, a second resistor 526, and a third resistor 528. An L-C filter 510 is connected between first converter 106a and first load system 104a to reduce a ripple current. L-C filter 510 includes a first inductor 512, a second inductor 514, a third inductor 516, a first capacitor 518, a second capacitor 520, a third capacitor 522. First inductor 512 is connected on first-phase line 224. Second inductor 514 is connected on second-phase line 226. Third inductor 516 is connected on third-phase line 228. First capacitor 518 is connected in parallel between first-phase line 224 and second-phase line 226 between first inductor 512 and first resistor 524 and second inductor 514 and second resistor 526. Second capacitor 520 is connected in parallel between second-phase line 226 and third-phase line 228 between second inductor 514 and second resistor 526 and third inductor 516 and third resistor 528. Third capacitor 522 is connected in parallel between first-phase line 224 and third-phase line 228 between first inductor 512 and first resistor 524 and third inductor 516 and third resistor 528. In some cases, capacitor 518, capacitor 520, and capacitor 522 may be optional. In cases where the load system is a three-phase motor, inductor 512, inductor 514 and inductor 516 may be the motor inductances.

Referring again to FIG. 4, a charge interval $C_i$ is defined as $d_C T_s$ where $d_C$ is a charging duty ratio provided by connecting source control switch 504 to charge link capacitor 110.

$$d_C = V_{in} \sqrt{\frac{2C}{P_{in} T_s}},$$

where $V_{in}$ is an input voltage provided by DC power source 500, C is a capacitance of link capacitor 110, and $P_{in}=V_{in}I_{in}$ where $I_{in}$ is an input current provided by DC power source 500. The charge interval $C_i$ determines a net power that can be delivered to load system 104. A discharge interval $D_i$ is defined as $d_D T_s$ where $d_D$ is a discharge duty ratio provided by controlling a duty ratio of first top switch 200, second top switch 204, and third top switch 208, which are the inverse of a duty ratio of first bottom switch 202, second bottom switch 206, and third bottom switch 210, respectively. First top switch 200, second top switch 204, and third top switch 208 may be referred to as positive throws, and first bottom switch 202, second bottom switch 206, and third bottom switch 210 may be referred to as negative throws herein.

The operation of converter 106 within each switching period $T_s$ follows a predetermined energy charge-discharge pattern through link capacitor 110. For example, during the charge interval $C_i$, the DC-DC boost chopper transfers energy to link capacitor 110 while first converter 106a is held in a zero state with each of the first switch-diode circuit, the second switch-diode circuit, and the third switch-diode circuit held in the same state. Therefore, load system 104 does not receive any power through link capacitor 110 during the charge interval $C_i$. The link capacitor voltage across link capacitor 110 increases approximately linearly from zero to $V_c$ as shown by charging curve 400. Soon after the energy stored in link capacitor 110 reaches a sufficient and predetermined value, the DC-DC boost chopper is disconnected from link capacitor 110 by source control switch 504. The charge duty ratio can be independent of time as long as input voltage, power throughput, and switching frequency are maintained constant.

During the discharge interval $D_i$, first power source system 102a does not exchange power with link capacitor 110 and the first switch-diode circuit, the second switch-diode circuit, and the third switch-diode circuit are modulated by conversion controller 108 to provide a discharge path for the energy stored in link capacitor 110. The excess period when first converter 106a is not in either a discharge or a charge state, link capacitor 110 is in an idle state with the link capacitor voltage maintained either at zero, at its peak $V_c$, or at an intermediate value.

Figure 6:
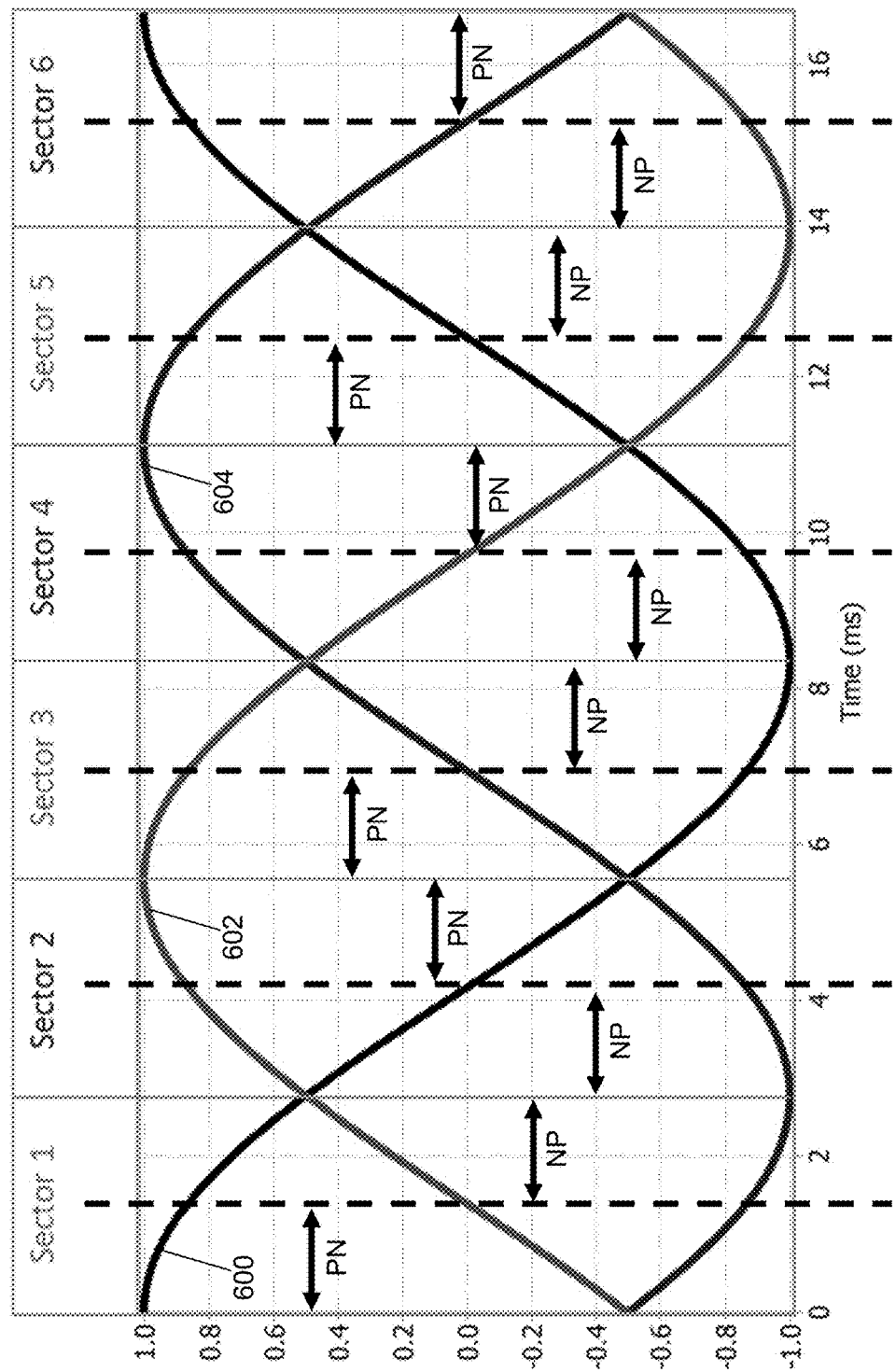
FIG. 6 shows a three-phase balanced set of sinusoidal voltage waveforms in accordance with an illustrative embodiment.

To define the modulation of the first switch-diode circuit, the second switch-diode circuit, and the third switch-diode circuit by conversion controller 108, consider a three-phase balanced set of sinusoidal voltage waveforms desired at the output as shown in FIG. 6. A first-phase output waveform (current, voltage, or power) 600 is created by operation of first half-bridge 230 and may be referred as an A-phase waveform. A second-phase output waveform 602 is created by operation of second half-bridge 232 and may be referred as a B-phase waveform. A third-phase output waveform 604 is created by operation of third half-bridge 234 and may be referred as a C-phase waveform. As understood by a person of skill in the art, the current and voltage waveforms are 360/m degrees out of phase with each other, where m represents a number of phases. Thus, $V_A$, $V_B$, and $V_C$ and $I_A$, $I_B$, and $I_C$ are 120 degrees out of phase with each other.

A time interval of one period of the three-phase output waveforms can be divided into 6 sectors, depending on which of the phase voltages is the most positive and which of the phase voltages is the most negative. Each of the 6 sectors may be further classified into 2 sub-sectors each, depending on either having two of the phase voltages positive or having two of the phase voltages negative, which are labeled NP and PN, respectively.

Figure 7:
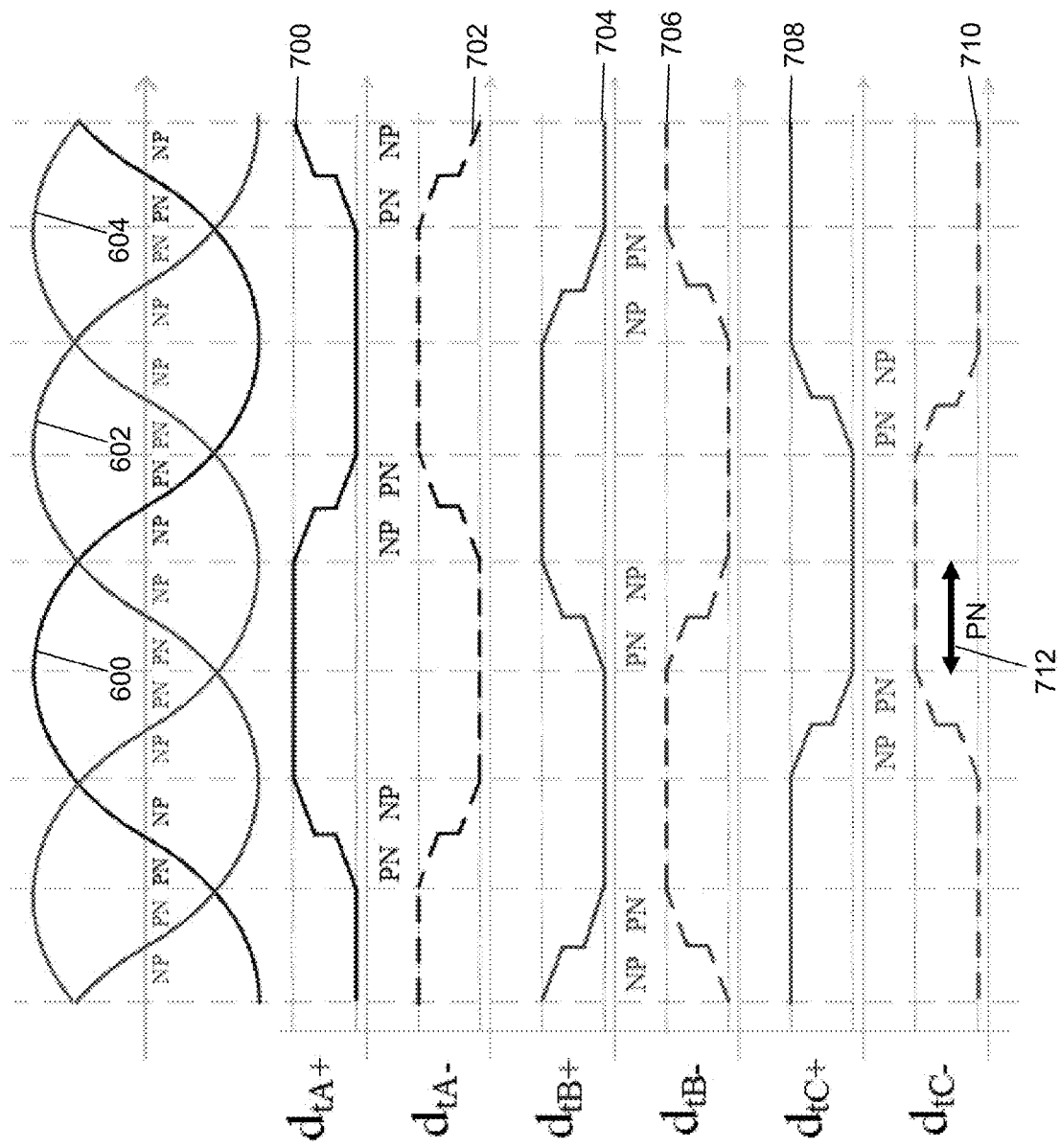
FIG. 7 shows a variation of duty ratio of the positive and negative throws of the converter of FIG. 2 in accordance with an illustrative embodiment.

Referring to FIG. 7, a variation of duty ratio of the positive and negative throws of first half-bridge 230, second half-bridge 232, and third half-bridge 234 are shown for an entire power frequency period. A first duty ratio curve 700 shows a variation in duty ratio of first top switch 200. A second duty ratio curve 702 shows a variation in duty ratio of first bottom switch 202, which is an inverse of first duty ratio curve 700. A third duty ratio curve 704 shows a variation in duty ratio of second top switch 204. A fourth duty ratio curve 706 shows a variation in duty ratio of second bottom switch 206, which is an inverse of third duty ratio curve 704. A fifth duty ratio curve 708 shows a variation in duty ratio of third top switch 208. A sixth duty ratio curve 710 shows a variation in duty ratio of third bottom switch 210, which is an inverse of fifth duty ratio curve 708.

Figure 8:
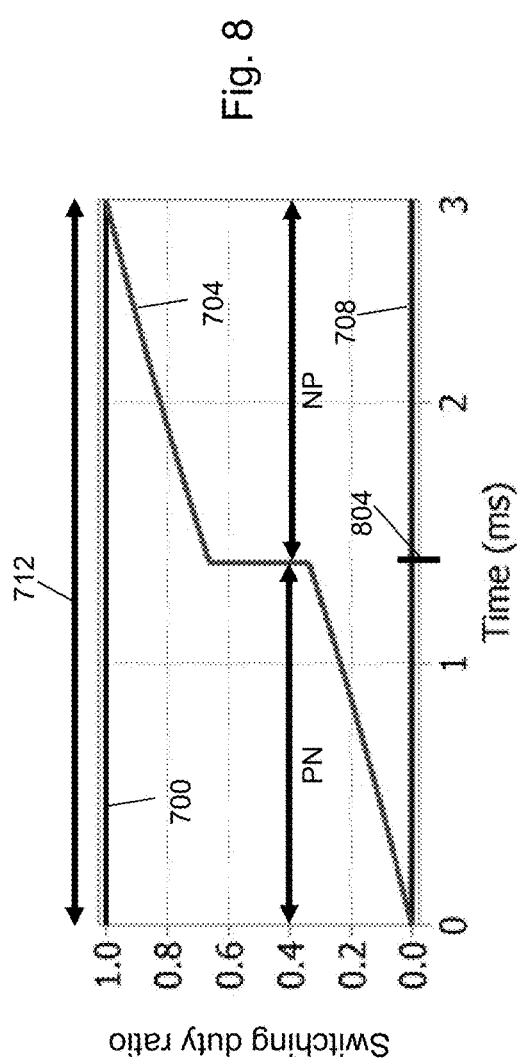
FIG. 8 shows a zoomed portion of the duty ratio of FIG. 7 in accordance with an illustrative embodiment.

The discharge interval duty ratio $d_D$ and its distribution among the positive and negative throws of converter 106 is a function of the instantaneous output voltages of the three-phases. A first switching period discharge cycle 712 illustrates a switching for Sector 1 shown referring to FIG. 6. Referring to FIG. 8, the duty ratio of first top switch 200, second top switch 204, and third top switch 208 are shown for first switching period discharge cycle 712 in accordance with an illustrative embodiment.

Figure 9:
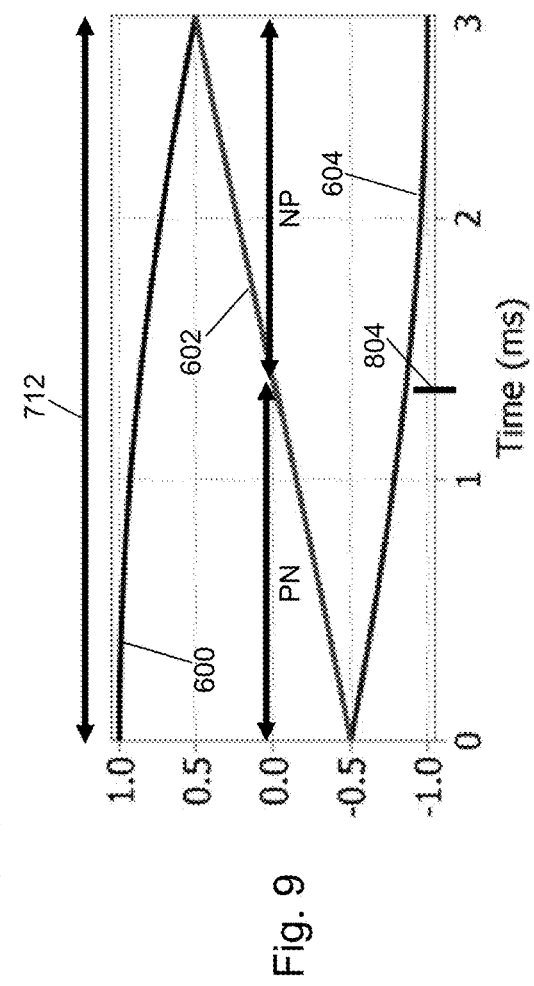
FIG. 9 shows a zoomed portion of the voltage waveforms of FIG. 6 in accordance with an illustrative embodiment.

Referring to FIG. 9, for first switching period discharge cycle 712, first-phase output waveform 600 is the most positive, and third-phase output waveform 604 is the most negative. Second-phase output waveform 602 is negative for a first sub-sector (PN) and positive for a second sub-sector (NP). Referring again to FIG. 8, while distributing the energy stored by link capacitor 110 among the three-phases, first top switch 200 and third bottom switch 210 are closed (enabled) during the entire discharge interval for first switching period discharge cycle 712.

Second half-bridge 232 is toggled between second top switch 204 and second bottom switch 206 during the discharge interval for first switching period discharge cycle 712 in a predetermined manner that synthesizes the desired output waveform. For example, second top switch 204 is operated at the duty ratio indicated by third duty ratio curve 704, and second bottom switch 206 is operated at a duty ratio indicated by an inverse of third duty ratio curve 704. In alternative embodiments, third duty ratio curve 704 may have a different shape that transitions the duty ratio between second top switch 204 and second bottom switch 206 from approximately zero at a start time of Sector 1 to approximately one at an end time of Sector 1. For example, third duty ratio curve 704 may be curved and may or may not include a discontinuity as shown in the illustrative embodiment.

Figure 10:
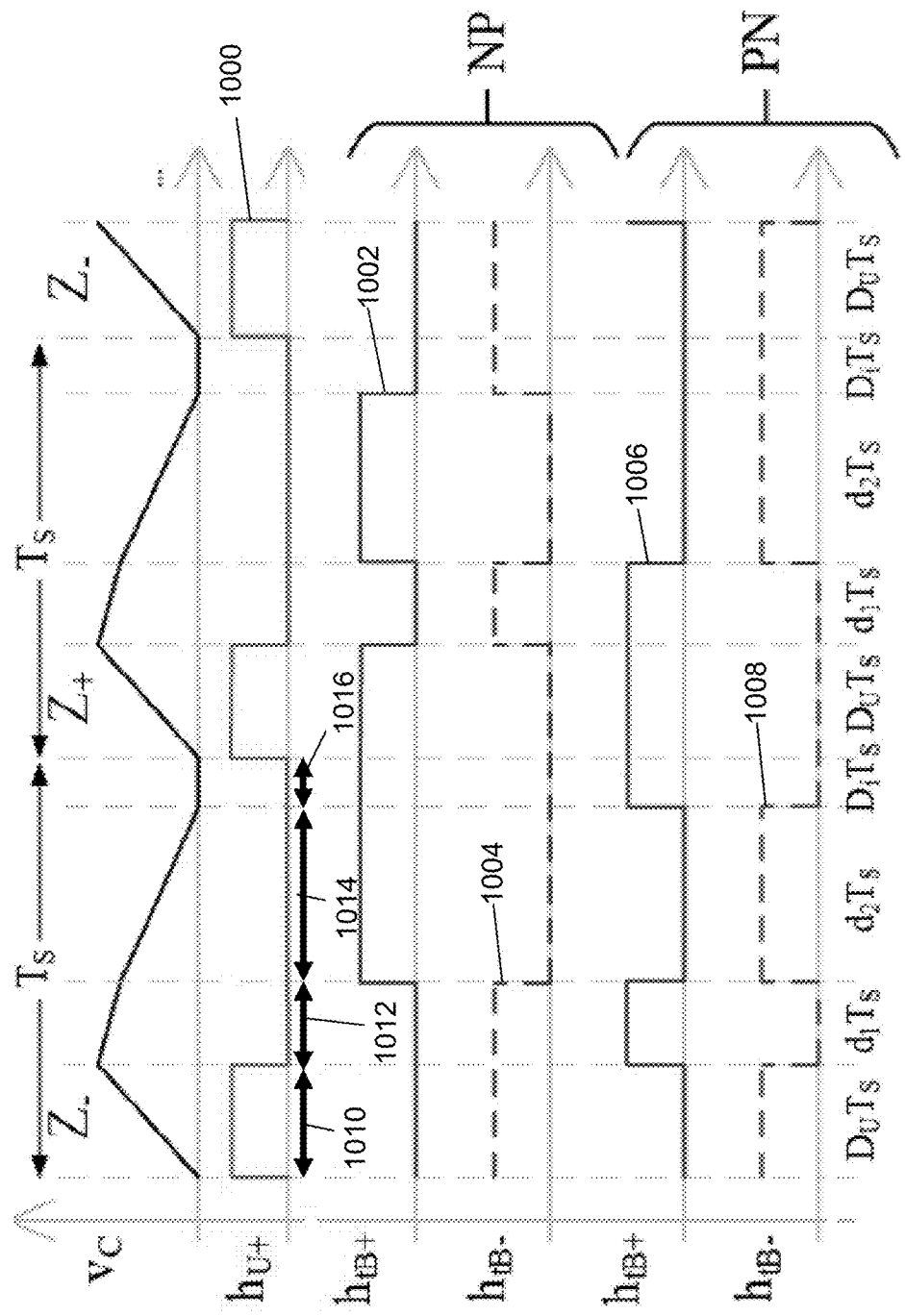
FIG. 10 shows two switching cycles for synthesizing an output waveform of the converter of FIG. 2 in accordance with an illustrative embodiment.

Referring to FIG. 10, two switching cycles for synthesizing second-phase output waveform 602 in sector 1 are shown. A first switching function curve 1000 defines a switching function for source control switch 504. A second switching function curve 1002 defines a switching function for second top switch 204 during Sector 1 and the second sub-sector (NP). A third switching function curve 1004 defines a switching function for second bottom switch 206 during Sector 1 and the second sub-sector (NP), which is an inverse of the switching function for second top switch 204 during Sector 1 and the second sub-sector (NP). A fourth switching function curve 1006 defines a switching function for second top switch 204 during Sector 1 and the first sub-sector (PN). A fifth switching function curve 1008 defines a switching function for second bottom switch 206 during Sector 1 and the first sub-sector (PN), which is an inverse of the switching function for second top switch 204 during Sector 1 and the first sub-sector (PN).

A first time interval 1010 shows charge interval $C_i$. Discharge interval $D_i$ includes a second time interval 1012 and a third time interval 1014. Second time interval 1012 defines a time that second bottom switch 206 is closed when the output waveform is in Sector 1 and the second sub-sector (NP). Second time interval 1012 also defines a time that second top switch 204 is closed when the output waveform is in Sector 1 and the first sub-sector (PN). Third time interval 1014 defines a time that second top switch 204 is closed when the output waveform is in Sector 1 and the second sub-sector (NP). Third time interval 1014 also defines a time that second bottom switch 206 is closed when the output waveform is in Sector 1 and the first sub-sector (PN). A transition time 804 (shown referring to FIGS. 8 and 9) indicates a time that second half-bridge 232 toggles between the second sub-sector (NP) and the first sub-sector (PN).

The expression for a duty ratio for second time interval 1012 during Sector 1 and the first sub-sector (PN) may be defined as $$d_1^{PN} = V_{out} \sqrt{\frac{9C}{T_s P_{in}} \left[ \frac{1 - \sqrt{\cos^2\theta - \frac{\sin\theta\cos\theta}{\sqrt{3}}}}{\frac{1}{2}\cos\theta + \frac{\sqrt{3}}{2}\sin\theta} \right]}$$

where $V_{out}$ is an output voltage, and $\theta$ is an electrical angle of the output voltage waveform.

The expression for a duty ratio for second time interval 1012 during Sector 1 and the second sub-sector (NP) may be defined as $$d_1^{NP} = V_{out} \sqrt{\frac{9C}{T_s P_{in}} \left[ \frac{1 - \sqrt{\sin^2\theta - \frac{\sin\theta\cos\theta}{\sqrt{3}}}}{\cos\theta} \right]}.$$

Third time interval 1014 is defined as the instant at which the voltage $V_c$ across link capacitor 110 reaches zero. A fourth time interval 1016 defines an idle time between the discharge interval and the next charge interval and may be computed as $T_s$ minus first time interval 1010 minus second time interval 1012 minus third time interval 1014. After link capacitor 110 is completely discharged, power source system 102 remains in its idle state, and converter 106 is in a zero state until the next switching period begins. Fourth time interval 1016 may be distributed as a dead time between the charge and discharge intervals, and/or between second time interval 1012 and third time interval 1014 as desired without affecting waveform synthesis.

The three-phase waveforms in successive sectors are either the same or mirror images of each other with only the phase arrangement different between sectors. Due to the waveform symmetry, the modulation developed for Sector 1 for the first sub-sector (PN) and the second sub-sector (NP) can be extended to the remaining sectors by mapping the solution through appropriate translations and sign reversals for the appropriate phase.

First converter 106a is maintained in the zero state during charge interval $C_i$ and during any idle time. A zero state occurs when each throw of first half-bridge 230, second half-bridge 232, and third half-bridge 234 are in the same position, which occurs when first top switch 200, second top switch 204, and third top switch 208 are all closed (enabled) or when first bottom switch 202, second bottom switch 206, and third bottom switch 210 are all closed (enabled). The zero state may alternate between a $Z_+$ position (first top switch 200, second top switch 204, and third top switch 208 all closed), and a $Z_-$ position (first bottom switch 202, second bottom switch 206, and third bottom switch 210 all closed) every other switching period.

Figure 11:
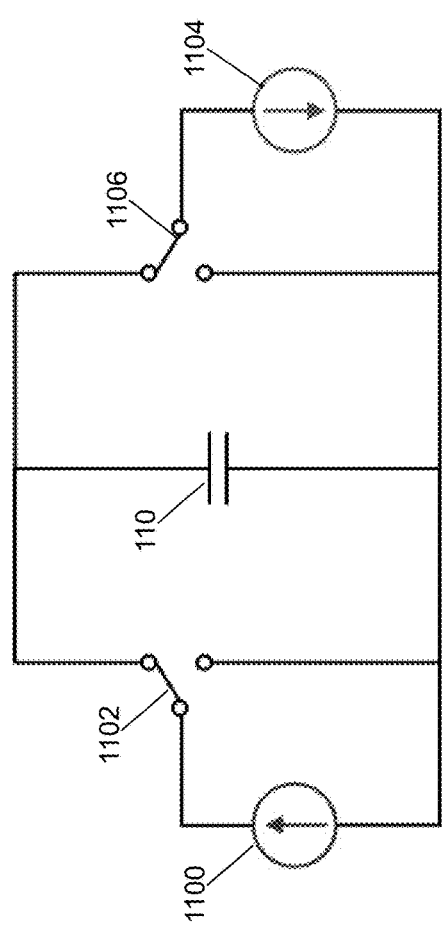
FIG. 11 is a circuit diagram of a simplified two subsystem power converter in accordance with an illustrative embodiment.

The principle of operation of converter 106 further may be described using a simple power converter that transfers power between ideal current sources using ideal switches to interface between them and link capacitor 110. The topology of a simplified two subsystem power converter is illustrated in FIG. 11. This topology includes a first ideal current source 1100, a first switch 1102, link capacitor 110, a second ideal current source 1104, and a second switch 1106. A power transfer takes place from first ideal current source 1100 to second ideal current source 1104. As a result, first ideal current source 1100 provides energy and second ideal current source 1104 consumes energy. The ideal current sources may be realized using inductors in series with loads or voltage sources, for example, as described above referring to DC power source 500 and inductor 502 of FIG. 5.

First switch 1102 and second switch 1106 operate in a repetitive manner with a regulated duty ratio each switching period $T_s$. First switch 1102 and second switch 1106 may be realized using power semiconductors such as MOSFETs and IGBTs as appropriate, for example, as described above. For example, first switch 1102 and second switch 1106 may correspond to first half-bridge 230 that includes first top switch 200 and first bottom switch 202. Other switch configurations can be selected based on a direction of current flow as understood by a person of skill in the art.

Figure 12:
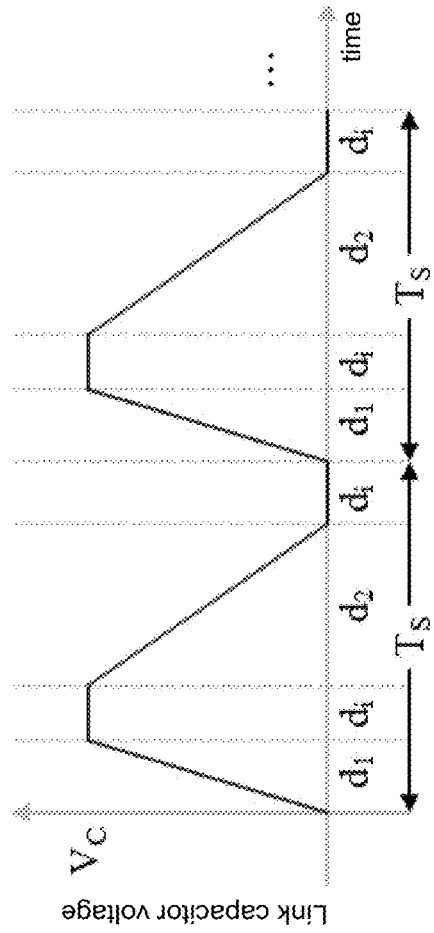
FIG. 12 shows a charging/discharging curve of a link capacitor of the power conversion system of FIG. 11 in accordance with an illustrative embodiment.

In every high frequency switching cycle, one current source supplies energy to link capacitor 110 during a first time interval $d_1$ shown referring to FIG. 12. During first time interval $d_1$, first ideal current source 1100 is connected to a positive throw of first switch 1102 thereby connecting first ideal current source 1100 to charge link capacitor 110 to voltage $V_c$. During first time interval $d_1$, second ideal current source 1104 is connected to a negative throw of second switch 1106 and is thereby disconnected from link capacitor 110. Assuming a constant current output from first ideal current source 1100, the voltage across link capacitor 110 sees a linear rise in voltage. Neither first ideal current source 1100 nor second ideal current source 1104 is connected to charge or discharge link capacitor 110 during an idle time interval $d_i$ shown referring to FIG. 12.

As a convention, the current flowing into link capacitor 110 is considered negative while the current flowing out of link capacitor 110 is considered positive. Similarly, the power delivered into link capacitor 110 is considered negative while the power delivered by link capacitor 110 is considered positive.

During first time interval $d_1$, $$I_1 = C\frac{dv_c}{dt} = C\frac{0 - V_{c1}}{d_1 T_s} \quad (1)$$

$$P_1 = \frac{C}{2T_s}[0 - V_{c1}^2] = -\frac{I_1^2 d_1^2 T_s}{2C} \quad (2)$$

where $I_1$ is the current output from first ideal current source 1100, and $P_1$ is an average net power transferred to link capacitor 110. It can be observed that both $I_1$ and $P_1$ are negative since current source $I_1$ charges link capacitor 110.

During a second time interval $d_2$ shown referring to FIG. 12, second ideal current source 1104 is connected to a positive throw of second switch 1106 thereby connecting second ideal current source 1104 to discharge link capacitor 110 to zero. During a second time interval $d_2$ shown referring to FIG. 12, first ideal current source 1100 is connected to a negative throw of first switch 1102 thereby disconnecting first ideal current source 1100 from link capacitor 110. After second time interval $d_2$, a second idle time interval $d_1$ may be entered before a next charge cycle of a next switching cycle.

During second time interval $d_2$, $$I_2 = C\frac{dv_c}{dt} = C\frac{V_{c1} - 0}{d_2 T_s} \quad (3)$$

$$P_2 = \frac{C}{2T_s}V_{c1}^2 = \frac{I_2^2 d_2^2 T_s}{2C} \quad (4)$$

where $I_2$ is the current output from second ideal current source 1104, and $P_2$ is an average net power transferred from link capacitor 110. It can be observed that both $I_2$ and $P_2$ are positive since current source $I_2$, discharges link capacitor 110. For balanced power, $I_1d_1+I_2d_2=0$.

Figure 13:
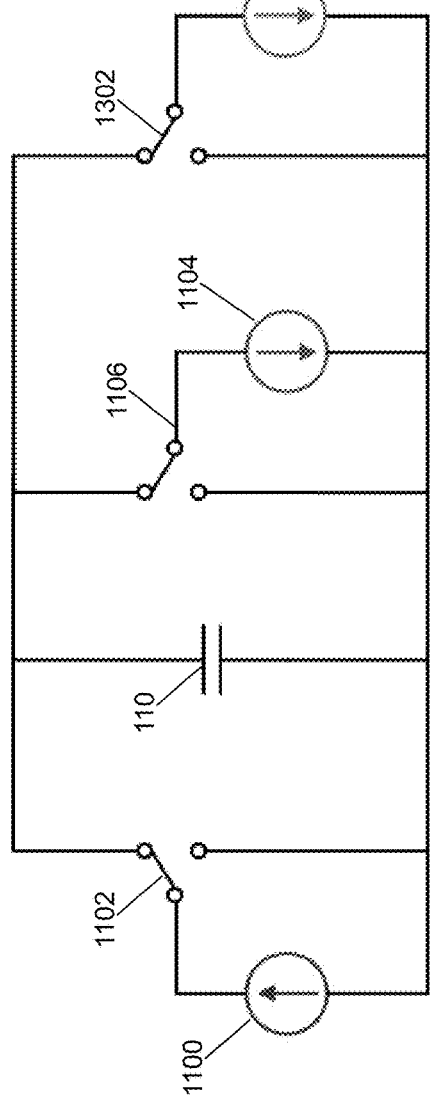
FIG. 13 is a circuit diagram of a simplified three subsystem power converter in accordance with an illustrative embodiment.

The topology of a simplified three subsystem power converter is illustrated in FIG. 13. This topology includes first ideal current source 1100, first switch 1102, link capacitor 110, second ideal current source 1104, second switch 1106, a third ideal current source 1300, and a third switch 1302. A power transfer takes place from first ideal current source 1100 to second ideal current source 1104 and to third ideal current source 1300. As a result, first ideal current source 1100 provides energy and second ideal current source 1104 and third ideal current source 1300 consume energy.

First switch 1102, second switch 1106, and third switch 1302 operate in a repetitive manner with a regulated duty ratio each switching period $T_s$. Again, in every high frequency switching cycle, first ideal current source 1100 supplies energy to link capacitor 110 during a first time interval $d_1$, shown referring to FIG. 14.

Figure 14:
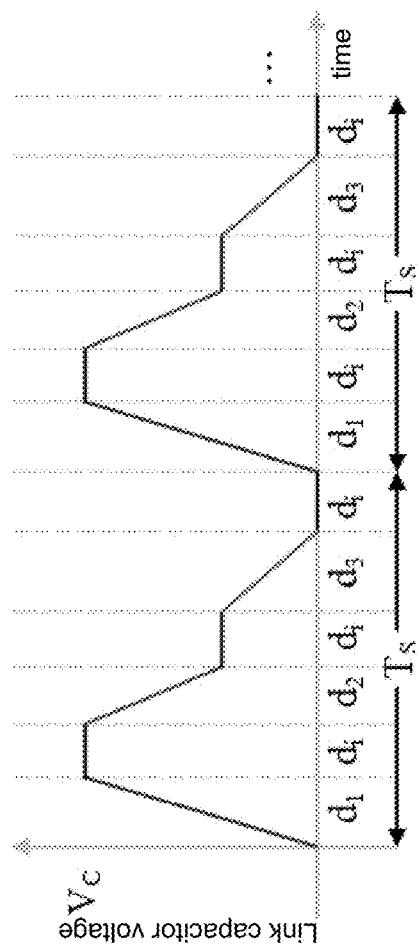
FIG. 14 shows a charging/discharging curve of a link capacitor of the power conversion system of FIG. 13 in accordance with an illustrative embodiment.

During second time interval $d_2$, shown referring to FIG. 14, second ideal current source 1104 is connected to the positive throw of second switch 1106 thereby connecting second ideal current source 1104 to discharge link capacitor 110 to $V_{c2}$. During second time interval $d_2$, $$I_2 = C\frac{dv_c}{dt} = C\frac{V_{c1} - V_{c2}}{d_2 T_s} \quad (5)$$

$$P_2 = \frac{C}{2T_s}[V_{c1}^2 - V_{c2}^2] = -\frac{I_1 I_2 d_1 d_2 T_s}{2C} - \frac{I_2^2 d_2^2 T_s}{2C} \quad (6)$$

where $I_2$ is the current output from second ideal current source 1104, $V_{c2}$ is a remaining capacitor voltage at an end of $d_2$, and $P_2$ is an average net power transferred from link capacitor 110 to second ideal current source 1104. During third time interval $d_3$, shown referring to FIG. 14, third ideal current source 1300 is connected to the positive throw of third switch 1302 thereby connecting third ideal current source 1300 to discharge link capacitor 110 from $V_{c2}$ to zero. During third time interval $d_3$, $$I_3 = C\frac{dv_c}{dt} = C\frac{V_{c2} - 0}{d_3 T_s} \quad (7)$$

$$P_3 = \frac{C}{2T_s}V_{c2}^2 = \frac{I_3^2 d_3^2 T_s}{2C} \quad (8)$$

where $I_2$ is the current output from second ideal current source 1104, and $P_3$ is an average net power transferred from link capacitor 110 to third ideal current source 1300. It can be observed that since both the current sources $I_2$ and $I_3$ discharge the capacitor, currents $I_2$ and $I_3$ and powers $P_2$ and $P_3$ are positive. For balanced power, $I_1d_1+I_2d_2+I_3d_3=0$.

Determining the duty ratio of the positive throws of first switch 1102, second switch 1106, and third switch 1302 for the desired power transfer can be derived using Equations 2, 6, and 8 as $$d_1 = \sqrt{-\frac{2CP_1}{T_s I_1^2}} \quad (9)$$

$$d_2 = -\frac{I_1 d_1}{I_2}\left[1 - \sqrt{1 + \frac{P_2}{P_1}}\right] \quad (10)$$

$$d_3 = \sqrt{\frac{2CP_3}{T_s I_3^2}} \quad (11)$$

In the topology of FIG. 13, as another option, a power transfer could take place from first ideal current source 1100 and second ideal current source 1104 to third ideal current source 1300. As a result, first ideal current source 1100 and second ideal current source 1104 provide energy and third ideal current source 1300 consumes energy.

Again first switch 1102, second switch 1106, and third switch 1302 operate in a repetitive manner with a regulated duty ratio each switching period $T_s$. In every high frequency switching cycle, first ideal current source 1100 and second ideal current source 1104 supply energy to link capacitor 110 during first time interval $d_1$ and second time interval $d_2$, shown referring to FIG. 15.

During first time interval $d_1$, $$I_1 = C\frac{dv_c}{dt} = C\frac{0 - V_{c1}}{d_1 T_s} \quad (12)$$

$$P_1 = -\frac{C}{2T_s}V_{c1}^2 = -\frac{I_1^2 d_1^2 T_s}{2C} \quad (13)$$

where $I_1$ is the current output from first ideal current source 1100, and $P_1$ is an average net power transferred to link capacitor 110 from first ideal current source 1100. It can be observed that both $I_1$ and $P_1$ are negative since current source $I_1$ charges link capacitor 110.

Figure 15:
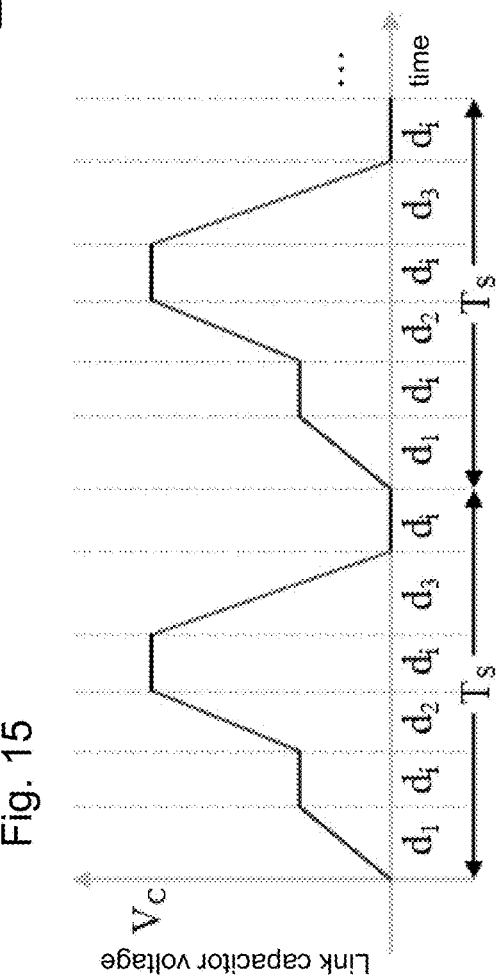
FIG. 15 shows a charging/discharging curve of a link capacitor of the power conversion system of FIG. 13 in accordance with a second illustrative embodiment.

During second time interval $d_2$ of FIG. 15, $$I_2 = C\frac{dv_c}{dt} = C\frac{V_{c1} - V_{c2}}{d_2 T_s} \quad (14)$$

$$P_2 = \frac{C}{2T_s}[V_{c1}^2 - V_{c2}^2] = -\frac{I_1 I_2 d_1 d_2 T_s}{2C} - \frac{I_2^2 d_2^2 T_s}{2C} \quad (15)$$

here $I_2$ is the current output from second ideal current source 1104, $V_{c2}$ is a capacitor voltage at an end of $d_2$, and $P_2$ is an average net power transferred to link capacitor 110 from second ideal current source 1104.

During third time interval $d_3$, shown referring to FIG. 15, second ideal current source 1104 is connected to the positive throw of second switch 1106 thereby connecting second ideal current source 1104 to discharge link capacitor 110 to zero. During third time interval $d_3$, $$I_3 = C\frac{dv_c}{dt} = C\frac{V_{c2} - 0}{d_3 T_s} \quad (16)$$

$$P_3 = \frac{C}{2T_s}V_{c2}^2 = \frac{I_3^2 d_3^2 T_s}{2C} \quad (17)$$

where $I_3$ is the current output from third ideal current source 1104, and $P_3$ is an average net power transferred from link capacitor 110 to third ideal current source 1300. It can be observed that since the current source $I_2$ charges link capacitor 110, $I_2$ and $P_2$ are negative. Since the current source $I_3$ discharges link capacitor 110, $I_3$ and $P_3$ are positive. For balanced power, $$I_1d_1 + I_2d_2 + I_3d_3 = 0.$$

Determining the duty ratio of the positive throws of first switch 1102, second switch 1106, and third switch 1302 for the desired power transfer of FIG. 15 can be derived using Equations 13, 15, and 17 as $$d_1 = \sqrt{-\frac{2CP_1}{T_s I_1^2}} \quad (18)$$

$$d_2 = -\frac{I_1 d_1}{I_2}\left[1 - \sqrt{1 + \frac{P_2}{P_1}}\right] \quad (19)$$

$$d_3 = \sqrt{\frac{2CP_3}{T_s I_3^2}} \quad (20)$$

While the illustrations of FIGS. 11 and 13 discuss a switching sequence for converter 106 for two to three subsystems, the approach can be extended to incorporate converters with any number of subsystems.

Figure 16:
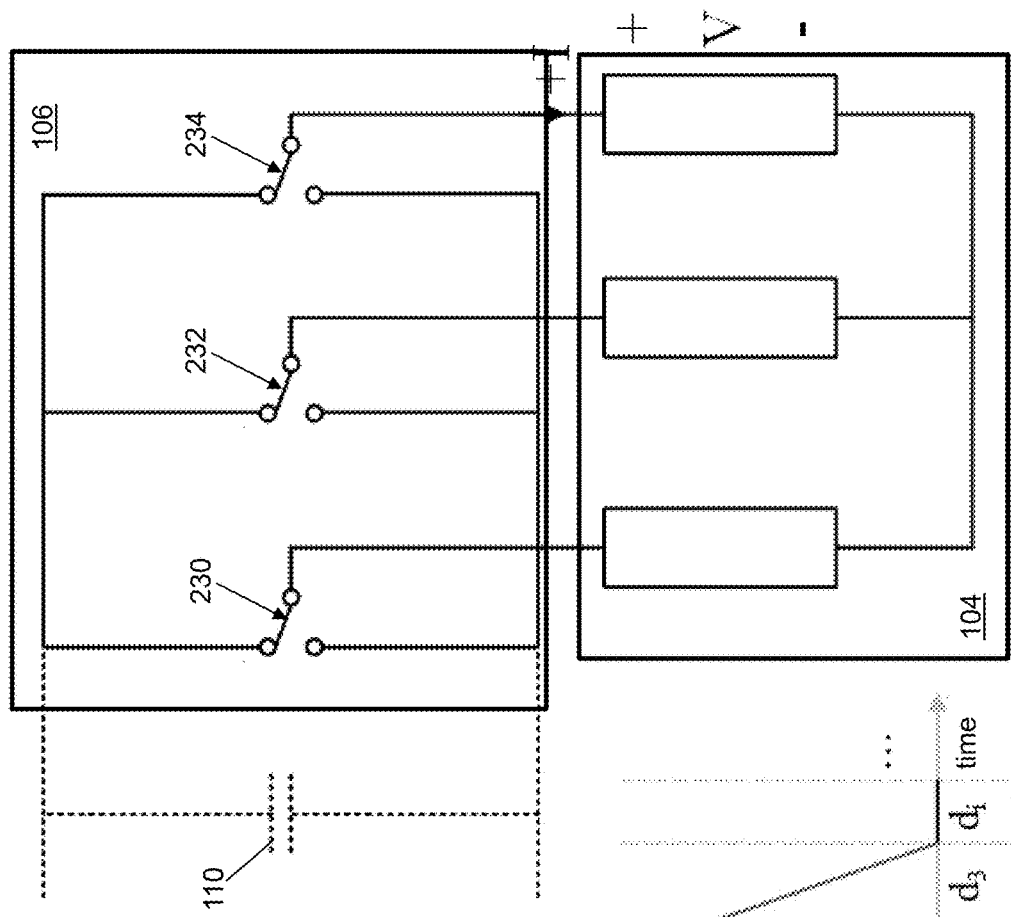
FIG. 16 is a block diagram of a simplified equivalent of a load system implemented for a three-phase AC system interfaced to the link capacitor through the converter in accordance with an illustrative embodiment.

A simplified equivalent of load system 104 implemented for a three-phase AC system interfaced to link capacitor 110 through converter 106 is shown in FIG. 16. At any instant of time, one of the throws of each of first half-bridge 230, second half-bridge 232, and third half-bridge 234 are closed (enabled, turned on). As discussed with reference to FIG. 5, if all of the positive throws of first half-bridge 230, second half-bridge 232, and third half-bridge 234 are turned on simultaneously, or if all of the negative throws of first half-bridge 230, second half-bridge 232, and third half-bridge 234 are turned on simultaneously, load system 104 is isolated from link capacitor 110. Conversely, if all of the positive and negative throws are not in the same position simultaneously, there is net current flow to or from load system 104. In such cases, based on the magnitude and direction of the currents in each of the three phases of load system 104, the entire three-phase subsystem of load system 104 presents itself as a single current source or load at that particular instant of time.

Furthermore, since the switching frequency of converter 106 is several orders of magnitude higher than the AC output frequency, an AC current can be assumed to be constant during each high frequency switching cycle, which forms a foundation for extending the DC subsystem modulation approach presented above to a multi-phase source or load system.

Every multi-phase AC system operates at a particular power factor. For example, the resistive load of FIG. 5 operates at a unity power factor. The power factor determines whether the AC system is supplying power or consuming power at that instant of time, regardless of the direction of the overall power flow. In other words, a certain amount of power (a.k.a. reactive power) is delivered by the multi-phase system to the external circuit which is taken back by the system without affecting the overall average or real power exchange.

Figure 17A:
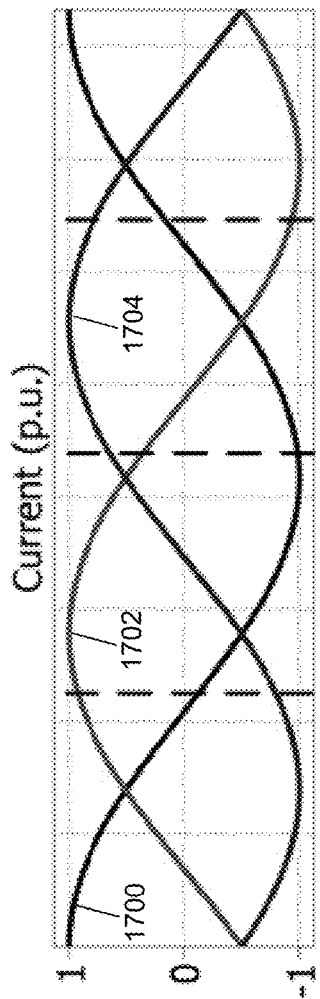
FIG. 17a shows a three-phase balanced set of sinusoidal current waveforms in accordance with an illustrative embodiment.
Figure 17B:
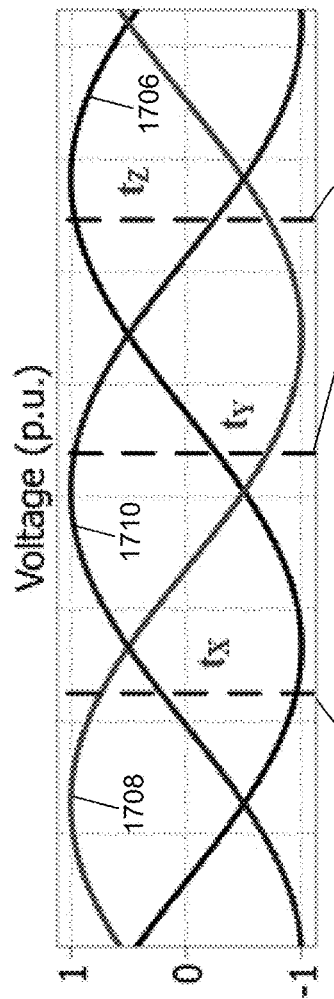
FIG. 17b shows a three-phase balanced set of sinusoidal voltage waveforms in accordance with an illustrative embodiment.
Figure 17C:
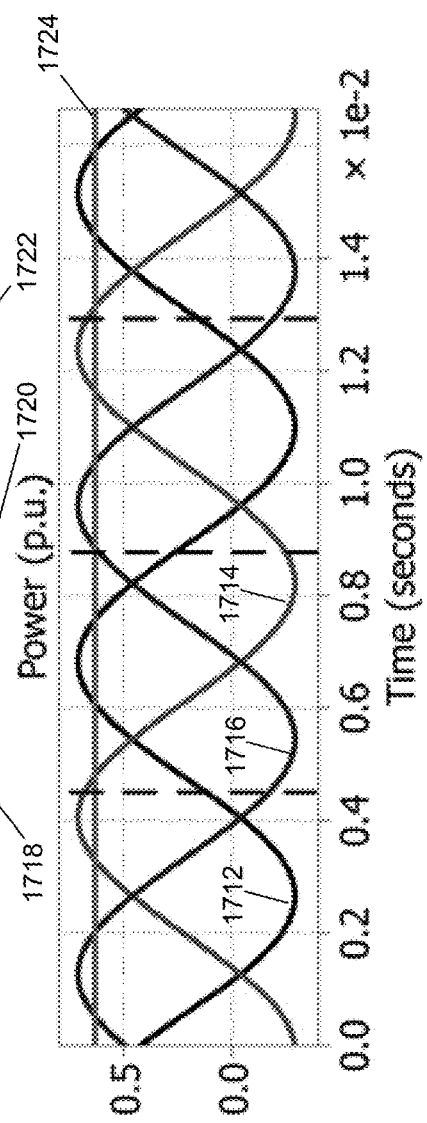
FIG. 17c shows a three-phase balanced set of sinusoidal power waveforms in accordance with an illustrative embodiment.

For illustration, a first-phase current curve 1700, a second-phase current curve 1702, and a third-phase current curve 1704 are shown in FIG. 17a. A first-phase voltage curve 1706, a second-phase voltage curve 1708, and a third-phase voltage curve 1710 are shown in FIG. 17b. A first-phase power curve 1712, a second-phase power curve 1714, and a third-phase power curve 1716 are shown in FIG. 17c that result from first-phase current curve 1700, second-phase current curve 1702, and third-phase current curve 1704 in combination with first-phase voltage curve 1706, second-phase voltage curve 1708, and third-phase voltage curve 1710. The illustrative current and voltage waveforms operate at a particular power factor. FIG. 17c further includes an average real power curve 1724. Referring to FIGS. 17a and 17b, a power factor angle between the voltage and current vectors, denoted φ, is less than 90 degrees indicating that the three-phase AC system illustrated by FIGS. 17a-17c is consuming power so that converter 106 is in an inverter mode of operation.

Figure 18:
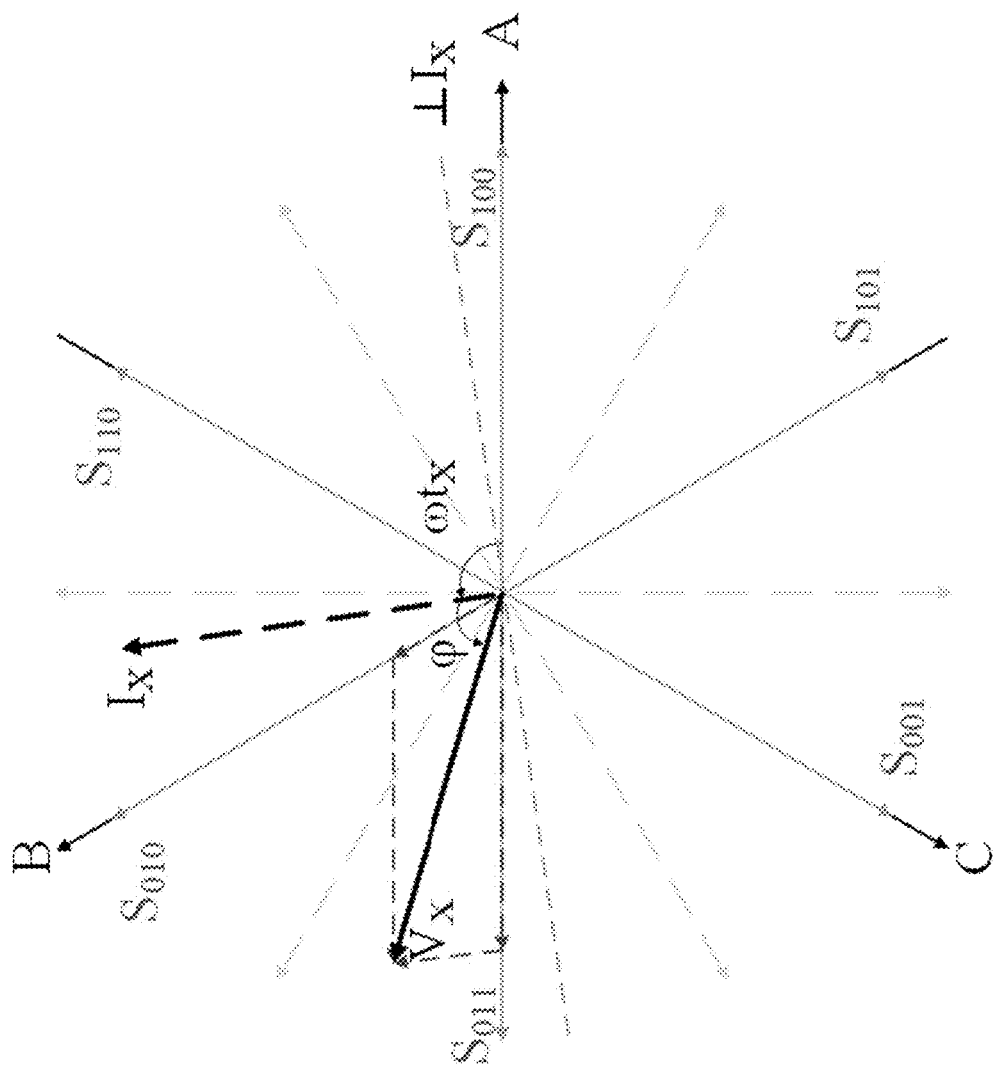
FIGS. 18-20 show vector parallelograms for three voltage and current vectors at different times in FIGS. 17a and 17b in an ABC space vector plane in accordance with an illustrative embodiment.
Figure 19:
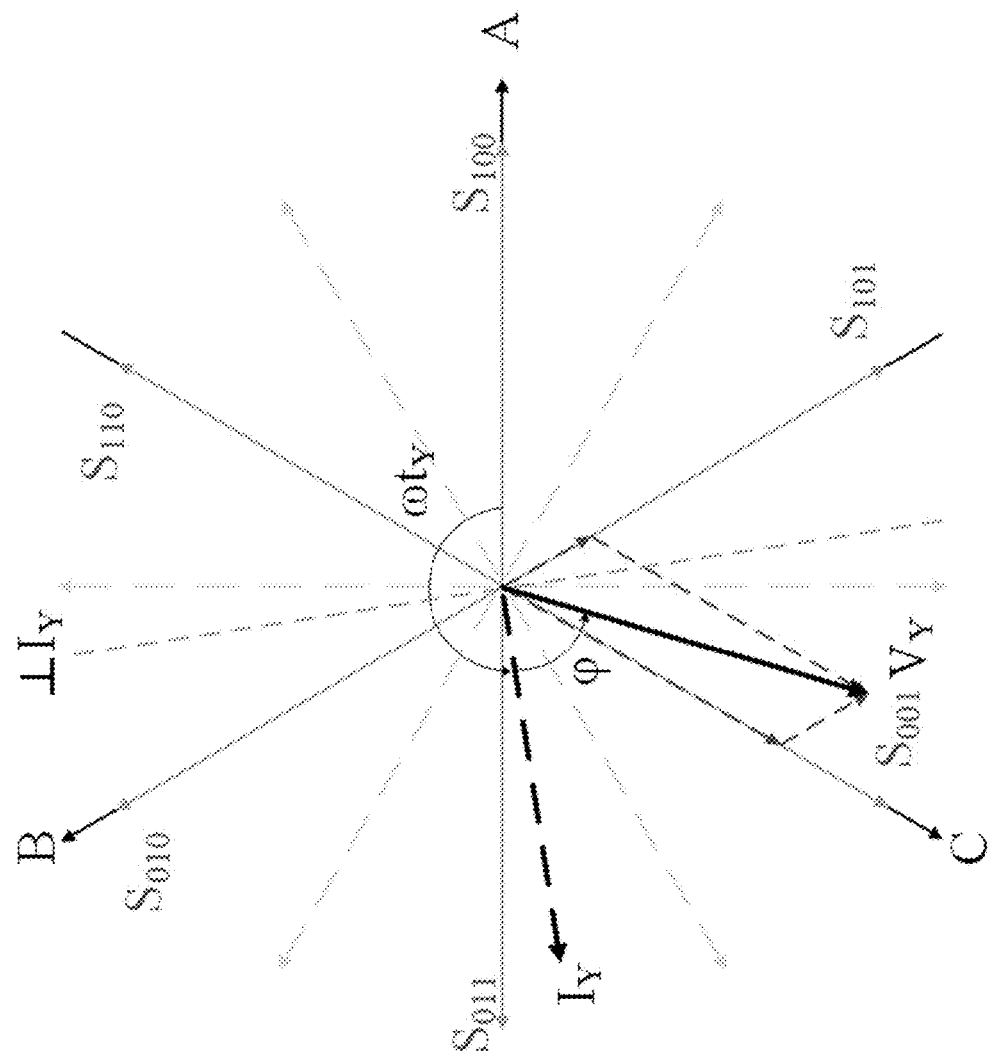
Figure 20:
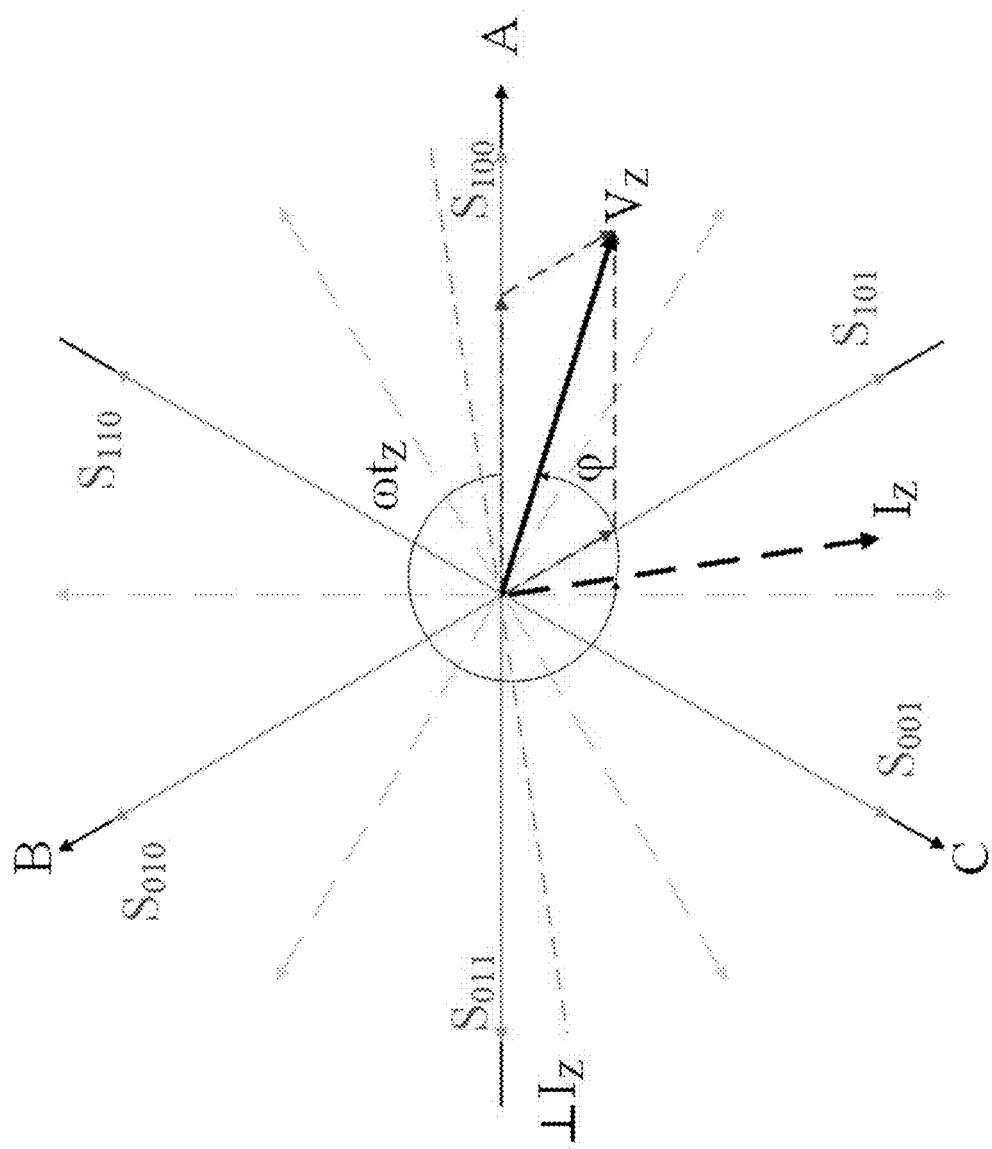

To visualize the selection of switch positions for first half-bridge 230, second half-bridge 232, and third half-bridge 234 to ensure an appropriate transfer of power to the three-phase AC system, it is convenient to view the three-phase voltage and current waveforms as being generated by space vectors rotating at a nominal angular frequency co of the three-phase AC system. Such representation is illustrated in FIG. 18 at a first time instant 1718, $t_x$, (shown referring to FIG. 17b) and shows the current vector $I_x$ and voltage vector $V_x$. Such representation is illustrated in FIG. 19 at a second time instant 1720, $t_y$, (shown referring to FIG. 17b) and shows the current vector $I_y$ and voltage vector $V_y$. Such representation is illustrated in FIG. 20 at a third time instant 1722, $t_z$, (shown referring to FIG. 17b) and shows the current vector $I_z$ and voltage vector $V_z$. In the ABC space vector plane of FIGS. 18-20, the individual phase currents and voltages are simply the projections of the respective current and voltage space vector on the A, B, and C axes respectively. The current and voltage vectors together move counter-clockwise with the progression of time. As the space vector rotates, it traverses six different sectors (I-VI) that are delineated by the A, B and C axis. Six switch vectors are indicated as $S_{100}$, $S_{110}$, $S_{010}$, $S_{011}$, $S_{001}$, and $S_{101}$.

The selection of a particular set of positive or negative throws of first half-bridge 230, second half-bridge 232, and third half-bridge 234 leads to application of a particular voltage to the three-phase AC system that is located along six particular directions that lie along the axes of the three phases in positive and negative directions. The labels of the 'switch vectors' $S_{ABC}$ represent the positions of the throws of first half-bridge 230, second half-bridge 232, and third half-bridge 234 that correspond to a particular direction of voltage being applied to the three-phase AC system. For example, $S_{101}$ indicates that first top switch 200 (positive throw) of first half-bridge 230 is closed (enabled, on), second bottom switch 206 (negative throw) of second half-bridge 232 is closed (enabled, on), and third top switch 208 (positive throw) of third half-bridge 234 is closed (enabled, on). As another example, $S_{011}$ indicates that first bottom switch 202 (negative throw) of first half-bridge 230 is closed (enabled, on), second top switch 204 (positive throw) of second half-bridge 232 is closed (enabled, on), and third top switch 208 (positive throw) of third half-bridge 234 is closed (enabled, on). As still another example, $S_{110}$ indicates that first top switch 200 (positive throw) of first half-bridge 230 is closed (enabled, on), second top switch 204 (positive throw) of second half-bridge 232 is closed (enabled, on), and third bottom switch 210 (negative throw) of third half-bridge 234 is closed (enabled, on).

An axis perpendicular to the current vector bisects the ABC space vector plane into two half-planes. Selection of any of the three switch vectors that lie on the half-plane in which the current vector is located lead to discharging the link capacitor, while selection of the three switch vectors on the other half plane lead to charging the link capacitor. On this basis, switch vectors may be termed discharging and charging switch vectors.

To ensure the right amount of power flow in the three-phases during each switching period, the state of the switches for the three-phases is determined and the corresponding switch vectors selected accordingly. There are multiple choices of switch vectors that may be selected to obtain the desired voltage vector. The choice of switch vector combinations may be made depending on the desired application requirements which may be limited by a peak voltage across link capacitor 110, to minimize losses in converter 106, by a duty ratio behavior, etc. The simplest choice of the switch vectors which will provides the desired voltage vector, and thus, the desired power throughput can be the two switch vectors that are nearest to the desired voltage vector in the space vector plane. For example, at first time instant 1718, $t_x$, switch vectors $S_{011}$ and $S_{010}$ may be selected; at second time instant 1720, $t_y$, switch vectors $S_{101}$ and $S_{001}$ may be selected; and, at third time instant 1722, $t_z$, switch vectors $S_{101}$ and $S_{100}$ may be selected. The desired voltage vector may also be obtained from other non-nearest voltage vector choices.

Let these vectors be designated as $S_{XYZ}$ and $S_{LMN}$, respectively. These vectors complete the vector triangle desired to reach the output voltage vector at each time instant. The vector parallelogram corresponding to the choices are shown in FIGS. 18-20 using dashed arrows. A correspondence between the nearest switch vector choices and the three voltage waveforms may be established by examining FIG. 17*b*. For example, at the instant $t_x$, second-phase (e.g., B-phase) voltage curve 1708 is the highest and first-phase (e.g., A-phase) voltage curve 1706 is the lowest, while third-phase (e.g., C-phase) voltage curve 1710 is in between. Correspondingly, the choices of vectors in this sector, $S_{011}$ and $S_{010}$, leads to second top switch 204 of second half-bridge 232 selected to be on throughout the modulation interval, first bottom switch 202 of first half-bridge 230 selected to be on throughout the modulation interval, while third half-bridge 234 is selected to alternate between third top switch 208 on and third bottom switch 210 on.

Figure 21B:
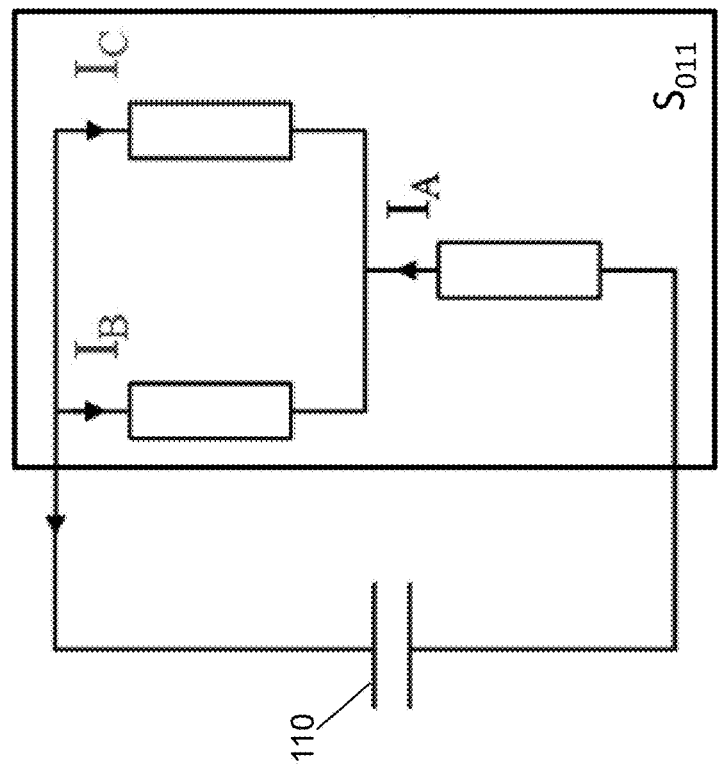
FIGS. 21a-21c show various converter configuration models associated with switch vectors having two positive throws on in accordance with an illustrative embodiment.
Figure 21A:
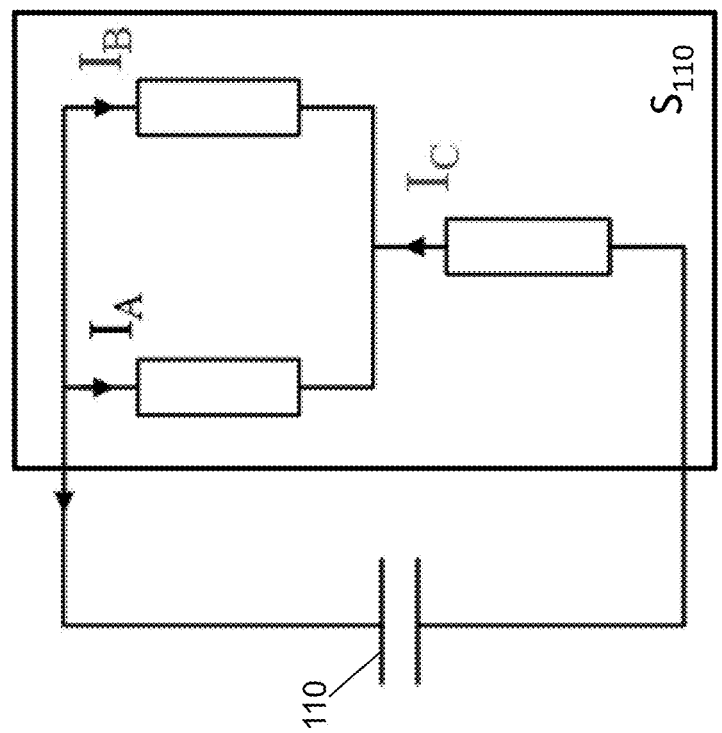
Figure 22A:
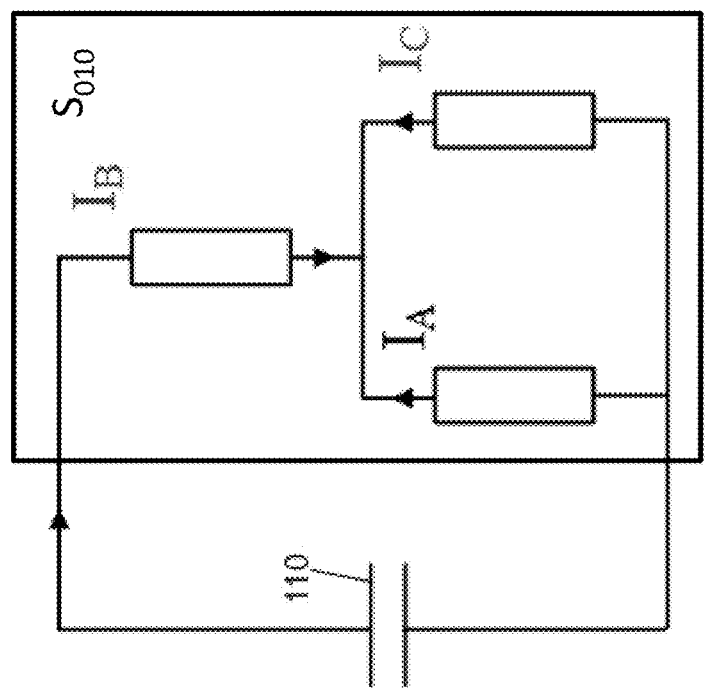
FIGS. 22a-22c show various converter configuration models associated with switch vectors having one positive throw on in accordance with an illustrative embodiment.
Figure 21C:
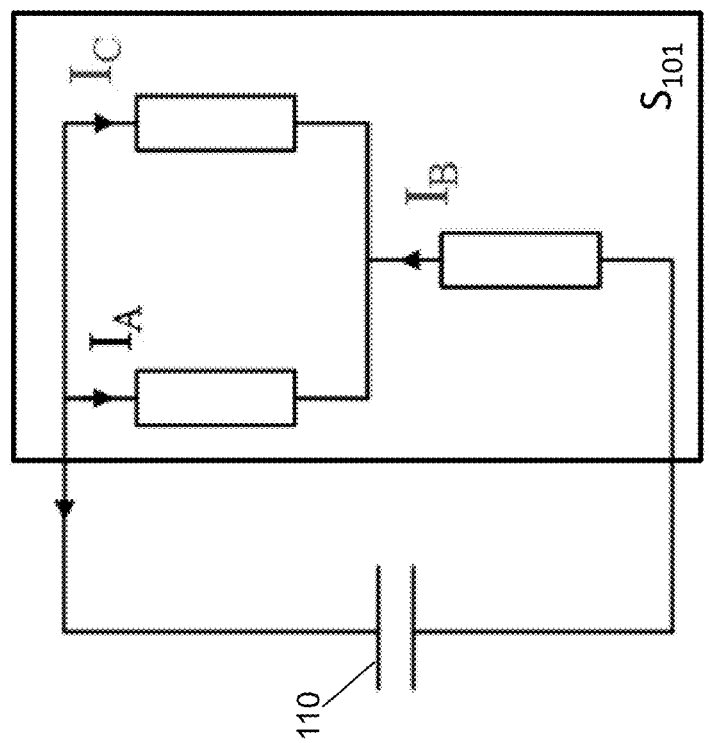
Figure 22C:
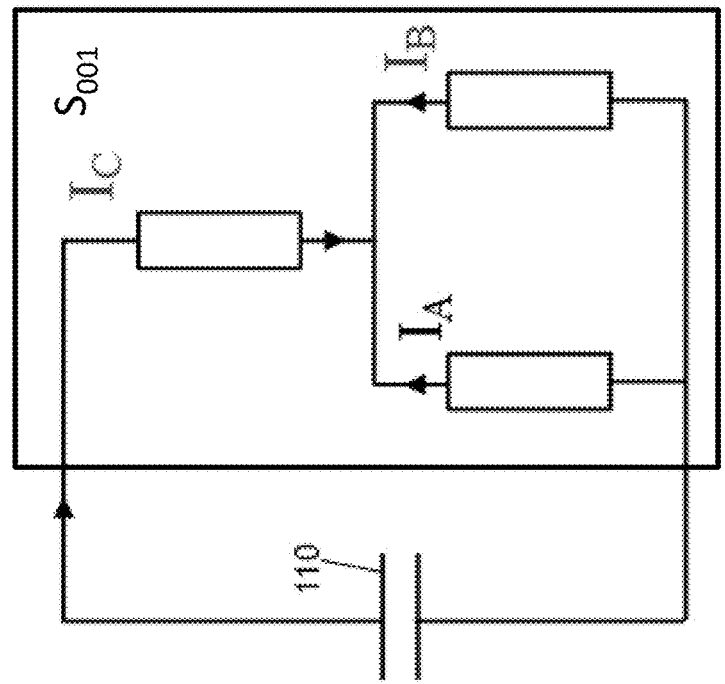
Figure 22B:
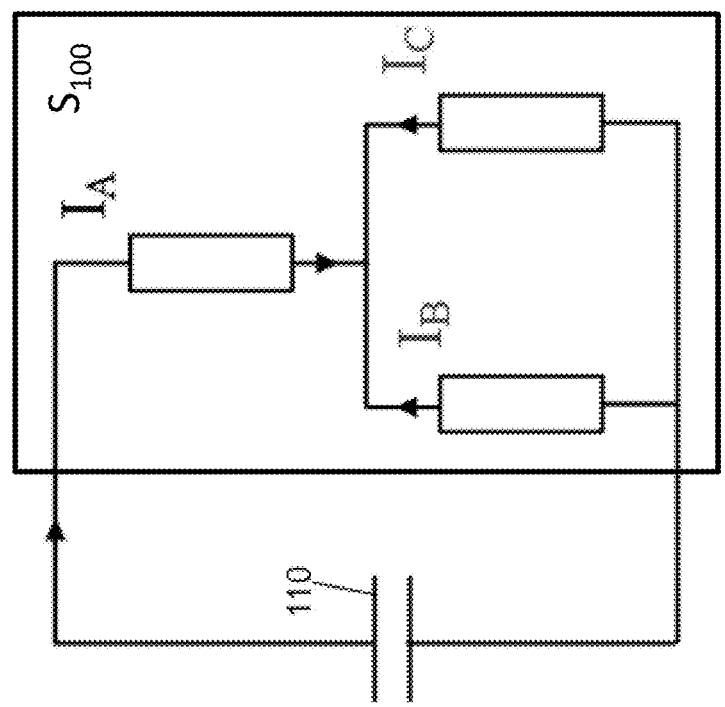

Each of the six switch vectors can be defined. FIG. 21*a* shows the switch vector selection $S_{011}$ connected to link capacitor 110, FIG. 21*b* shows the switch vector selection $S_{110}$ connected to link capacitor 110, and FIG. 21*c* shows the switch vector selection $S_{101}$ connected to link capacitor 110. FIG. 22*a* shows the switch vector selection $S_{010}$ connected to link capacitor 110, FIG. 22*b* shows the switch vector selection $S_{100}$ connected to link capacitor 110, and FIG. 22*c* shows the switch vector selection $S_{001}$ connected to link capacitor 110. Of course, a fewer or a greater number of switch vectors may be defined for a fewer or a greater number of phases.

As another example, at the instant $t_y$, third-phase voltage curve 1710 is the highest and second-phase voltage curve 1708 is the lowest, while first-phase voltage curve 1706 is in between. Correspondingly, the choices of vectors in this sector, $S_{101}$ and $S_{001}$, leads to third top switch 208 of third half-bridge 234 selected to be on throughout the modulation interval, second bottom switch 206 of second half-bridge 232 selected to be on throughout the modulation interval, while first half-bridge 230 is selected to alternate between first top switch 200 on and first bottom switch 202 on.

As yet another example, at the instant $t_z$, first-phase voltage curve 1706 is the highest and second-phase voltage curve 1708 is the lowest, while third-phase voltage curve 1710 is in between. Correspondingly, the choices of vectors in this sector, $S_{100}$ and $S_{101}$, leads to first top switch 200 of first half-bridge 230 selected to be on throughout the modulation interval, second bottom switch 206 of second half-bridge 232 selected to be on throughout the modulation interval, while third half-bridge 234 is selected to alternate between third top switch 208 on and third bottom switch 210 on.

For an inverter mode of operation, the switch vectors, $S_{XYZ}$ and $S_{LMN}$, may be two discharge vectors or one charge vector and one discharge vector. Similarly, in a rectifier mode of operation, the switch vectors, $S_{XYZ}$ and $S_{LMN}$, may be two charge vectors or one may be a charge vector and the other a discharge vector. The sequence of selecting the switch voltage vectors, $S_{XYZ}$ and $S_{LMN}$, may also vary. The choice of selecting the switch vectors and ordering their sequence may depend on a power factor of the AC subsystem, a duty ratio (may be too small or large), a rate of change of voltage vector, etc.

The equivalent DC current during a first switch vector $S_{XYZ}$ can be represented by $I_\alpha$, which can take values $I_A$, $I_B$, or $I_C$, depending on the switch combination represented by XYZ. Similarly, the equivalent DC current during a second switch vector $S_{LMN}$ can be represented by $I_\beta$, which can take values $I_A$, $I_B$, or $I_C$, depending on the switch combination represented by LMN. Similarly, the equivalent power transferred to or from the three-phase AC system can be designated as $P_{XYZ}$ and $P_{LMN}$ for switch vector selection $S_{XYZ}$ and $S_{LMN}$, respectively, and calculated as $$P_{XYZ} = 2P_\alpha + \frac{I_\alpha}{I_\beta} P_\beta \quad (21)$$

$$P_{LMN} = 2P_\beta + \frac{I_\beta}{I_\alpha} P_\alpha \quad (22)$$

where $P_\alpha$ and $P_\beta$ are the powers supplied or consumed by the corresponding $\alpha$ and $\beta$ phases, respectively. Here, $\alpha$ refers to a lone dissimilarly connected phase of the three phases XYZ, and $\beta$ refers to a lone dissimilarly connected phase of the three phases LMN.

For example, at the instant of time $t_y$, selection of XYZ to be 101 leads to $\alpha$=B, phase B being the dissimilarly connected phase, since the other phases A and C are connected together to the top throw. Similarly, selection of LMN to be 001 makes $\beta$=C. Therefore $$I_\alpha = p|I_B| \quad (23)$$

$$I_\beta = p|I_C| \quad (24)$$

$$P_{XYZ} = 2P_B + \frac{I_B}{I_C} P_C \quad (25)$$

$$P_{LMN} = 2P_C + \frac{I_C}{I_B} P_B \quad (26)$$

where p=−1 for charging switch vectors, and p=1 for discharging switch vectors.

Figure 23:
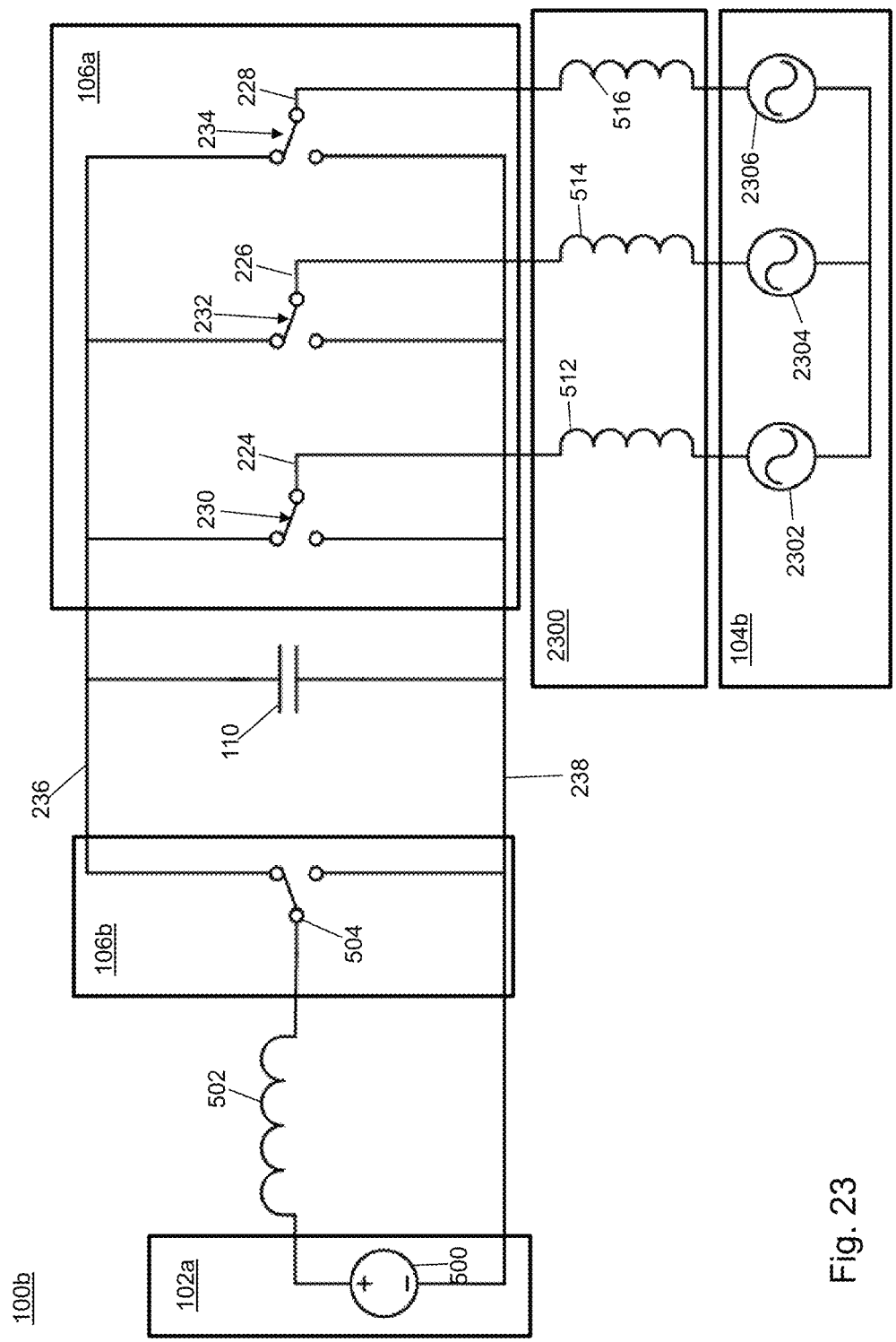
FIG. 23 is a block diagram of a second power conversion system in accordance with an illustrative embodiment.

Referring to FIG. 23, a circuit diagram of a second power conversion system 100b is shown in accordance with a second illustrative embodiment. Second power conversion system 100b may include first power source system 102a, a second load system 104b, first converter 106a, second converter 106b, conversion controller 108 (not shown in FIG. 23), an inductive filter 2300, and link capacitor 110. Second load system 104b includes a multi-phase AC load with a unity or a non-unity power factor. For illustration, second load system 104b includes a first-phase AC load 2302, a second-phase AC load 2304, and a third-phase AC load 2306.

Inductive filter 2300 is connected between first converter 106a and second load system 104b. Inductive filter 2300 includes first inductor 512, second inductor 514, and third inductor 516. First inductor 512 is connected on first-phase line 224 between first half-bridge 230 and first-phase AC load 2302. Second inductor 514 is connected on second-phase line 226 between second half-bridge 232 and second-phase AC load 2304. Third inductor 516 is connected on third-phase line 228 between third half-bridge 234 and third-phase AC load 2306.

As stated previously if DC power source 500 is connected to link capacitor 110 of FIG. 23, $$d_C = V_{in}\sqrt{-\frac{2C}{P_{in}T_s}}.$$

After an optional idle interval of time, the energy in link capacitor 110 is directed to second load system 104b by sequentially selecting $S_{XYZ}$ and $S_{LMN}$. As before, during these intervals, DC power source 500 is disconnected from link capacitor 110. Depending on the relative location of the current and voltage vectors at the particular instant of time, and the selection of $S_{XYZ}$ and $S_{LMN}$, in the inverter mode of operation, one of the switch vectors, $S_{XYZ}$ and $S_{LMN}$, may lead to charging or discharging link capacitor 110, while the other switch vector always leads to discharging link capacitor 110. The voltage across link capacitor 110 in each of these cases is illustrated in FIGS. 24 and 25, respectively.

Figure 24:
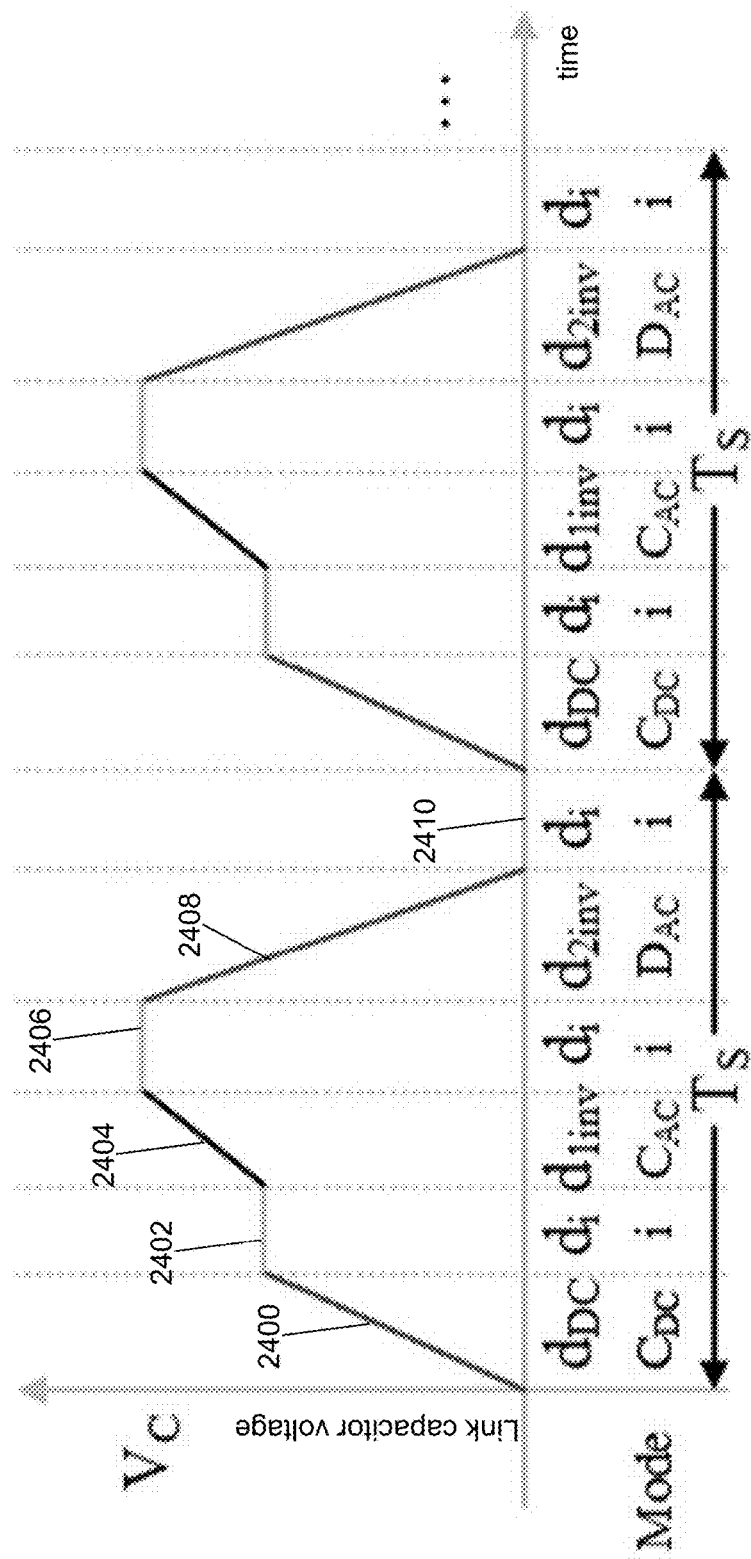
FIG. 24 shows a charging/discharging curve of a link capacitor of the power conversion system of FIG. 23 in accordance with a first illustrative embodiment.

For example, in FIG. 24, a DC charging curve 2400 indicates a charge of link capacitor 110 by DC power source 500 ($C_{DC}$) followed by a first idle interval 2402. First idle interval 2402 is followed by an AC load charge curve 2404 as defined by selection of first switch vector, $S_{XYZ}$ ($C_{AC}$). AC load charge curve 2404 is followed by a second idle interval 2406. Second idle interval 2406 is followed by an AC load discharge curve 2408 as defined by selection of second switch vector, $S_{LMN}$ ($D_{AC}$). AC load discharge curve 2408 is followed by a third idle interval 2410, which completes a first switching period $T_s$. A greater or a fewer number of idle intervals may be included. In an alternative embodiment, AC load charge curve 2404 may be generated before DC charging curve 2400.

Figure 25:
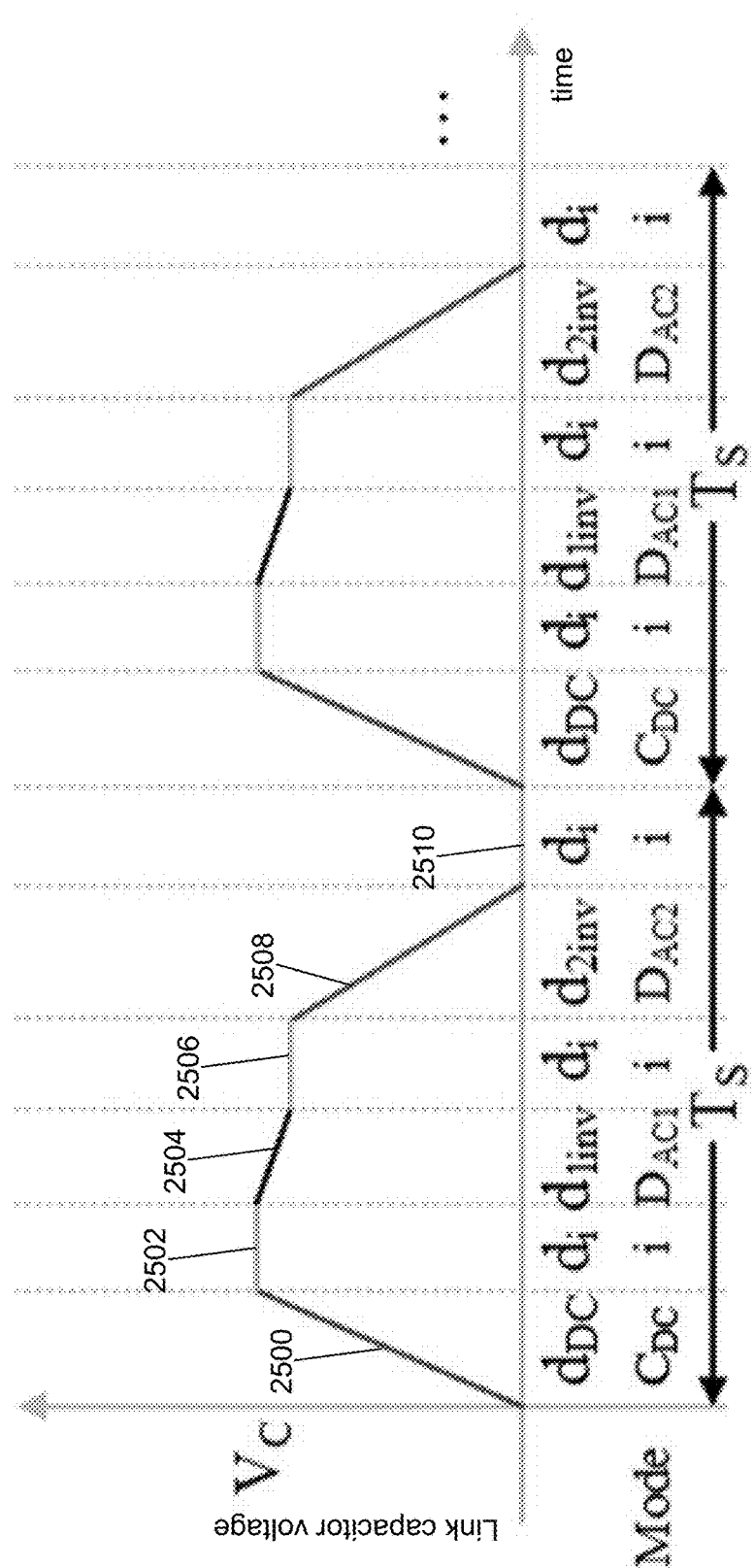
FIG. 25 shows a charging/discharging curve of a link capacitor of the power conversion system of FIG. 23 in accordance with a second illustrative embodiment.

For example, in FIG. 25, a DC charging curve 2500 indicates a charge of link capacitor 110 by DC power source 500 ($C_{DC}$) followed by a first idle interval 2502. First idle interval 2502 is followed by a first AC load discharge curve 2504 as defined by selection of first switch vector, $S_{XYZ}$ ($D_{AC1}$). First AC load discharge curve 2504 is followed by a second idle interval 2506. Second idle interval 2506 is followed by a second AC load discharge curve 2508 as defined by selection of second switch vector, $S_{LMN}$ ($D_{AC2}$). Second AC load discharge curve 2508 is followed by a third idle interval 2510, which completes a first switching period $T_s$. As power conversion system 100 source and load demands change as a function of time, discharge and charge curves change to satisfy the demands by changing the selected switch vector and interval length for each charge and/or discharge interval. Again, a greater or a fewer number of idle intervals may be included.

In the case illustrated in FIG. 18, at instant $t_x$, both the nearest switch vectors $S_{011}$ and $S_{010}$ discharge link capacitor 110. In this case, the capacitor voltage may be illustrated by FIG. 25. In the other case illustrated in FIG. 19, at instant $t_y$, one of the nearest switch vectors $S_{101}$ is charging, while the other one is discharging. In this case, the capacitor voltage may be illustrated by FIG. 24 in this case. In yet another case illustrated in FIG. 20, at instant $t_z$, both the nearest switch vectors $S_{100}$ and $S_{101}$ discharge link capacitor 110. In this case, the capacitor voltage may be illustrated by FIG. 25.

During the inverter mode of operation, the three-phase AC load discharges or charges link capacitor 110 before discharging link capacitor 110. The current, $I_\alpha$, can be an equivalent of current $I_2$ described above. Therefore, an equation for the duty ratio for first switch vector $S_{XYZ}$ can be determined based on equations (10) and (19) as:

$$d_{1inv} = \frac{\sqrt{-2CP_{in1}}}{\sqrt{T_s}\,I_\alpha}\left[1 - \sqrt{1 + \frac{P_{XYZ}}{P_{in1}}}\right] \quad (27)$$

where $I_\alpha$ and $P_{XYZ}$ are positive for the discharge mode and negative for the charge mode. $P_{XYZ}$ can be substituted into equation (27) using Equation (21) to define the duty ratio as $$d_{1inv} = \frac{\sqrt{-2CP_{in1}}}{\sqrt{T_s}\,I_\alpha}\left[1 - \sqrt{1 + \frac{2P_\alpha + \frac{I_\alpha}{I_\beta}P_\beta}{P_{in1}}}\right] \quad (28)$$

The current $I_\beta$ can be an equivalent of current $I_3$ described above. Therefore, an equation for the duty ratio for second switch vector $S_{LMN}$ can be determined based on equations (11) and (20) as:

$$d_{2inv} = \frac{\sqrt{2CP_{LMN}}}{\sqrt{T_s I_\beta^2}} \quad (29)$$

where and $I_\beta$ and $P_{LMN}$ are positive. $P_{LMN}$ can be substituted into equation (29) using Equation (22) to define the duty ratio as $$d_{2inv} = \sqrt{\frac{2C\left[2P_\beta + \frac{I_\beta}{I_\alpha}P_\alpha\right]}{T_s I_\beta^2}} \quad (30)$$

Figure 26A:
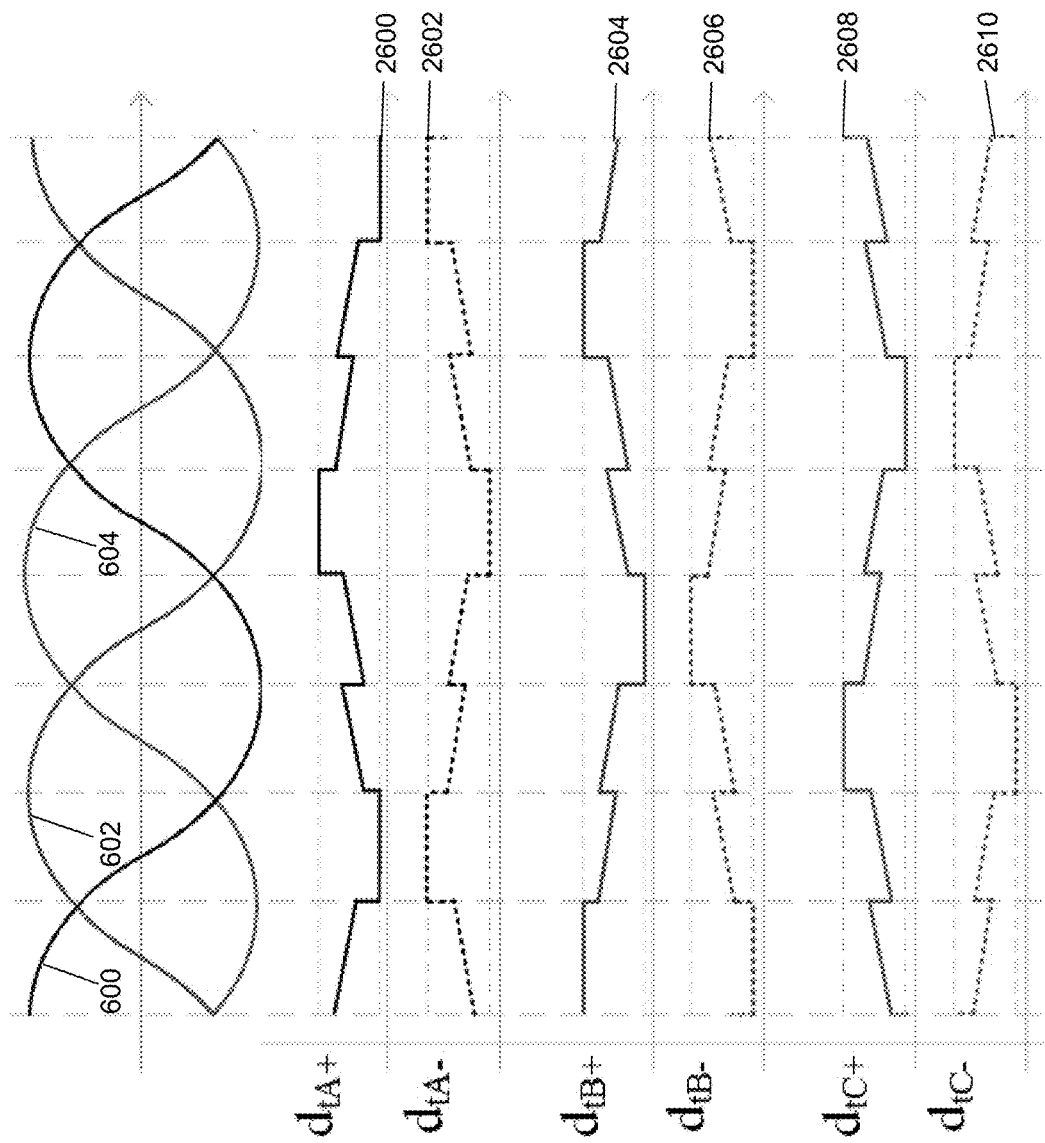
FIG. 26a shows a variation of duty ratio of the positive and negative throws of the converter of the second power conversion system of FIG. 23 in accordance with a first illustrative embodiment.

As the three-phase waveforms unfold through rotation of the current and voltage vectors in the space vector plane, first switch vector $S_{XYZ}$ and second switch vector $S_{LMN}$ and the duty ratio for each is determined for each high-frequency switching cycle. FIG. 26a illustrates the typical waveforms of the duty ratio behavior of the positive and negative throws of first half-bridge 230, of second half-bridge 232, and of third half-bridge 234 for an entire power frequency period for first-phase waveform 600, second-phase output waveform 602, and third-phase output waveform 604 of a general case of one nearest and another second nearest switch vector. A first duty ratio curve 2600a shows a variation in duty ratio of first top switch 200. A second duty ratio curve 2602a shows a variation in duty ratio of first bottom switch 202, which is an inverse of first duty ratio curve 2600a. A third duty ratio curve 2604a shows a variation in duty ratio of second top switch 204. A fourth duty ratio curve 2606a shows a variation in duty ratio of second bottom switch 206, which is an inverse of third duty ratio curve 2604a. A fifth duty ratio curve 2608a shows a variation in duty ratio of third top switch 208. A sixth duty ratio curve 2610a shows a variation in duty ratio of third bottom switch 210, which is an inverse of fifth duty ratio curve 2608a.

Figure 26B:
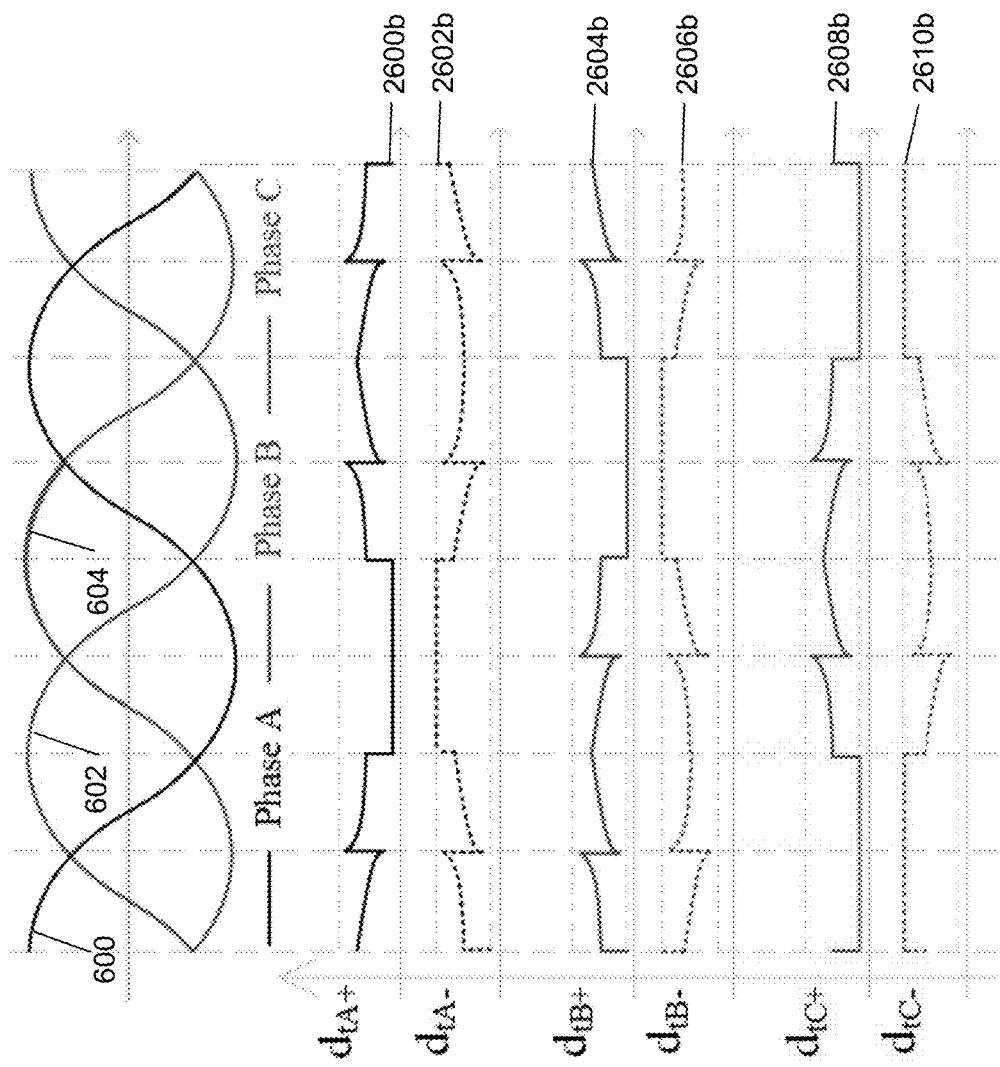
FIG. 26b shows a variation of duty ratio of the positive and negative throws of the converter of the second power conversion system of FIG. 23 in accordance with a second illustrative embodiment.

FIG. 26b illustrates another case of typical waveforms of the duty ratio behavior of the positive and negative throws of first half-bridge 230, of second half-bridge 232, and of third half-bridge 234 for an entire power frequency period for first-phase waveform 600, second-phase output waveform 602, and third-phase output waveform 604 of a general case of the nearest switch vectors. A first duty ratio curve 2600b shows a variation in duty ratio of first top switch 200. A second duty ratio curve 2602b shows a variation in duty ratio of first bottom switch 202, which is an inverse of first duty ratio curve 2600b. A third duty ratio curve 2604b shows a variation in duty ratio of second top switch 204. A fourth duty ratio curve 2606b shows a variation in duty ratio of second bottom switch 206, which is an inverse of third duty ratio curve 2604b. A fifth duty ratio curve 2608b shows a variation in duty ratio of third top switch 208. A sixth duty ratio curve 2610b shows a variation in duty ratio of third bottom switch 210, which is an inverse of fifth duty ratio curve 2608b.

Referring to FIG. 26a and FIG. 26b, one may observe the duty ratio behavior dependence on the approach for choosing the switch vectors. It may be seen that, the duty ratios consist of linear segments in case of an approach that favors the choice of the second and third nearest switch vectors instead of the two nearest vectors. Referring to FIG. 18, when $V_X$ is aligned too close to $S_{011}$ choice of $S_{011}$ could lead to an unreasonable amount of duty ratio for the state $S_{011}$, while the complimentary state could have too small of a duty ratio. Such cases may be avoided through appropriate selection of switch vectors. In inverter applications where capacitor voltage may be limited by an upper bound, a choice of two discharge vectors instead of one charge and one discharge vector may be preferable. Similarly, in rectifier applications where capacitor voltage may be limited to an upper bound, a choice of one charge vector and one discharge vector instead of two charge vectors may be preferable.

Figure 27:
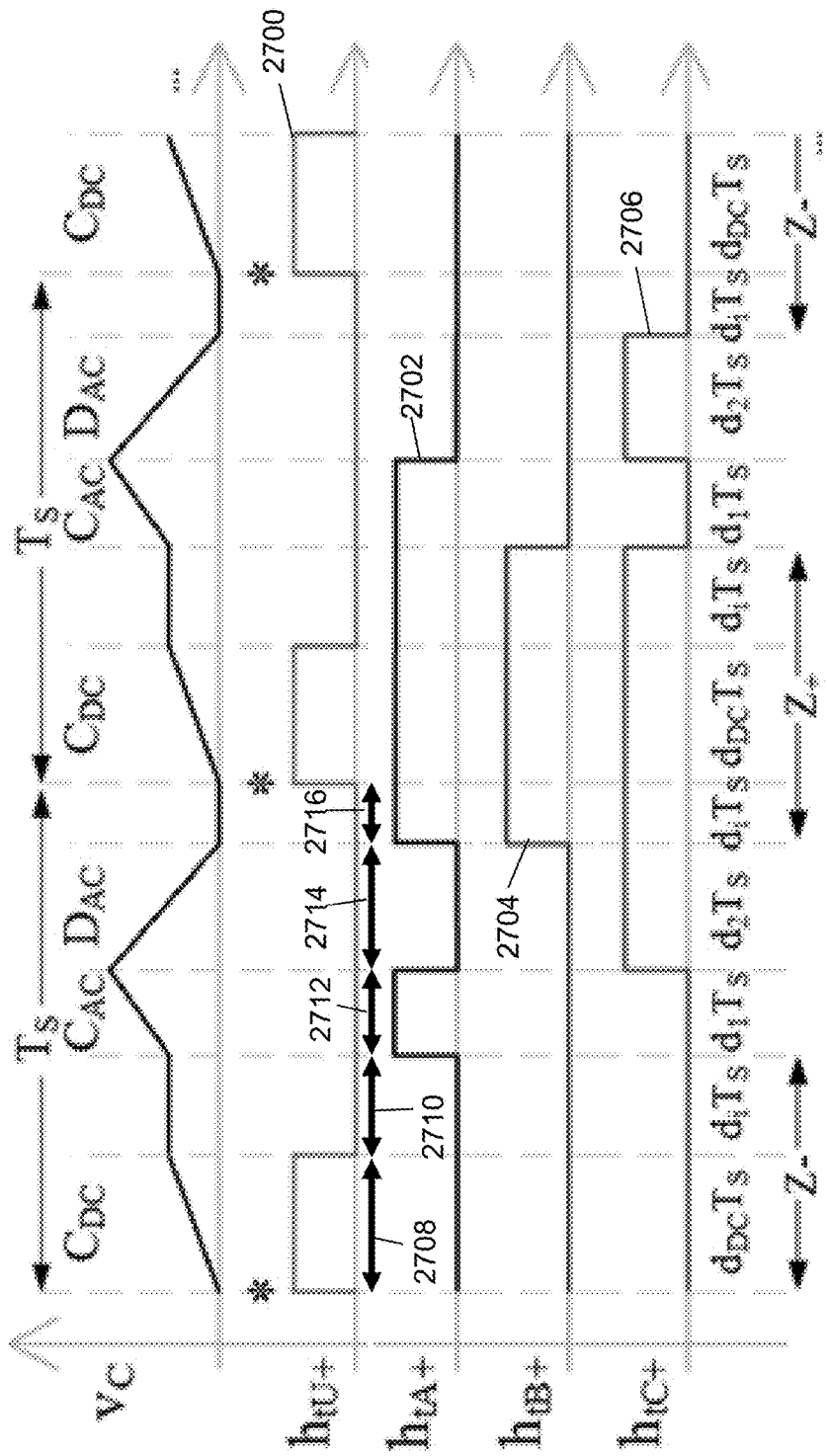
FIG. 27 shows switching functions to achieve the appropriate switch throws in accordance with a first illustrative embodiment.

Referring to FIG. 27, switching functions are shown to achieve the appropriate switch throws for first switch vector $S_{XYZ}$ selected as $S_{100}$, and second switch vector $S_{LMN}$ selected as $S_{001}$. A first switching function curve 2700 defines a switching function for source control switch 504. A second switching function curve 2702 defines a switching function for first top switch 200. A third switching function curve (not shown) defines a switching function for first bottom switch 202, which is an inverse of the switching function for first top switch 200. A fourth switching function curve 2704 defines a switching function for second top switch 204. A fifth switching function curve (not shown) defines a switching function for second bottom switch 206, which is an inverse of the switching function for second top switch 204. A sixth switching function curve 2706 defines a switching function for third top switch 208. A seventh switching function curve (not shown) defines a switching function for third bottom switch 210, which is an inverse of the switching function for third top switch 208.

A first time interval 2708 shows the DC charge interval $C_i$. A second time interval 2710 shows an optional idle time interval. A third time interval 2712 shows an AC charge interval for first switch vector $S_{XYZ}$ selected as $S_{100}$. A fourth time interval 2714 shows an AC discharge interval for second switch vector $S_{LMN}$ selected as $S_{001}$. A fifth time interval 2716 shows an optional idle time interval before a start of a next switching period. As discussed previously, second time interval 2710 and fifth time interval 2716 may be distributed as a dead time between the charge and discharge intervals, and/or between third time interval 2712 and fourth time interval 2714 as desired without affecting waveform synthesis. The switching periods may toggle between $Z_+$ and $Z_-$ switching periods as discussed previously.

Figure 28:
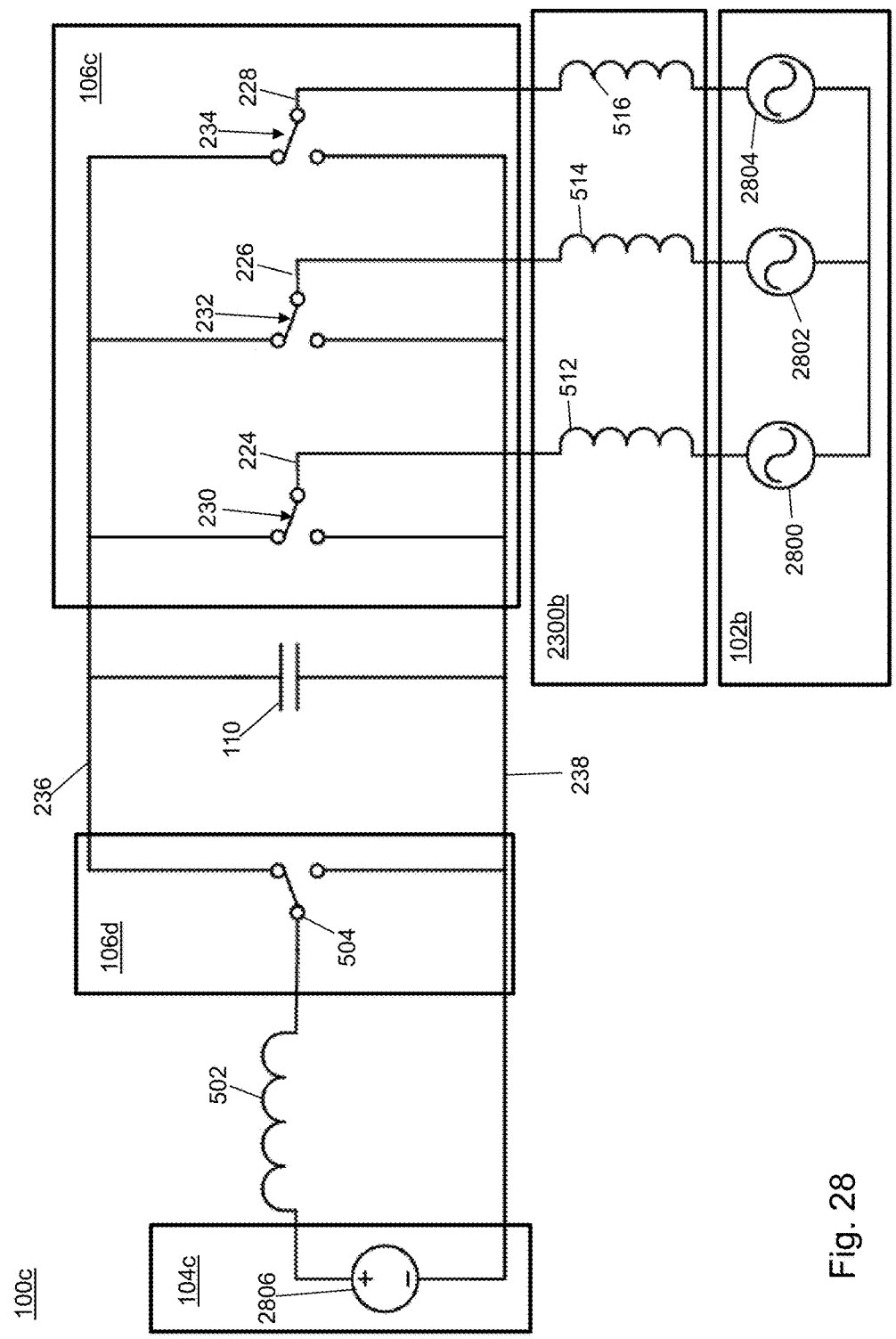
FIG. 28 is a block diagram of a third power conversion system in accordance with an illustrative embodiment.

Referring to FIG. 28, a circuit diagram of a third power conversion system 100c is shown in accordance with a third illustrative embodiment. Third power conversion system 100c may include a second power source system 102b, a third load system 104c, a third converter 106c, a fourth converter 106d, conversion controller 108 (not shown in FIG. 28), a second inductive filter 2300b, and link capacitor 110. Third converter 106c of FIG. 28 may be identical to first converter 106a of FIG. 23, but is connected to act as an AC-DC converter or rectifier. Fourth converter 106d of FIG. 28 may be identical to second converter 106b of FIG. 23, but is connected to act as an AC-DC converter or rectifier. Second power source system 102b includes a multi-phase AC power source. For illustration, second power source system 102b includes a first-phase AC power source 2800, a second-phase AC power source 2802, and a third-phase AC power source 2804. Second inductive filter 2300b may be identical to inductive filter 2300 though connected between second converter 106c and second power source system 102b. First inductor 512 is connected on first-phase line 224 between first half-bridge 230 and first-phase AC power source 2800. Second inductor 514 is connected on second-phase line 226 between second half-bridge 232 and second-phase AC power source 2802. Third inductor 516 is connected on third-phase line 228 between third half-bridge 234 and third-phase AC power source 2804.

Third load system 104c includes a DC load 2806. Fourth converter 106d includes inductor 502 and source control switch 504. Inductor 502 and source control switch 504 are connected in series with DC load 2806. Link capacitor 110 is connected in parallel with third converter 106c and fourth converter 106d between top line 236 and bottom line 238. Source control switch 504 is connected to discharge link capacitor 110 in the first position illustrated in FIG. 28 and to disconnect DC load 2806 from link capacitor 110 when in the second position.

Second power source system 102b charges link capacitor 110 while DC load 2806 is disconnected from link capacitor 110. Once second power source system 102b has transferred a predetermined packet of energy to link capacitor 110, DC load 2806 is connected to link capacitor 110 to consume the power. While directing energy from second power source system 102b to link capacitor 110, third converter 106c forms the desired output voltage and current waveforms by sequentially selecting the switch vectors, $S_{XYZ}$ and $S_{LMN}$, as described above. Depending on the relative locations of the current and voltage vectors at the particular instant of time, and the selection of $S_{XYZ}$ and $S_{LMN}$, in the rectifier mode of operation, one of the switch vectors may lead to charging or discharging link capacitor 110, while the other switch vector always leads to charging link capacitor 110.

The current, $I_\alpha$, can be an equivalent of current $I_1$ described above. Therefore, an equation for the duty ratio for first switch vector $S_{XYZ}$ can be determined based on equations (9) and (18) as:

$$d_{1rec} = \sqrt{-\frac{2CP_{XYZ}}{T_s I_\alpha^2}} \tag{31}$$

where $I_\alpha$ and $P_{XYZ}$ are negative. $P_{XYZ}$ can be substituted into equation (31) using Equation (21) to define the duty ratio as $$d_{1rec} = \sqrt{-\frac{2C}{T_s I_\alpha^2}\left[2P_\alpha + \frac{I_\alpha}{I_\beta}P_\beta\right]} \tag{32}$$

The current $I_\beta$ can be an equivalent of current $I_2$ described above. Therefore, an equation for the duty ratio for second switch vector $S_{LMN}$ can be determined based on equations (10) and (19) as:

$$d_{2rec} = -\frac{I_\alpha d_{1rec}}{I_\beta}\left[1 - \sqrt{1 + \frac{P_{LMN}}{P_{XYZ}}}\right] \tag{33}$$

where $I_\beta$ and $P_{LMN}$ are positive to discharge link capacitor 110 and negative to charge link capacitor 110. $P_{LMN}$ can be substituted into equation (33) using Equation (22) to define the duty ratio as $$d_{2rec} = -\frac{I_\alpha d_{1rec}}{I_\beta}\left[1 - \sqrt{1 + \frac{2P_\beta + \frac{I_\beta}{I_\alpha}P_\alpha}{2P_\alpha + \frac{I_\alpha}{I_\beta}P_\beta}}\right] \tag{34}$$

Figure 29:
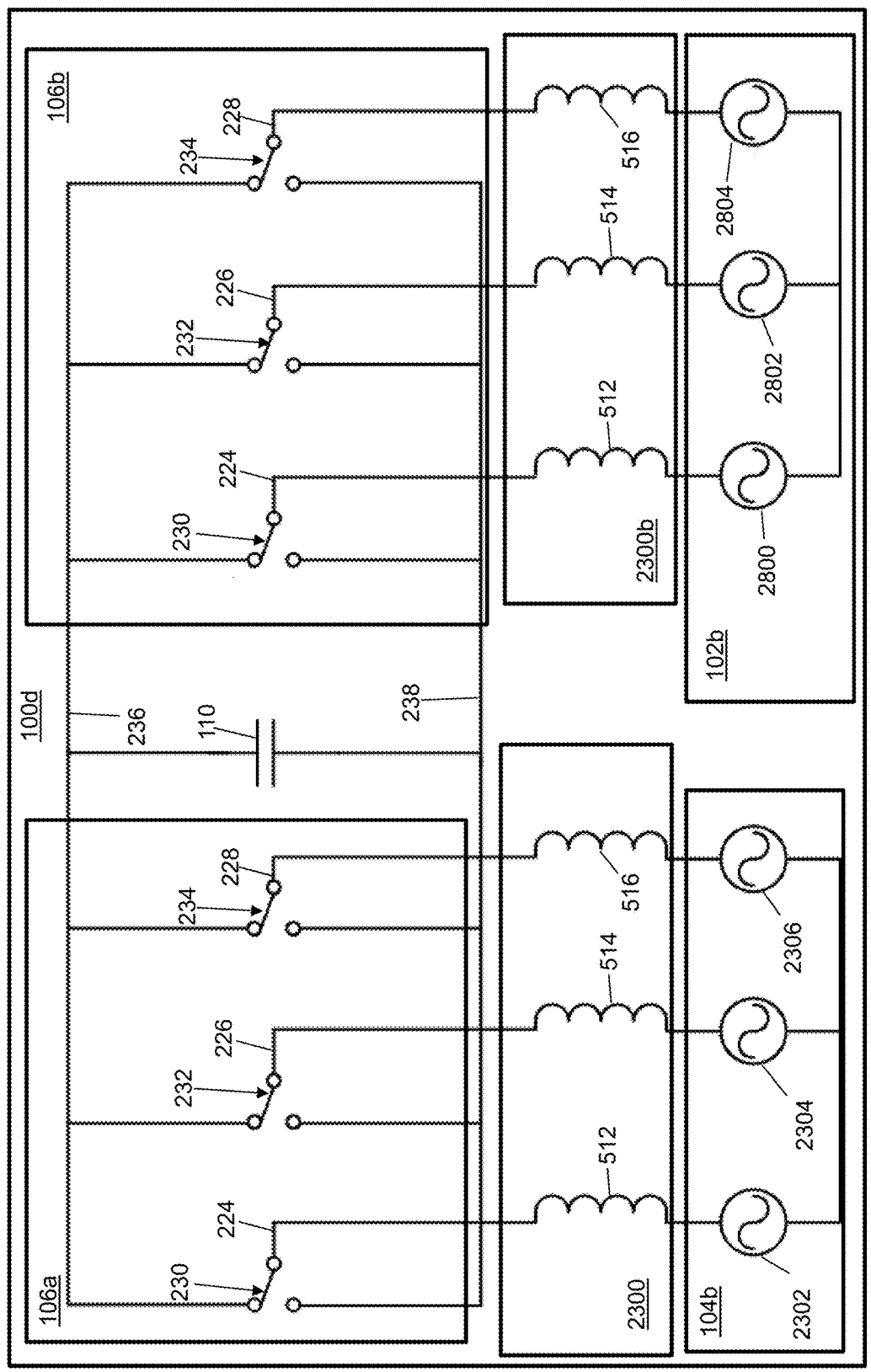
FIG. 29 is a block diagram of a fourth power conversion system in accordance with an illustrative embodiment.

Referring to FIG. 29, a circuit diagram of a fourth power conversion system 100d is shown in accordance with a fourth illustrative embodiment. Fourth power conversion system 100d may include second power source system 102b, second load system 104b, first converter 106a, second converter 106b, conversion controller 108 (not shown in FIG. 28), inductive filter 2300, second inductive filter 2300b, and link capacitor 110. First converter 106a and second converter 106b are connected to conversion controller 108 and implemented as AC-AC converters.

Second power source system 102b may operate at a different frequency than second load system 104b. Second power source system 102b and second load system 104b may alternate between providing power and receiving power or may consistently provide power and consumer power, respectively.

While directing energy from second power source system 102b to link capacitor 110, second converter 106b forms the desired output voltage and current waveforms by sequentially selecting $S_{XYZ}$-s and $S_{LMN}$-s as described above where -s indicates source side variable values. While directing energy from link capacitor 110 to second load system 104b, first converter 106a also forms the desired output voltage and current waveforms by sequentially selecting $S_{XYZ}$-l and $S_{LMN}$-l as described above where -l indicates load side variable values.

Figure 30:
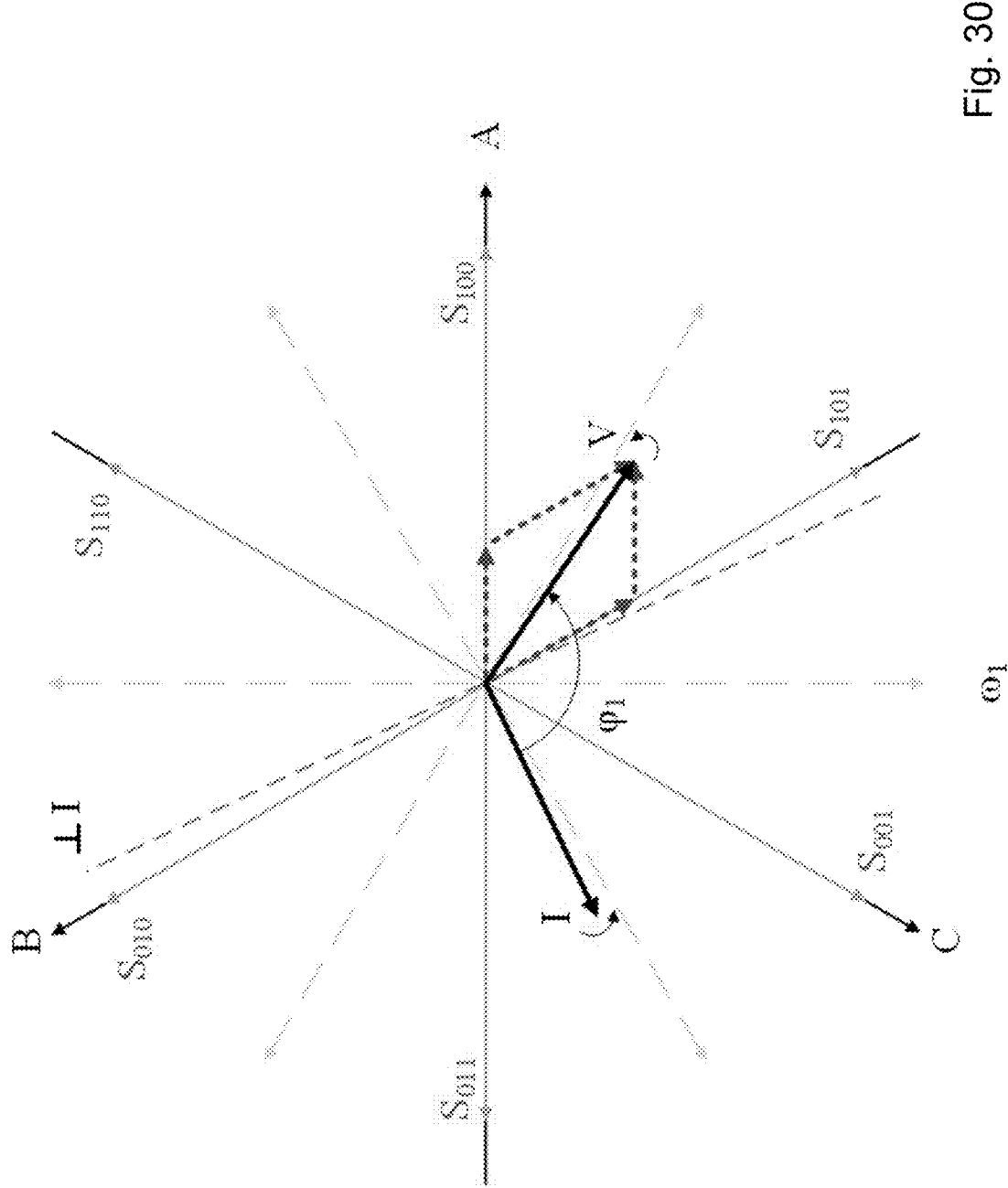
FIG. 30 shows a vector parallelogram for a voltage and current vector in an ABC space vector plane for the fourth power conversion system of FIG. 29 in accordance with an illustrative embodiment.
Figure 31:
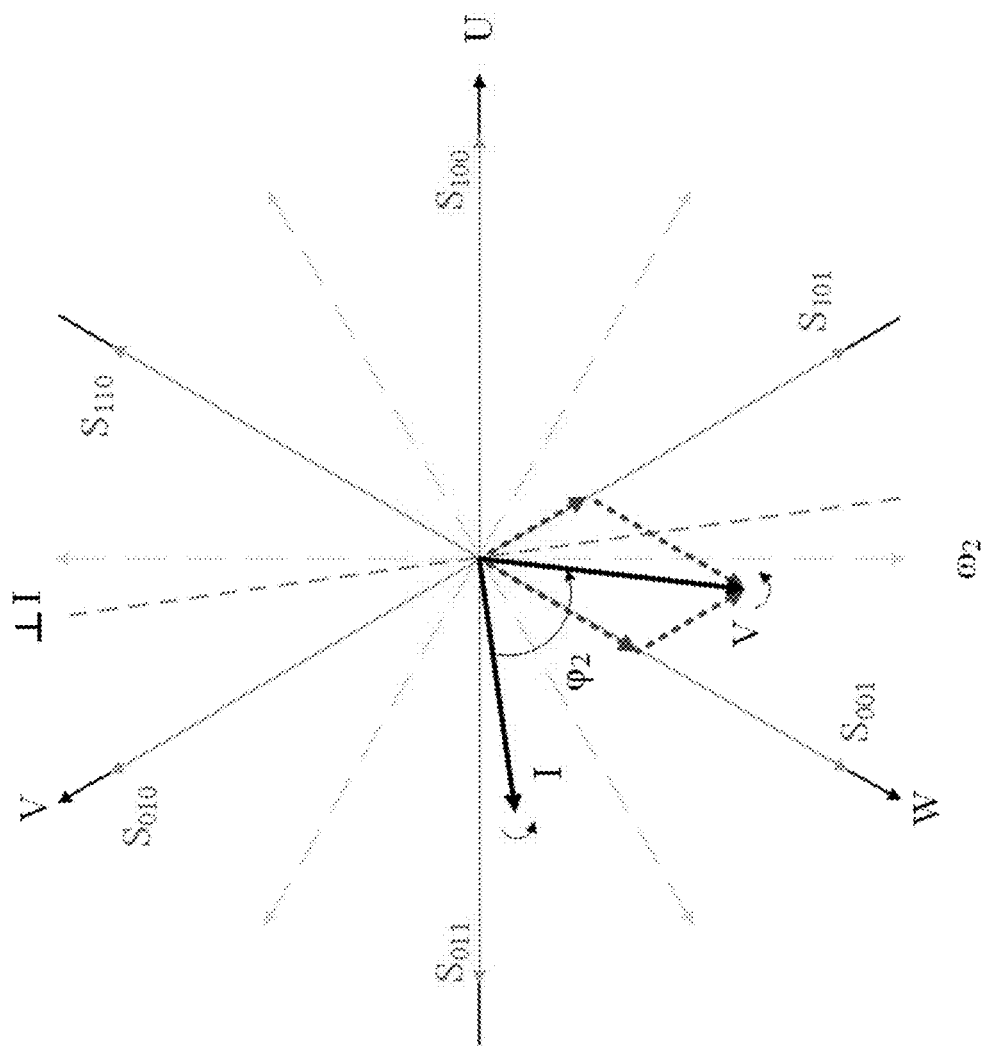
FIG. 31 shows a vector parallelogram for a voltage and current vector in an UVW space vector plane for the fourth power conversion system of FIG. 29 in accordance with an illustrative embodiment.

By examining the relative locations of the current and voltage vectors for second power source system 102b and second load system 104b, one will supply power and one will consume power based on the power factor angle being greater than 90 degrees (supplying power) or being less than 90 degrees (consuming power). For example, FIG. 30 shows the current and voltage for second power source system 102b on an ABC space vector plane at an illustrative time instance, and FIG. 31 shows the current and voltage for second load system 104b on a UVW space vector plane at the same illustrative time instance. For synthesizing the appropriate switch vectors while each of second power source system 102b and second load system 104b is actively engaging in power transfer with link capacitor 110, each of first converter 106a and second converter 106b may again use the nearest switch vectors. For the instant illustrated in FIGS. 30 and 31, the switch vectors selected for second converter 106b are switch vector $S_{101}$ and switch vector $S_{100}$, while the switch vectors selected for first converter 106a are switch vector $S_{101}$ and switch vector $S_{001}$.

Figure 32:
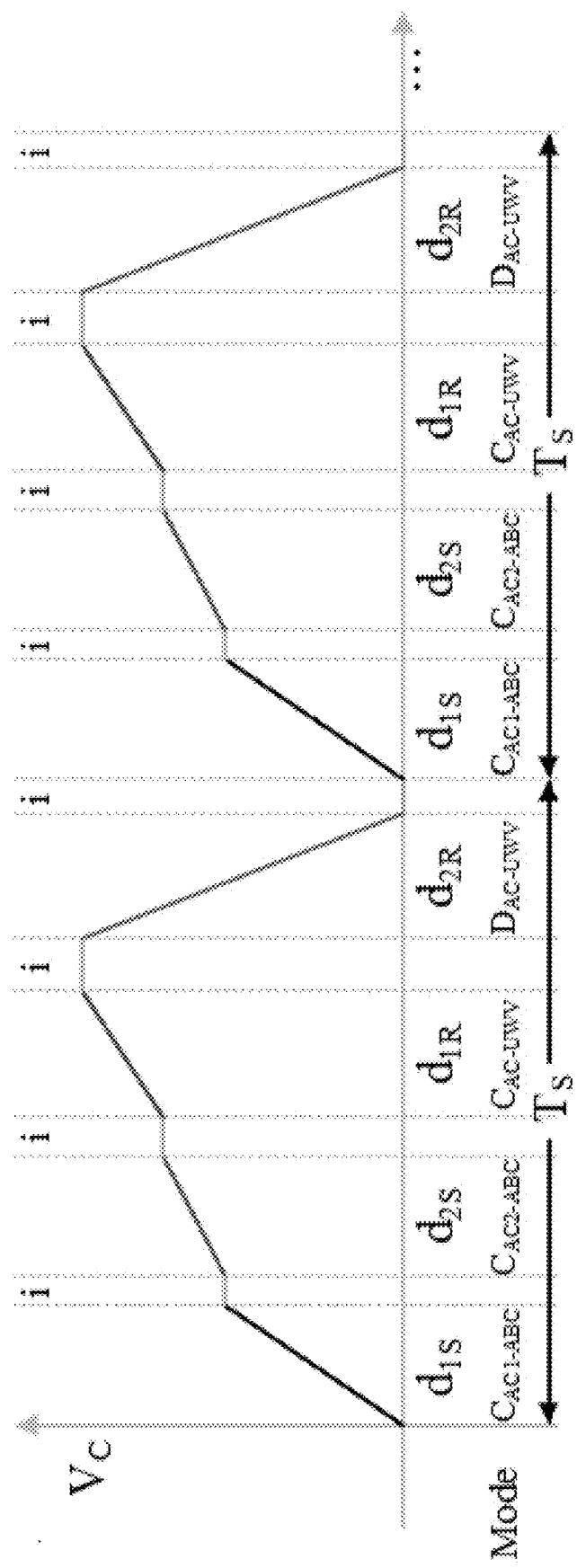
FIG. 32 shows a charging/discharging curve of a link capacitor of the fourth power conversion system of FIG. 29 in accordance with a second illustrative embodiment.

In the case illustrated in FIG. 30, both $S_{100}$ and switch vector $S_{101}$ selected for second power source system 102b lie on the half plane opposite the current vector, and therefore charge link capacitor 110. In the case illustrated in FIG. 31, switch vector $S_{101}$ selected for second load system 104b lies on the half plane opposite the current vector, and therefore charges link capacitor 110, while switch vector $S_{001}$ selected for second load system 104b lies in the same half plane as the current vector, and therefore discharges link capacitor 110. Therefore, the energy transfer sequence followed in this AC to AC converter system may be two charge modes of link capacitor 110 by second power source system 102b and a charge mode and a discharge mode of link capacitor 110 by second load system 104b as illustrated in FIG. 32.

Equations (28), (30), (32), and (34) can be used to define the duty ratios as:

$$d_{1-s} = \sqrt{-\frac{2C}{T_s I_{\alpha-s}^2}\left[2P_{\alpha-s} + \frac{I_{\alpha-s}}{I_{\beta-s}}P_{\beta-s}\right]} \tag{35}$$

$$d_{2-s} = -\frac{I_{\alpha-s}d_{1-s}}{I_{\beta-s}}\left[1 - \sqrt{1 + \frac{2P_{\beta-s} + \frac{I_{\beta-s}}{I_{\alpha-s}}P_{\alpha-s}}{2P_{\alpha-s} + \frac{I_{\alpha-s}}{I_{\beta-s}}P_{\beta-s}}}\right] \tag{36}$$

$$d_{1-l} = \frac{\sqrt{2CP}}{\sqrt{T_s}\,I_{\alpha-l}}\left[1 - \sqrt{1 - \frac{2P_{\alpha-l} + \frac{I_{\alpha-l}}{I_{\beta-l}}P_{\beta-l}}{P}}\right] \tag{37}$$

$$d_{2-l} = \sqrt{\frac{2C}{T_s I_{\beta-l}^2}\left[2P_{\beta-l} + \frac{I_{\beta-l}}{I_{\alpha-l}}P_{\alpha-l}\right]} \tag{38}$$

where P indicates the power transfer between second power source system 102b and second load system 104b, -s indicates source side variable values, and -l indicates load side variable values.

A technique to model AC sources and loads as DC current sources and loads has been described. The technique can be used to incorporate more than two systems in a generalized manner. Link capacitor 110 is connected to at least one source system and at least one load system. A DC subsystem may require at least one sub-interval in each high frequency cycle while an AC subsystem may require at least two sub-intervals in each high frequency cycle to attain a desired operating point.

Each high frequency switching interval can be divided into N sub-intervals where N is based on the number of source and load systems. The link capacitor must be charged during the first sub-interval and discharged during the last sub-interval.

During first time interval $d_1$, $$I_1 = C\frac{dv_c}{dt} = C\frac{0 - V_{c1}}{d_1 T_s} \tag{39}$$

$$P_1 = -\frac{C}{2T_s}V_{c1}^2 = -\frac{I_1^2 d_1^2 T_s}{2C} \tag{40}$$

where $I_1$ is the current output from a first equivalent current source, and $P_1$ is an average net power transferred to link capacitor 110 from the first equivalent current source. It can be observed that both $I_1$ and $P_1$ are negative since link capacitor 110 is charged during the first sub-interval. Hence, $$d_1 = \sqrt{-\frac{2P_1 C}{I_1^2 T_s}}$$

During second time interval $d_2$, $$I_2 = C\frac{dv_c}{dt} = C\frac{V_{c1} V_{c2}}{d_2 T_s} \tag{41}$$

$$P_2 = \frac{C}{2T_s}[V_{c1}^2 - V_{c2}^2] = -\frac{I_1 I_2 d_1 d_2 T_s}{C} - \frac{I_2^2 d_2^2 T_s}{2C} \tag{42}$$

where $I_2$ is the current output from a second equivalent current source/load, $V_{c2}$ is a capacitor voltage at an end of $d_2$, and $P_2$ is an average net power transferred to link capacitor 110 from the second equivalent current source/load. Hence, $$d_2 = -\frac{I_1 d_1}{I_2}\left[1 - \sqrt{1 + \frac{P_2}{P_1}}\right]$$

During third time interval $d_3$, $$I_3 = C\frac{dv_c}{dt} = C\frac{V_{c2} - V_{c3}}{d_3 T_s} \tag{43}$$

$$P_3 = \frac{c}{2T_s}[V_{c2}^2 - V_{c3}^2] = -\frac{I_1 I_3 d_1 d_3 T_s}{C} - \frac{I_2 I_3 d_2 d_3 T_s}{C} - \frac{I_3^2 d_3^2 T_s}{2C} \tag{44}$$

where $I_3$ is the current output from a third equivalent current source, $V_{c3}$ is a capacitor voltage at an end of $d_3$, and $P_3$ is an average net power transferred to link capacitor 110 from the third ideal equivalent current source/load. Hence, $$d_3 = -\frac{(I_1 d_1 + I_2 d_2)}{I_3}\left[1 - \sqrt{1 + \frac{P_3}{P_1 + P_2}}\right]$$

During an $n^{th}$ time interval $d_n$, $$I_n = C\frac{dv_c}{dt} = C\frac{V_{c(n-1)} - V_{cn}}{d_n T_s} \tag{46}$$

$$P_n = \frac{c}{2T_s}[V_{c(n-1)}^2 - V_{cn}^2] \tag{47}$$

where $I_n$ is the current output from an $n^{th}$ equivalent current source, $V_{cn}$ is a capacitor voltage at an end of $d_n$, and $P_n$ is an average net power transferred to link capacitor 110 from the $n^{th}$ ideal equivalent current source/load. Hence, $$d_n = -\frac{\sum_{k=1}^{k=n-1} I_k d_k}{I_n}\left[1 - \sqrt{1 + \frac{P_n}{\sum_{k=1}^{k=n-1} P_k}}\right]$$

During a time interval N $d_N$, $$I_N = C\frac{dv_c}{dt} = C\frac{V_{c(N-1)} - V_{cN}}{d_N T_s} \tag{49}$$

$$P_N = \frac{c}{2T_s}[V_{c(N-1)}^2 - V_{cN}^2] \tag{50}$$

where $I_N$ is the current output from an $N^{th}$ equivalent current source, $V_{cN}$ is a capacitor voltage at an end of $d_N$, and $P_N$ is an average net power transferred to link capacitor 110 from the $N^{th}$ ideal equivalent current source/load. It can be observed that both $I_N$ and $P_N$ are positive since link capacitor 110 is always discharged during the $N^{th}$ sub-interval. Hence, $$d_N = -\frac{\sum_{k=1}^{k=N-1} I_k d_k}{I_N}\left[1 - \sqrt{1 + \frac{P_N}{\sum_{k=1}^{k=N-1} P_k}}\right] = \sqrt{\frac{2P_N C}{I_N^2 T_s}}$$

For power balance, $$\sum_{k=1}^{k=N} I_k d_k = 0$$

The generalization of the duty intervals allows extension of the converters to more than two source and load systems and provides flexibility in ordering of the switch vectors.

Figure 33:
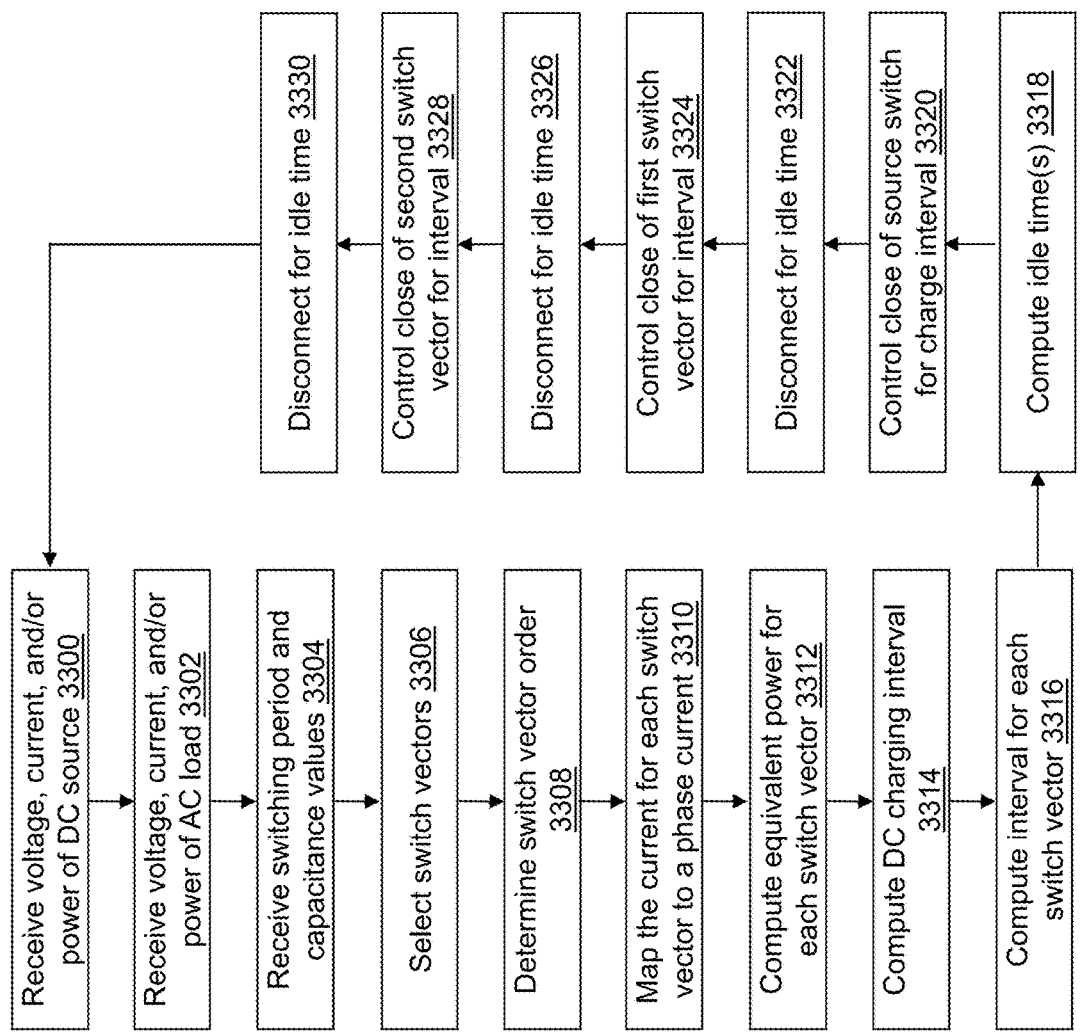
FIGS. 33-36 depict flow diagrams illustrating examples of operations performed by a control application of the converter of the power conversion system of FIG. 1 in accordance with an illustrative embodiment

Referring to FIG. 33, example operations associated with control application 120 are described. Control application 120 may implement converter 106 as a DC-AC inverter, for example, as shown in FIG. 23. Additional, fewer, or different operations may be performed depending on the embodiment. The order of presentation of the operations of FIG. 33 is not intended to be limiting. Although some of the operational flows are presented in sequence, the various operations may be performed in various repetitions, concurrently, and/or in other orders than those that are illustrated. As understood by a person of skill in the art, various operations may be performed in parallel, for example, using a plurality of threads.

In an operation 3300, a voltage, a current, and/or a power of DC power source 500 is received, for example, from source system 102. In alternative embodiments, power conversion system 100 may include a plurality of DC sources. In an illustrative embodiment, the voltage, the current and/or the power may be assumed to be constant such that the voltage, the current and/or the power of DC power source 500 is received only once. For example, the voltage, the current and/or the power of DC power source 500 may be received after a selection from a user interface window or after entry by a user into a user interface window presented under control of control application 120. As another option, the voltage, the current and/or the power of DC power source 500 may be received by reading the respective values from a storage location in computer-readable medium 116. As still another option, the voltage, the current and/or the power of DC power source 500 may be received from DC power source 500 at a startup of power conversion system 100. As yet another option, the voltage, the current and/or the power of DC power source 500 may be dynamic and may be received from DC power source 500 at various time intervals that may or may not be periodic.

In an operation 3302, a voltage, a current, and/or a power of a multi-phase AC load is received, for example, from load system 104. In alternative embodiments, power conversion system 100 may include a plurality of multi-phase AC loads. In an illustrative embodiment, the voltage, the current and/or the power may be assumed to follow a predefined waveform that includes a predefined number of phases at a predefined frequency such that the voltage, the current and/or the power of load system 104 is received only once. For example, the voltage, the current and/or the power of load system 104 may be received after a selection from a user interface window or after entry by a user into a user interface window presented under control of control application 120. As another option, the voltage, the current and/or the power of load system 104 may be received by reading the respective values from a storage location in computer-readable medium 116 or computing a value based on the predefined parameters such as a peak voltage, a peak current, a number of phases, a frequency, and a power factor angle. As still another option, the voltage, the current and/or the power of load system 104 may be received from load system 104 at a startup of power conversion system 100. As yet another option, the voltage, the current and/or the power of load system 104 may be dynamic and may be received from load system 104 at various time intervals that may or may not be periodic.

In an operation 3304, the switching period $T_s$ and capacitance C of link capacitor 110 are received. For example, the switching period $T_s$ and capacitance C of link capacitor 110 are received after a selection from a user interface window or after entry by a user into a user interface window presented under control of control application 120 or by reading the respective values from a storage location in computer-readable medium 116.

In an operation 3306, the switch vectors $S_{XYZ}$ and $S_{LMN}$ are selected, for example, as described above with reference to FIG. 23. As described previously, a number of possible switch vectors depend on a number of phases of the multi-phase load.

In an operation 3308, an order for applying the selected switch vectors $S_{XYZ}$ and $S_{LMN}$ is determined as first switch vector $S_{XYZ}$ and second switch vector $S_{LMN}$. For example, a switch vector that is charging may be selected first, and the discharging switch vector selected second.

In an operation 3310, a current for each switch vector is mapped to a phase current. For example, $I_\alpha$ is mapped to a second-phase current, and $I_\beta$ is mapped to a third-phase current based on the selected first and second switch vectors as indicated in equations (23) and (24).

In an operation 3312, a power is computed for each switch vector based on the mapping, for example, as indicated in equations (25) and (26).

In an operation 3314, a DC charging interval is computed, for example, as $$d_C = V_{in} \sqrt{-\frac{2C}{P_{in} T_s}},$$

where $V_{in}$ is the input voltage of DC power source 500, and $P_{in} = V_{in} I_{in}$, and $I_{in}$ is the input current of DC power source 500.

In an operation 3316, an interval for connecting each switch vector is computed, for example, using equations (27) and (29), the computed power for each switch vector, and the mapped phase currents.

In an operation 3318, one or more idle times, if any, are computed. For example, a total idle time may be computed as $T_s$ minus the DC charging interval and the computed interval for connecting each switch vector. The total idle time may be distributed between each charging/discharging interval and/or between each switching period.

In an operation 3320, source switch 504 is closed for the computed DC charging interval to charge link capacitor 110.

In an operation 3322, DC power source 500 is disconnected from link capacitor 110 for the computed idle time, if any.

In an operation 3324, first switch vector $S_{XYZ}$ is closed for the interval computed for first switch vector $S_{XYZ}$. First switch vector $S_{XYZ}$ is closed by closing the positive and negative throws of first half-bridge 230, second half-bridge 232, and third half-bridge 234 as indicated by XYZ in one of FIGS. 21a-22c. As described previously, first switch vector $S_{XYZ}$ may charge or discharge link capacitor 110. In an operation 3326, load system 104 is disconnected from link capacitor 110 for the computed idle time, if any. In an illustrative embodiment where first switch vector $S_{XYZ}$ charges link capacitor 110, operation 3324 may occur before operation 3320.

In an operation 3328, second switch vector $S_{LMN}$ is closed for the interval computed for second switch vector $S_{LMN}$. Second switch vector $S_{LMN}$ is closed by closing the positive and negative throws of first half-bridge 230, second half-bridge 232, and third half-bridge 234 as indicated by LMN in one of FIGS. 21a-22c. As described previously, second switch vector $S_{LMN}$ discharges link capacitor 110. In an operation 3330, load system 104 is disconnected from link capacitor 110 for the computed idle time, if any.

Processing may continue in any of operations 3300, 3302, 3304, and 3306 depending on the dynamics of power conversion system 100.

Figure 34:
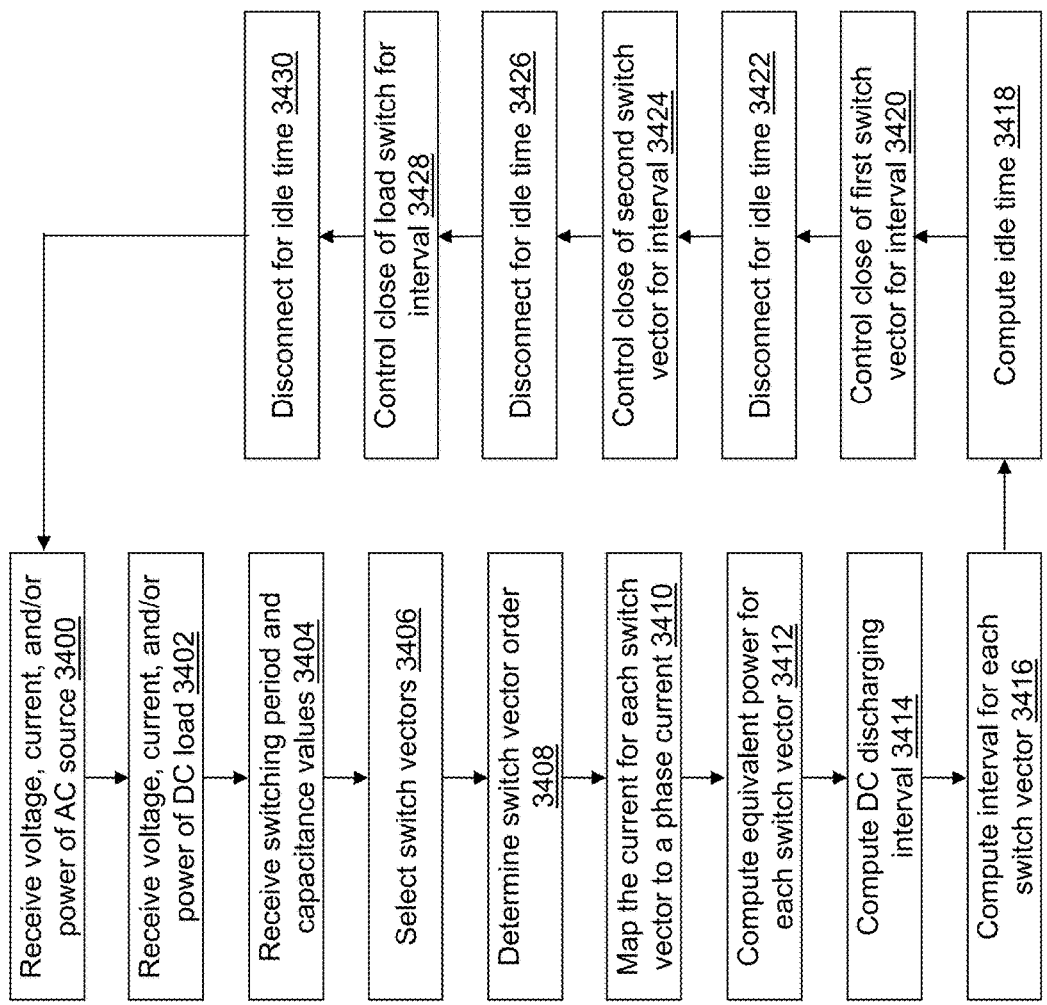

Referring to FIG. 34, example operations associated with control application 120 are described. Control application 120 may implement converter 106 as an AC-DC rectifier, for example, as shown in FIG. 28. Additional, fewer, or different operations may be performed depending on the embodiment. The order of presentation of the operations of FIG. 34 is not intended to be limiting. Although some of the operational flows are presented in sequence, the various operations may be performed in various repetitions, concurrently, and/or in other orders than those that are illustrated.

In an operation 3400, a voltage, a current, and/or a power of the multi-phase source is received, for example, in a manner similar to that described for receiving the three-phase load parameters in operation 3302.

In an operation 3402, a voltage, a current, and/or a power of DC load is received, for example, in a manner similar to that described for receiving the DC source parameters in operation 3300.

Similar to operation 3304, in an operation 3404, the switching period $T_s$ and capacitance C of link capacitor 110 are received.

In an operation 3406, the switch vectors $S_{XYZ}$ and $S_{LMN}$ are selected, for example, as described above with reference to FIG. 28. As described previously, a number of possible switch vectors depend on a number of phases of the multi-phase source.

In an operation 3408, an order for applying the selected switch vectors $S_{XYZ}$ and $S_{LMN}$ is determined as first switch vector $S_{XYZ}$ and second switch vector $S_{LMN}$. For example, a switch vector that is charging may be selected first, and the discharging switch vector selected second.

In an operation 3410, a current for each switch vector is mapped to a phase current. For example, $I_\alpha$ is mapped to a second-phase current, and $I_\beta$ is mapped to a third-phase current based on the selected first and second switch vectors as indicated in equations (23) and (24).

In an operation 3412, a power is computed for each switch vector based on the mapping, for example, as indicated in equations (25) and (26).

In an operation 3414, a DC discharging interval is computed, for example, as $$d_C = V_{in}\sqrt{-\frac{2C}{P_{in}T_s}},$$

where $V_{in}$ is the DC voltage provided by DC power source 500, C is a capacitance value of link capacitor 110, and $P_{in}=V_{in}I_{in}$ where $I_{in}$ is a current provided to the DC source.

In an operation 3416, an interval for connecting each switch vector is computed, for example, using equations (31) and (33), the computed power for each switch vector, and the mapped phase currents.

In an operation 3418, one or more idle times, if any, are computed. For example, a total idle time may be computed as $T_s$ minus the DC discharging interval and the computed interval for connecting each switch vector. The total idle time may be distributed between each charging/discharging interval and/or between each switching period.

In an operation 3420, first switch vector is closed for the interval computed for the selected first switch vector $S_{XYZ}$. As described previously, first switch vector $S_{XYZ}$ charges link capacitor 110. In an operation 3422, the three-phase source is disconnected from link capacitor 110 for the computed idle time, if any.

In an operation 3424, second switch vector $S_{LMN}$ is closed for the interval computed for the selected second switch vector. As described previously, second switch vector $S_{LMN}$ may charge or discharge link capacitor 110. In an operation 3426, the three-phase source is disconnected from link capacitor 110 for the computed idle time, if any.

In an operation 3428, source switch 504 is closed for the computed DC discharging interval to discharge link capacitor 110. In an illustrative embodiment where second switch vector $S_{LMN}$ discharges link capacitor 110, operation 3428 may occur before operation 3424.

In an operation 3430, DC power source 500 is disconnected from link capacitor 110 for the computed idle time, if any.

Processing may continue in any of operations 3400, 3402, 3404, and 3406 depending on the dynamics of power conversion system 100.

Figure 35:
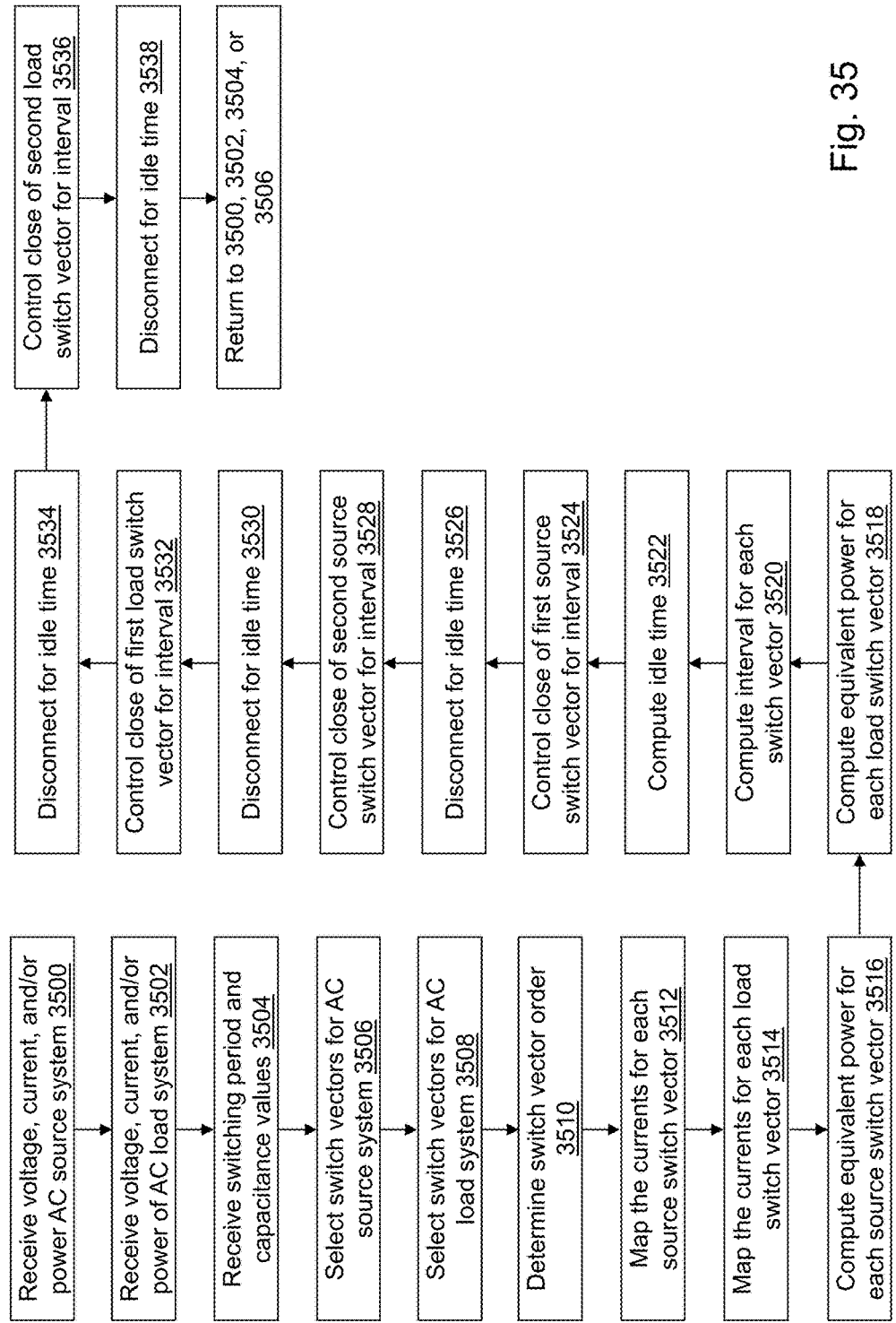

Referring to FIG. 35, example operations associated with control application 120 are described. Control application 120 may implement converter 106 as an AC-AC converter, for example, as shown in FIG. 29. Additional, fewer, or different operations may be performed depending on the embodiment. The order of presentation of the operations of FIG. 35 is not intended to be limiting. Although some of the operational flows are presented in sequence, the various operations may be performed in various repetitions, concurrently, and/or in other orders than those that are illustrated.

Similar to operation 3400, in an operation 3500, a voltage, a current, and/or a power of the multi-phase source is received.

Similar to operation 3302, in an operation 3502, a voltage, a current, and/or a power of the multi-phase load is received.

Similar to operation 3304, in an operation 3504, the switching period $T_s$ and capacitance C of link capacitor 110 are received.

Similar to operation 3406, in an operation 3506, the switch vectors $S_{XYZ}$ and $S_{LMN}$ are selected, for example, as described above with reference to FIG. 28.

Similar to operation 3306, in an operation 3508, the switch vectors $S_{XYZ}$ and $S_{LMN}$ are selected, for example, as described above with reference to FIG. 23

Similar to operations 3308 and 3408, in an operation 3510, an order for applying the selected switch vectors $S_{XYZ}$-l and $S_{LMN}$-l and $S_{XYZ}$-s and $S_{LMN}$-s is determined. For example, the first switch vector is a charge vector while the last switch vector is a discharge vector. The capacitor may be discharged in between multiple charge vectors to limit a peak capacitor voltage.

Similar to operation 3410, in an operation 3512, a current for each source switch vector, $S_{XYZ}$-s and $S_{LMN}$-s, is mapped to a phase current.

Similar to operation 3310, in an operation 3514, a current for each load switch vector, $S_{XYZ}$-l and $S_{LMN}$-l, is mapped to a phase current.

Similar to operation 3412, in an operation 3516, a power is computed for each source switch vector, $S_{XYZ}$-s and $S_{LMN}$-s.

Similar to operation 3312, in an operation 3518, a power is computed for each load switch vector, $S_{XYZ}$-l and $S_{LMN}$-l.

Similar to operation 3416, in an operation 3520, an interval for the selected switch vectors, $S_{XYZ}$-l, $S_{LMN}$-l and $S_{XYZ}$-s and $S_{LMN}$-s is computed, for example, using equations (35)-(38), the computed power for each switch vector, and the mapped phase currents.

Similar to operation 3418, in an operation 3522, one or more idle times, if any, are computed. For example, a total idle time may be computed as $T_s$ minus the computed interval for connecting each switch vector. The total idle time may be distributed between each charging/discharging interval and/or between each switching period.

Similar to operation 3420, in an operation 3524, first source switch vector $S_{XYZ}$-s is closed for the interval computed for $S_{XYZ}$-s. As described previously, $S_{XYZ}$-s charges link capacitor 110. Similar to operation 3422, in an operation 3526, the multi-phase source is disconnected from link capacitor 110 for the computed idle time, if any.

Similar to operation 3424, in an operation 3528, second source switch vector $S_{LMN}$-s is closed for the interval computed for $S_{LMN}$-s. As described previously, $S_{LMN}$-s may charge or discharge link capacitor 110. Similar to operation 3426, in an operation 3530, the multi-phase source is disconnected from link capacitor 110 for the computed idle time, if any.

Similar to operation 3320, in an operation 3532, first load switch vector $S_{XYZ}$-l is closed for the interval computed for $S_{XYZ}$-s. As described previously, $S_{XYZ}$-l may charge or discharge link capacitor 110. Similar to operation 3322, in an operation 3534, the multi-phase load is disconnected from link capacitor 110 for the computed idle time, if any.

Similar to operation 3324, in an operation 3536, second load switch vector $S_{LMN}$-l is closed for the interval computed for $S_{LMN}$-s. As described previously, $S_{LMN}$-l discharges link capacitor 110. Similar to operation 3326, in an operation 3538, the multi-phase load is disconnected from link capacitor 110 for the computed idle time, if any.

Processing may continue in any of operations 3500, 3502, 3504, and 3506 depending on the dynamics of power conversion system 100.

Figure 36:
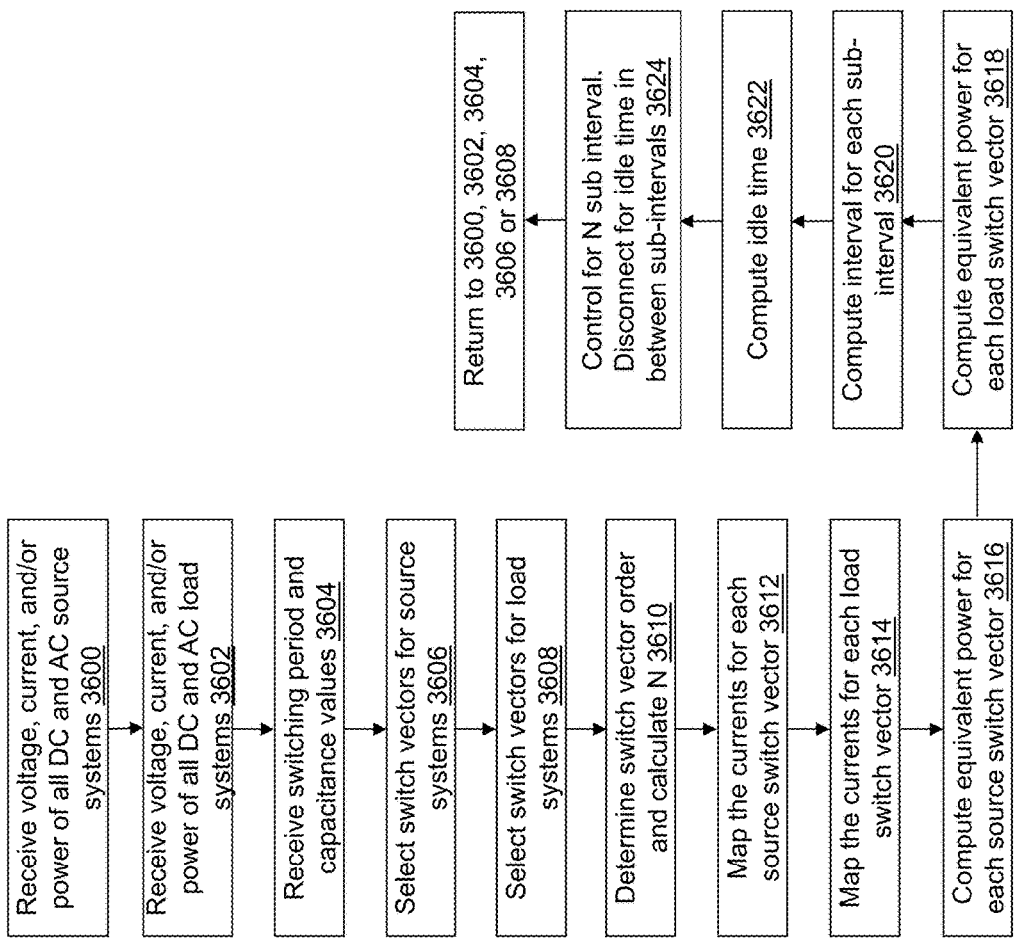

Referring to FIG. 36, example operations associated with control application 120 for multiple DC and AC sources and load systems are described. Control application 120 may implement converter 106 as a general multi source and load converter. Additional, fewer, or different operations may be performed depending on the embodiment. The order of presentation of the operations of FIG. 36 is not intended to be limiting. Although some of the operational flows are presented in sequence, the various operations may be performed in various repetitions, concurrently, and/or in other orders than those that are illustrated.

Similar to operation 3500, in an operation 3600, a voltage, a current and/or a power of all the DC and/or AC sources are received.

Similar to operation 3502, in an operation 3602, a voltage, a current and/or a power of all the DC and/or AC loads are received.

Similar to operation 3504, in an operation 3604, the switching period $T_s$ and capacitance C of link capacitor 110 are received.

Similar to operation 3506, in an operation 3606, the switch vectors $S_{XYZ}$ and $S_{LMN}$ of all the source subsystems are selected, for example, as described above with reference to FIG. 28.

Similar to operation 3508, in an operation 3608, the switch vectors $S_{XYZ}$ and $S_{LMN}$ of all the load subsystems are selected, for example, as described above with reference to FIG. 28.

Similar to operation 3510, in an operation 3610, the order of all of the selected switch vectors is determined. This may be facilitated by an optimization code to achieve the desirable specifications such as a limited peak capacitor voltage, a desired duty ratio behavior, a converter efficiency etc.

Similar to operation 3512, in an operation 3612, a current for all source switch vectors, $S_{XYZ}$ and $S_{LMN}$, are mapped to the phase currents.

Similar to operation 3514, in an operation 3614, a current for all load switch vectors, $S_{XYZ}$ and $S_{LMN}$, are mapped to the phase current.

Similar to operation 3516, in an operation 3616, a power for all source systems' switch vectors is computed.

Similar to operation 3518, in an operation 3618, a power for all load systems' switch vectors is computed.

Similar to operation 3520, in an operation 3620, an interval for all the sub-intervals is computed, for example, using equations (48), the computed power for each switch vector, and the mapped phase currents.

Similar to operation 3522, in an operation 3622, one or more idle times, if any, are computed. For example, a total idle time may be computed as $T_s$ minus the computed interval for connecting each switch vector. The total idle time may be distributed between each charging/discharging interval and/or between each switching period.

Similar to operation 3520-3538, in an operation 3624, all the dc and ac source and load control is performed to charge and discharge the link capacitor 110. All the source and load systems are disconnected from link capacitor 110 for the computed idle time, if any. The system returns to 3600, 3602, 3604, 3606 or 3608 for the next high frequency switching cycle As used in this disclosure, the term "connect" indicates an electrical connection whether by wire or by air or some other medium that conducts an electrical signal. "Connect" encompasses a direct connection (in which the referenced elements are in direct contact) and an indirect connection (in which the referenced elements are not in direct contact, but are connected via intermediate elements).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a processor cause the processor to:
  select a first switch vector based on a current, a voltage, or a power of a multi-phase load or a multi-phase power source, wherein the first switch vector identifies a first state for each of a plurality of half-bridges of a converter as on or as off during a first interval;
  select a second switch vector based on the current, the voltage, or the power of the multi-phase load or the multi-phase power source, wherein the second switch vector identifies a second state for each of the plurality of half-bridges as on or as off during a second interval;
compute the first interval based on the selected first switch vector;
compute the second interval based on the selected second switch vector;
control each of the plurality of half-bridges as on or as off during the first interval based on the selected first switch vector; and
control each of the plurality of half-bridges as on or as off during the second interval based on the selected second switch vector,
wherein the first interval and the second interval are selected for each switching period of the converter,
wherein the switching period is less than one millisecond,
wherein the first interval and the second interval are computed to either charge a link capacitor connected in parallel across the plurality of half-bridges to a predefined voltage from approximately zero or to discharge the link capacitor to approximately zero from the predefined voltage.

2. A conversion controller comprising:
a processor; and
a non-transitory computer-readable medium operably coupled to the processor, the computer-readable medium having computer-readable instructions stored thereon that, when executed by the processor, cause the processor to
select a first switch vector based on a current, a voltage, or a power of a multi-phase load or a multi-phase power source, wherein the first switch vector identifies a first state for each of a plurality of half-bridges of a converter as on or as off during a first interval;
select a second switch vector based on the current, the voltage, or the power of the multi-phase load or the multi-phase power source, wherein the second switch vector identifies a second state for each of the plurality of half-bridges as on or as off during a second interval;
compute the first interval based on the selected first switch vector;
compute the second interval based on the selected second switch vector;
control each of the plurality of half-bridges as on or as off during the first interval based on the selected first switch vector; and
control each of the plurality of half-bridges as on or as off during the second interval based on the selected second switch vector,
wherein the first interval and the second interval are selected for each switching period of the converter,
wherein the switching period is less than one millisecond,
wherein the first interval and the second interval are computed to either charge a link capacitor connected in parallel across the plurality of half-bridges to a predefined voltage from approximately zero or to discharge the link capacitor to approximately zero from the predefined voltage.

3. A converter device comprising:
a converter including a plurality of half-bridges, wherein a half-bridge is included for each phase of a multi-phase load or of a multi-phase power source;
a link capacitor connected in parallel across the plurality of half-bridges;
a processor connected to control each of the plurality of half-bridges as on or as off; and
a non-transitory computer-readable medium operably coupled to the processor, the computer-readable medium having computer-readable instructions stored thereon that, when executed by the processor, cause the processor to
select a first switch vector based on a current, a voltage, or a power of the multi-phase load or the multi-phase power source, wherein the first switch vector identifies a first state for each of the plurality of half-bridges as on or as off during a first interval;
select a second switch vector based on the current, the voltage, or the power of the multi-phase load or the multi-phase power source, wherein the second switch vector identifies a second state for each of the plurality of half-bridges as on or as off during a second interval;
compute the first interval based on the selected first switch vector;
compute the second interval based on the selected second switch vector;
control each of the plurality of half-bridges as on or as off during the first interval based on the selected first switch vector; and
control each of the plurality of half-bridges as on or as off during the second interval based on the selected second switch vector,
wherein the first interval and the second interval are selected for each switching period of the converter,
wherein the switching period is less than one millisecond,
wherein the first interval and the second interval are computed to either charge the link capacitor to a predefined voltage from approximately zero or to discharge the link capacitor to approximately zero from the predefined voltage.

4. The converter device of claim 3, further comprising computer-readable instructions that, when executed by the processor, cause the processor to:
map a first current based on the selected first switch vector, wherein the first current is mapped to one of a plurality of currents of the multi-phase load or of the multi-phase power source;
map a second current based on the selected second switch vector, wherein the second current is mapped to one of the plurality of currents of the multi-phase load or of the multi-phase power source excluding the mapped first current;
compute a first power value based on the selected first switch vector and a first current value of the mapped first current; and
compute a second power value based on the selected second switch vector and a second current value of the mapped second current,
wherein the first interval is computed based on the computed first power value and the first current value,
wherein the second interval is computed based on the computed second power value and the second current value.

5. The converter device of claim 4, wherein the first interval and the second interval are further computed based on a capacitance value of the link capacitor.

6. The converter device of claim 3, wherein a load to which the converter device is connected is the multi-phase load operating as an alternating current (AC) load and a source to which the converter device is connected is a direct current (DC) source, wherein the converter is configured to convert a DC source current output by the DC source to an AC load current input to the AC load.

7. The converter device of claim 6, wherein the first switch vector is selected to charge the link capacitor.

8. The converter device of claim 6, further comprising computer-readable instructions that, when executed by the processor, cause the processor to:
  map a first current based on the selected first switch vector, wherein the first current is mapped to one of a plurality of currents of the multi-phase load;
  map a second current based on the selected second switch vector, wherein the second current is mapped to one of the plurality of currents of the multi-phase load;
  compute a first power value based on the selected first switch vector and a first current value of the mapped first current; and
  compute a second power value based on the selected second switch vector and a second current value of the mapped second current,
  wherein the first interval is computed based on the computed first power value and the first current value,
  wherein the second interval is computed based on the computed second power value and the second current value.

9. The converter device of claim 8, wherein the first interval is computed $$\frac{\sqrt{-2CP_{in}}}{\sqrt{T_s}\,I_\alpha}\left[1-\sqrt{1+\frac{P_{XYZ}}{P_{in}}}\right],$$

where C is a capacitance value of the link capacitor, $T_s$, is the switching period, $I_\alpha$ is the first current value, $P_{XYZ}$ is the computed first power value, and $P_{in}=V_{in}I_{in}$ where $V_{in}$ is an input voltage provided by the DC source and $I_{in}$ is an input current provided by the DC source.

10. The converter device of claim 9, wherein the second interval is computed as $$\frac{\sqrt{2CP_{LMN}}}{\sqrt{T_s I_\beta^2}},$$

where $I_\beta$ is the second current value, and $P_{LMN}$ is the computed second power value.

11. The converter device of claim 6, further comprising computer-readable instructions that, when executed by the processor, cause the processor to:
  compute a charging interval for the DC source;
  control a connection between the DC source and the link capacitor to charge the link capacitor during the computed charging interval; and
  control a disconnection of the DC source from the link capacitor after completion of the computed charging interval, wherein the charging interval is selected for each switching period of the converter to occur before the first interval and the second interval.

12. The converter device of claim 11, wherein the charging interval is computed as $d_C T_s$, where $T_s$ is the switching period, and $$d_C = V_{in}\sqrt{-\frac{2C}{P_{in}T_s}},$$

where $V_{in}$ is an input voltage provided by the DC source, C is a capacitance value of the link capacitor, and $P_{in}=V_{in}I_{in}$ where $I_{in}$ is an input current provided by the DC source.

13. The converter device of claim 3, wherein a load to which the converter device is connected is a direct current (DC) load and a source to which the converter device is connected is the multi-phase source operating as an alternating current (AC) source, wherein the converter is configured to convert an AC source current output by the AC source to a DC load current input to the DC load.

14. The converter device of claim 13, wherein the second switch vector is selected to discharge the link capacitor.

15. The converter device of claim 13, further comprising computer-readable instructions that, when executed by the processor, cause the processor to:
  map a first current based on the selected first switch vector, wherein the first current is mapped to one of a plurality of currents of the multi-phase source;
  map a second current based on the selected second switch vector, wherein the second current is mapped to one of the plurality of currents of the multi-phase source;
  compute a first power value based on the selected first switch vector and a first current value of the mapped first current; and
  compute a second power value based on the selected second switch vector and a second current value of the mapped second current,
  wherein the first interval is computed based on the computed first power value and the first current value,
  wherein the second interval is computed based on the computed second power value and the second current value.

16. The converter device of claim 15, wherein the first interval is computed as $$\sqrt{-\frac{2CP_{XYZ}}{T_s I_\alpha^2}},$$

where C is a capacitance value of the link capacitor, $T_s$, is the switching period, $I_\alpha$ is the first current value, and $P_{XYZ}$ is the computed first power value.

17. The converter device of claim 16, wherein the second interval is computed as $$-\frac{I_\alpha d_{1rec}}{I_\beta}\left[1-\sqrt{1+\frac{P_{LMN}}{P_{XYZ}}}\right],$$

where $I_\beta$ is the second current value, and $P_{LMN}$ is the computed second power value, and $d_{1rec}$ is the first interval.

18. The converter device of claim 13, further comprising computer-readable instructions that, when executed by the processor, cause the processor to:
  compute a discharging interval for the DC load;
  control a connection between the DC load and the link capacitor to discharge the link capacitor during the computed discharging interval; and
  control a disconnection of the DC load from the link capacitor after completion of the computed discharging interval, wherein the discharging interval is selected for each switching period of the converter to occur after the first interval and the second interval.

19. The converter device of claim 18, wherein the charging interval is computed as $$d_C = V_{in} \sqrt{\frac{2C}{P_{in} T_s}},$$

where $V_{in}$ is an input voltage provided by the DC source, C is a capacitance value of the link capacitor, and $P_{in} = V_{in} I_{in}$ where $I_{in}$ is an current provided to the DC source.

20. The converter device of claim 3, wherein a load to which the converter device is connected is the multi-phase load operating as an alternating current (AC) load and a source to which the converter device is connected is the multi-phase source operating as an alternating current (AC) source, wherein the converter is configured to convert an AC source current output by the AC source to a AC load current input to the AC load.

* * * * *

UNITED STATES PATENT AND TRADEMARK OFFICE
CERTIFICATE OF CORRECTION

PATENT NO. : 9,954,427 B2  
APPLICATION NO. : 14/934337  
DATED : April 24, 2018  
INVENTOR(S) : Venkata Giri Venkataramanan et al.

Page 1 of 1

It is certified that error appears in the above-identified patent and that said Letters Patent is hereby corrected as shown below:

In the Claims

Claim 9, Column 35, Lines 27-34:

Delete the phrase "the first interval is computed $\frac{\sqrt{-2CP_{in}}}{\sqrt{T_s}I_\alpha}[1-\sqrt{1+\frac{P_{XYZ}}{P_{in}}}],$" and replace with --the first interval is computed as $\frac{\sqrt{-2CP_{in}}}{\sqrt{T_s}I_\alpha}[1-\sqrt{1+\frac{P_{XYZ}}{P_{in}}}],$ --.

Signed and Sealed this  
Twenty-second Day of January, 2019

Andrei Iancu  
*Director of the United States Patent and Trademark Office*